US007655855B2

(12) United States Patent
Georges et al.

(10) Patent No.: US 7,655,855 B2
(45) Date of Patent: *Feb. 2, 2010

(54) SYSTEMS AND METHODS FOR CREATING, MODIFYING, INTERACTING WITH AND PLAYING MUSICAL COMPOSITIONS

(75) Inventors: Alain Georges, Saint Paul de Vence (FR); Voit Damevski, London (GB)

(73) Assignee: Medialab Solutions LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/698,796

(22) Filed: Jan. 26, 2007

(65) Prior Publication Data

US 2007/0186752 A1    Aug. 16, 2007

Related U.S. Application Data

(63) Continuation of application No. 10/337,753, filed on Jan. 7, 2003, now Pat. No. 7,169,996, which is a continuation-in-part of application No. 10/293,737, filed on Nov. 12, 2002, now Pat. No. 7,102,069.

(51) Int. Cl.
*A63H 5/00* (2006.01)
*G04B 13/00* (2006.01)
*G10H 7/00* (2006.01)
(52) U.S. Cl. ........................................... 84/609
(58) Field of Classification Search ................... 84/609, 84/634, 645
See application file for complete search history.

(56) References Cited

U.S. PATENT DOCUMENTS 4,399,731 A    8/1983   Aoki .......................... 84/1.03

(Continued)

FOREIGN PATENT DOCUMENTS

EP    484047    10/1991

(Continued)

OTHER PUBLICATIONS

Beatnik Rich Music Format, 2 pages, 2002.

(Continued)

*Primary Examiner*—Jeffrey Donels
(74) *Attorney, Agent, or Firm*—Loudermilk +Associates

(57) ABSTRACT

Systems and methods for creating, modifying, interacting with and playing music are provided, particularly systems and methods employing a top-down process, where the user is provided with a musical composition that may be modified and interacted with and played and/or stored (for later play). The system preferably is provided in a handheld form factor, and a graphical display is provided to display status information, graphical representations of musical lanes or components which preferably vary in shape as musical parameters and the like are changed for particular instruments or musical components such as a microphone input or audio samples. An interactive auto-composition process preferably is utilized that employs musical rules and preferably a pseudo random number generator, which may also incorporate randomness introduced by timing of user input or the like, the user may then quickly begin creating desirable music in accordance with one or a variety of musical styles, with the user modifying the auto-composed (or previously created) musical composition, either for a real time performance and/or for storing and subsequent playback. In addition, the present invention makes use of node-based music generation as part of a system and method to broadcast and receive music data files, which are then used to generate and play music. By incorporating the music generation process into a node/subscriber unit, the bandwidth-intensive systems of conventional techniques can be avoided. Consequently, the bandwidth can preferably be also used for additional features such as node-to-node and node-to-base music data transmission. The present invention is characterized by the broadcast of relatively small data files that contain various parameters sufficient to describe the music to the node/subscriber music generator.

20 Claims, 54 Drawing Sheets

Node/Subscriber Unit Functional Blocks

U.S. PATENT DOCUMENTS

| | | | | |
|---|---|---|---|---|
| 4,577,067 A | 3/1986 | Levy et al. | ............ | 379/101.01 |
| 4,787,073 A | 11/1988 | Masaki | ........................ | 369/32 |
| 5,054,360 A | 10/1991 | Lisle et al. | .................... | 84/645 |
| 5,099,740 A | 3/1992 | Minamitaka | ................. | 84/649 |
| 5,177,618 A | 1/1993 | Dunlap et al. | ................ | 358/335 |
| 5,267,318 A | 11/1993 | Severson | ..................... | 381/51 |
| 5,281,754 A | 1/1994 | Farrett et al. | ................... | 84/609 |
| 5,300,723 A | 4/1994 | Ito | ............................. | 84/601 |
| 5,307,456 A | 4/1994 | MacKay | .................... | 395/154 |
| 5,308,915 A | 5/1994 | Ohya | .......................... | 395/22 |
| 5,350,880 A | 9/1994 | Sato | ........................... | 84/609 |
| 5,369,217 A | 11/1994 | Yamashita et al. | ............ | 84/611 |
| 5,386,081 A | 1/1995 | Nakada et al. | ................ | 84/609 |
| 5,425,297 A | 6/1995 | Young, Jr. | ..................... | 84/483.2 |
| 5,451,709 A | 9/1995 | Minamitaka | ................. | 84/609 |
| 5,496,962 A | 3/1996 | Meier et al. | ................... | 84/601 |
| 5,523,525 A | 6/1996 | Murakami et al. | ........... | 84/602 |
| 5,581,530 A | 12/1996 | Iizuka et al. | ................. | 369/93 |
| 5,590,282 A | 12/1996 | Clynes | ................. | 395/200.02 |
| 5,627,335 A | 5/1997 | Rigopulos et al. | ............ | 84/609 |
| 5,633,985 A | 5/1997 | Severson | ................... | 395/2.76 |
| 5,640,590 A | 6/1997 | Luther | ........................ | 395/806 |
| 5,648,628 A | 7/1997 | Ng et al. | ....................... | 84/610 |
| 5,650,583 A | 7/1997 | Machover et al. | ............ | 84/626 |
| 5,655,144 A | 8/1997 | Milne et al. | ................. | 395/807 |
| 5,675,557 A | 10/1997 | Hubinger | ....................... | 369/4 |
| 5,689,081 A | 11/1997 | Tsurumi | ......................... | 84/609 |
| 5,753,843 A | 5/1998 | Fay | ............................. | 84/609 |
| 5,763,804 A | 6/1998 | Rigopulos et al. | ............ | 84/635 |
| 5,787,399 A | 7/1998 | Lee | ............................ | 704/270 |
| 5,792,971 A | 8/1998 | Timis et al. | ................... | 84/609 |
| 5,801,694 A | 9/1998 | Gershen | ..................... | 345/339 |
| 5,824,933 A | 10/1998 | Gabriel | ........................ | 84/609 |
| 5,832,431 A | 11/1998 | Severson | ................... | 704/258 |
| 5,839,108 A | 11/1998 | Daberko et al. | ............ | 704/270 |
| 5,850,051 A | 12/1998 | Machover et al. | ............ | 84/634 |
| 5,864,868 A | 1/1999 | Contois | ........................ | 707/104 |
| 5,877,445 A | 3/1999 | Hufford et al. | ................ | 84/602 |
| 5,886,274 A | 3/1999 | Jungleib | ........................ | 84/601 |
| 5,900,566 A | 5/1999 | Mino | ........................... | 84/610 |
| 5,913,258 A | 6/1999 | Tamura | ......................... | 84/604 |
| 5,914,941 A | 6/1999 | Janky | ......................... | 370/313 |
| 5,928,330 A | 7/1999 | Goetz et al. | ................... | 709/231 |
| 5,969,716 A | 10/1999 | Davis et al. | ................... | 345/328 |
| 5,981,860 A | 11/1999 | Isozaki | ......................... | 84/603 |
| 6,008,446 A | 12/1999 | Van Buskirk et al. | ......... | 84/603 |
| 6,011,212 A | 1/2000 | Rigopulos et al. | ............ | 84/667 |
| 6,051,770 A | 4/2000 | Milburn et al. | ................ | 84/611 |
| 6,072,480 A | 6/2000 | Gorbet et al. | ............... | 345/302 |
| 6,074,215 A | 6/2000 | Tsurumi | ......................... | 434/307 |
| 6,083,009 A | 7/2000 | Kim et al. | .................... | 434/307 |
| 6,084,168 A | 7/2000 | Sitrick | ......................... | 84/477 |
| 6,093,880 A | 7/2000 | Arnalds | ........................ | 84/464 |
| 6,121,533 A | 9/2000 | Kay | ............................ | 84/616 |
| 6,143,971 A | 11/2000 | Aoki et al. | .................... | 84/609 |
| 6,143,973 A | 11/2000 | Kikuchi | ........................ | 84/645 |
| 6,153,821 A | 11/2000 | Fay et al. | ..................... | 84/634 |
| 6,182,126 B1 | 1/2001 | Nathan et al. | ................ | 709/219 |
| 6,192,340 B1 | 2/2001 | Abecassis | ................... | 704/270 |
| 6,225,547 B1 | 5/2001 | Toyama et al. | ................ | 84/611 |
| 6,230,140 B1 | 5/2001 | Severson | ................... | 704/278 |
| 6,245,984 B1 | 6/2001 | Aoki et al. | .................... | 84/611 |
| 6,281,424 B1 | 8/2001 | Koike et al. | ................... | 84/636 |
| 6,326,538 B1 | 12/2001 | Kay | ............................ | 84/635 |
| 6,343,055 B1 | 1/2002 | Ema et al. | ................ | 369/531.6 |
| 6,347,998 B1 | 2/2002 | Yoshitomi et al. | ........... | 463/42 |
| 6,353,169 B1 | 3/2002 | Juszkiewicz et al. | .......... | 84/600 |
| 6,353,172 B1 | 3/2002 | Fay et al. | ..................... | 84/609 |
| 6,353,174 B1 | 3/2002 | Schmidt et al. | ................ | 84/609 |
| 6,390,923 B1 | 5/2002 | Yoshitomi et al. | ........... | 463/43 |
| 6,425,018 B1 | 7/2002 | Kaganas et al. | ............... | 710/1 |
| 6,425,822 B1 | 7/2002 | Hayashida et al. | .............. | 463/7 |
| 6,429,863 B1 | 8/2002 | LoPiccolo et al. | ........... | 345/419 |
| 6,450,888 B1 | 9/2002 | Takase et al. | ................... | 463/43 |
| 6,472,591 B2 * | 10/2002 | Aoki et al. | ..................... | 84/611 |
| 6,482,087 B1 | 11/2002 | Egozy et al. | .................... | 463/7 |
| 6,506,969 B1 | 1/2003 | Baron | ......................... | 84/609 |
| 6,541,691 B2 | 4/2003 | Tolonen et al. | ................ | 84/616 |
| 6,576,828 B2 | 6/2003 | Aoki et al. | ..................... | 84/635 |
| 6,576,878 B2 | 6/2003 | Thorpe et al. | ............... | 219/645 |
| 6,639,141 B2 | 10/2003 | Kay | ............................ | 84/609 |
| 6,645,067 B1 | 11/2003 | Okita et al. | ..................... | 463/7 |
| 6,657,116 B1 | 12/2003 | Gunnerson | ................... | 84/615 |
| 6,683,241 B2 | 1/2004 | Wieder | ........................ | 84/609 |
| 6,696,631 B2 | 2/2004 | Smith et al. | .................... | 84/645 |
| 6,815,600 B2 | 11/2004 | Georges et al. | ............... | 84/609 |
| 6,835,884 B2 * | 12/2004 | Iwamoto et al. | ............... | 84/609 |
| 6,835,887 B2 | 12/2004 | Devecka | ....................... | 84/743 |
| 6,897,368 B2 | 5/2005 | Georges et al. | ............... | 84/609 |
| 6,916,978 B2 | 7/2005 | Georges et al. | ............... | 84/609 |
| 6,970,822 B2 | 11/2005 | Fay et al. | .................... | 704/270 |
| 7,078,609 B2 | 7/2006 | Georges | ....................... | 84/645 |
| 7,169,996 B2 * | 1/2007 | Georges et al. | ............... | 84/609 |
| 7,183,482 B2 | 2/2007 | Kobayashi | .................... | 84/645 |
| 7,189,915 B2 | 3/2007 | Kobayashi | .................... | 84/645 |
| 7,241,947 B2 | 7/2007 | Kobayashi | .................... | 84/645 |
| 7,319,185 B1 | 1/2008 | Wieder | ........................ | 84/609 |
| 2001/0025561 A1 | 10/2001 | Milburn et al. | ................ | 84/609 |
| 2002/0023529 A1 | 2/2002 | Kurakake et al. | ............. | 84/610 |
| 2002/0033090 A1 | 3/2002 | Iwamoto et al. | ............... | 84/609 |
| 2002/0046315 A1 | 4/2002 | Miller et al. | | |
| 2002/0046899 A1 | 4/2002 | Mizuno et al. | ................ | 181/142 |
| 2002/0065074 A1 | 5/2002 | Cohn et al. | | |
| 2002/0166440 A1 | 11/2002 | Herberger | | |
| 2002/0170415 A1 | 11/2002 | Hruska et al. | | |
| 2002/0175665 A1 | 11/2002 | O'Grady et al. | | |
| 2003/0013497 A1 | 1/2003 | Yamaki et al. | ............... | 455/567 |
| 2003/0079598 A1 | 5/2003 | Nakayama | | |
| 2003/0176206 A1 | 9/2003 | Taniguchi et al. | ........... | 455/567 |
| 2003/0183065 A1 | 10/2003 | Leach | | |
| 2003/0205125 A1 | 11/2003 | Futamase et al. | ............... | 84/622 |
| 2004/0039796 A1 | 2/2004 | Watkins | | |
| 2004/0064320 A1 | 4/2004 | Chrysanthakopoulos et al. | | |
| 2004/0088169 A1 | 5/2004 | Smith et al. | | |
| 2004/0106395 A1 | 6/2004 | Suganuma | | |
| 2004/0109558 A1 | 6/2004 | Koch | | |
| 2004/0231499 A1 | 11/2004 | Kobayashi | | |
| 2005/0190199 A1 | 9/2005 | Brown et al. | | |
| 2006/0156909 A1 | 7/2006 | Kobayashi | | |
| 2006/0185504 A1 | 8/2006 | Kobayashi | | |

FOREIGN PATENT DOCUMENTS

| | | |
|---|---|---|
| EP | 0702366 | 9/1995 |
| EP | 0747877 | 6/1996 |
| EP | 0857343 | 10/1996 |
| GB | 2306043 | 4/1997 |
| JP | 06295567 | 10/1994 |
| WO | WO 88/05200 | 7/1988 |
| WO | WO 89/02641 | 3/1989 |
| WO | WO 97/15043 | 4/1997 |
| WO | WO 97/35299 | 9/1997 |
| WO | WO 98/33169 | 7/1998 |
| WO | WO 01/63592 | 8/2001 |
| WO | WO 01/73748 | 10/2001 |
| WO | WO 01/86630 | 11/2001 |
| WO | WO 0186625 | 11/2001 |
| WO | WO 0186626 | 11/2001 |
| WO | WO 0186627 | 11/2001 |
| WO | WO 0186628 | 11/2001 |
| WO | WO 0186629 | 11/2001 |

WO  WO 02/077585  10/2002

OTHER PUBLICATIONS

Beatnik Audio Engine White Paper, 6 pages, 2001.
Beatnik AudioEngine, 2 pages, 2002.
Beatnik mobileBAE version 02.02w, 2 pages, 2002.
Beatnik mobileBAE version 11.02w, 2 pages, 2002.
Combining musical theory and practice, IBM Computer Music Center, apparently Jun. 29, 1995.
*Dream*, an Atmel Company: SAM9407, "Programmer's Reference," pp. 1-61, Rev. 11, Dec. 1996.
*Dream*, an Atmel Company: SAM9707, "Integrated Sound Studio," pp. 1-20, Jan. 1998.
GenJam: An Interactive Genetic Algorithm Jazz Improviser, John A. Biles, popular version of paper 4pMU1 apparently presented Dec. 4, 1997.
GenJam: A Genetic Algorithm for Generating Jazz Solos, John A. Biles, date apparently after 1993.
GenJam Populi: Training an IGA via Audience-Mediated Performance, John A. Biles, apparently Sep. 15, 1995.
Information on how to purchase Kid Riffs, IBM, date unknown, Aug. 1, 2008.
Interactive GenJam: Integrating Real-Time Performance with a Genetic Algorithm, John A. Biles, apparently after 1996.
Hemmings, Richard, Scary Computer Music, apparently from Avant Magazine, Issue 7, Summer 1998, p. 12.
Kid Riffs, IBM Computer Music Center, date unknown, Aug. 1, 2008.
Louis, Duke, Miles—and MAC? Business Week Archives, apparently Dec. 18, 1995.
Mithic, a New Generation of Music, Thomson Multimedia, 3 pages, Jul. 8, 2002.
Mithic, the First Interactive Music Composer, 2 pages, 2002.
Thomson Multimedia presents Mithic Technology, 3 pages (2 slides per page), undated, Aug. 1, 2008.
Thomson Multimedia launches Mithic, a unique Technology to to deliver personalized interactive Music, Feb. 25, 2002.
Thomson to present the Mithic Composer Technology at DEMOmobile Conference, Sep. 19, 2002.
Mobile Media Analyst, "Music Services Might Soon Break Out of the Ring-Tone Mold," Mobile Media management report, pp. 5-12, Jan. 10, 2003.
Motorola C350 Cellular Phone User Manual, selected pages on MotoMixer Sound Editor, Motorola, Inc., pp. 1, 2, 129-131, 2002.
Music Sketcher, IBM Computer Music Center, date unknown, Aug. 1, 2008.
Music Sketcher Section Details, IBM, apparently 1998.
Musical Computers, Miles Davis, version 2.1, apparently from The Economist, Dec. 6, 1997, p. 92.
Roland Corporation, "Personal Music Assistant Owner's Manual", Dec. 18, 1995, Entire Manual.
Yamaha Mobile Audio 3, MA-3, YMU762, Yamaha LSI, Yamaha Corp., Preliminary May 9, 2001, p. 1-14.
Tom Hays, "DirectMusic For The Masses", Gamasutra.com article believed to be originally published in Game Developer Magazine Sep. 1998, 27 pages.
Microsoft, "Microsoft DirectMusic Producer: Game Development Tutorial", believed to be dated Nov. 12, 2002 (file date of electronic file) or earlier, 52 pages.
Chong (John) Yu, "Computer Generated Music Composition," May 28, 1996, 21 pages (MIT Thesis).
Mary Farbood, "Hyperscore: A New Approach to Interactive, Computer-Generated Music," Sep. 1, 2001, 78 pages (MIT Thesis).
Alexander Rigopulos, "Growing Music from Seeds: Parametric Generation and Control of Seed-Based Music for Interactive Composition and Performance," Aug. 5, 1994 (MIT Thesis).
Eran Baruch Egozy, "Deriving Musical Control Features from a Real-Time Timbre Analysis of the Clarinet," Jan. 20, 1995 (MIT Thesis).
Chong (John) Yu, "Computer Generated Music Composition," May 28, 1996, 21 pages (MIT Thesis).
Mary Farbood, "Hyperscore: A New Approach to Interactive, Computer-Generated Music," Sep. 1, 2001, 78 pages (MIT Thesis).
Alexander Rigopulos, "Growing Music from Seeds: Parametric Generation and Control of Seed-Based Music for Interactive Composition and Performance," Aug. 5, 1994 (MIT Thesis).
Eran Baruch Egozy, "Deriving Musical Control Features from a Real-Time Timbre Analysis of the Clarinet," Jan. 20, 1995 (MIT Thesis).

* cited by examiner

| | |
|---|---|
| ▶ | Play |
| ■ | Stop |
| ▶▶ | Forward |
| ◀◀ | Reverse |
| ● | Record |

Player Function keys

FIG. 2

| | |
|---|---|
| ♫ | e.DJ |
| 📡 | V.Radio |
| 💿 | Songs |
| ▤ | Samples |
| ⚙ | System |

Mode/Direct Access keys

FIG. 3

Home Screen

Help Screen e.DJ Style Selection Screen e.DJ I-Way Screen

Alternate I-Way Screen e.DJ Underground Screen

Alternate Underground Interface

Exemplary GUI Spatial Organization

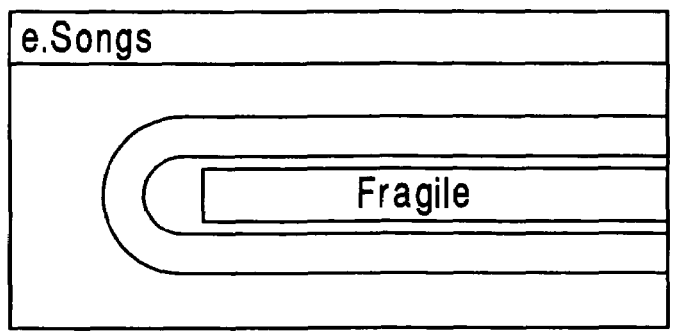
FIG. 9  Play Song Screen
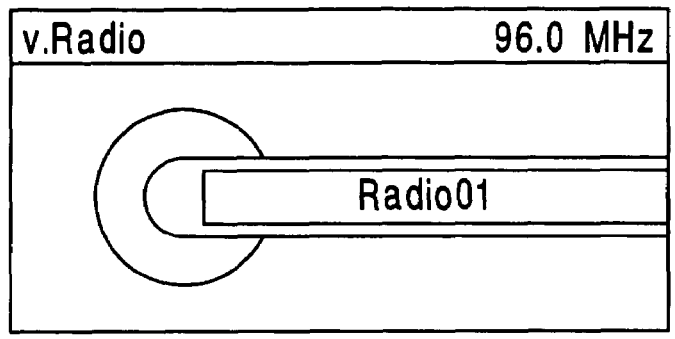
FIG. 10  Play Radio Screen
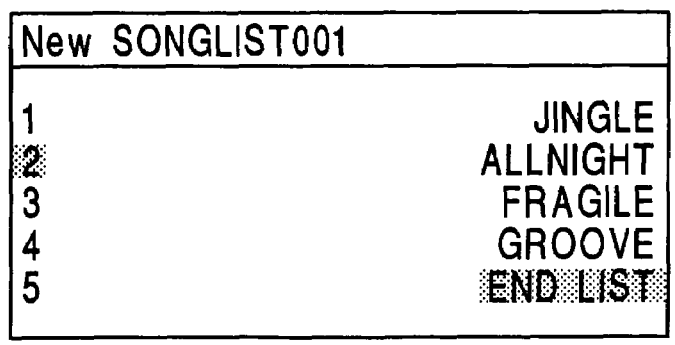
FIG. 11  List Edit Screen
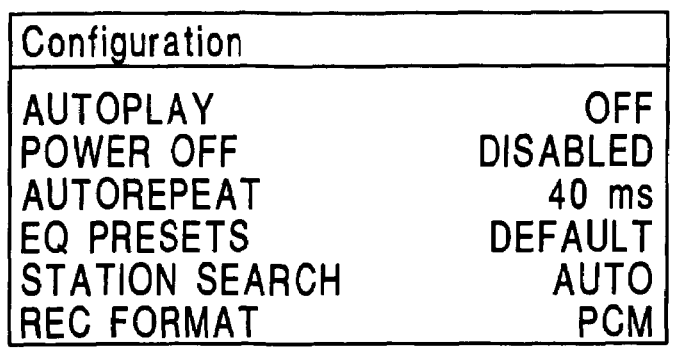
FIG. 12  Configuration Screen Alternative User Interface for I-Way Mode Alternative 3D Music Stage Interface

| Parameter | Values | Description |
|---|---|---|
| AutoPlay | On/Off | If AutoPlay is On, the MadPlayer automatically starts playing the first Play list contained on a SmartMedia card when inserted. |
| Power Off | Disabled, 1mn to 60mn in steps of 1mn. | Auto power off delay. The MadPlayer will power off automatically after this delay if no user action is detected. |
| AutoRepeat | 40ms to 600ms in steps of 20ms | Keyboard auto-repeat delay in milliseconds. Delay before repeating the corresponding action when a key is pressed continuously. |
| EQ Preset | Factory Woof Hitek Flat User | Presets for 4-band equalizer. Factory, Woof, HiTek and Flat are factory presets and fixed. User preset can be configured by the User via the System-Equalizer menu. |
| Mic State | On/Off | Microphone input is On or Off. |
| Mic Volume | 0 to 31 | Microphone volume. |
| Echo Level | 0 to 127 | Level of echo applied to microphone input |
| Echo Time | 0 to 127 | Microphone echo delay. 0 shortest, 127 longest. |
| Echo Feedbk | 0 to 31 | Echo feedback: 0 minimum feedback, 127 maximum feedback. |
| Rec Format | PCM HQFADPCM | Format used to store recorded samples: PCM: PCM, 16bits mono, 19.31kHz HQFADPCM: High Quality ADPCM |
| Language | English Francais Espanol | Language used for the menus. |
| Sort Files | By Name By Type | Criterion used to sort files when displaying a list: by name (alphabetically) or by type (songs, samples, lists...). |
| Sort Presets | By Name By Freq | Criterion used to sort radio presets: by name (alphabetically) or by frequency. |
| Product | String | Read Only. Hardware version |
| Release | String | Read Only. Firmware version |

Configuration Parameters

FIG. 14

Song Structure

| Hexadecimal Value | Internal Nomenclature | Potential Values |
|---|---|---|
| 40 | Base Note | C, E, G, B |
| 41 | Magic Note 1 | +1, −1, +2, −2 |
| 42 | Magic Note 0 | +1, −1, +2, −2, 0 |
| 43 | High Note | +7 |
| 44 | Last Note | C, G |
| 45 | One Before Last Note | E, G, B |
| 46 | ALC Controller<br>• Harmonic Note<br>• Fixed Note | <br>0, +2, +4, +6, -3, -5, -7<br>any |

Examples of Virtual Notes/Controllers

FIG. 17

Example of Tessitura

|        | Key |   |    |    |
| --- | --- | --- | --- | --- |
|        | A  | C | D  | G  |
| Chord  |    |   |    |    |
| Offset | -3 | 0 | +2 | +8 |

FIG. 19

| Mode Type | Individual Notes | | | | | | | | | | |
| --- | --- | --- | --- | --- | --- | --- | --- | --- | --- | --- | --- |
| All Notes | C | C# | D | D# | E | F | F# | G | G# | A | A# | B |
| Natural | C | C | D | D | E | F | F | G | G | A | A | B |
| Lydian Descending | C | C | D | D | E | E | F# | G | G | A | A | B |
| Lydian Ascending | C | D | D | E | E | F# | F# | G | A | A | A | B |

FIG. 20

| | Musical Notation | Software Notation (QN=30) |
|---|---|---|
| Virtual Pattern Sub-Blocks |  | C4 = Base Note<br>F#4 = Magic Note Type 1<br>D4 = Magic Note Type 0<br>C#4 = High Note<br>C4 = Base Note |
| Virtual Pattern (VP) |  | 00 91 30 70 1e 81 30<br>00 91 36 64 1e 81 36<br>00 91 32 7f 1e 81 32<br>00 91 31 72 1e 81 31<br>3C 91 30 64 2d 81 30 |
| Non-Chorded Pattern (NCP) |  | 00 91 34 70 1e 81 34<br>00 91 32 64 1e 81 32<br>00 91 32 7f 1e 81 32<br>00 91 3e 72 1e 81 3e<br>3C 91 37 64 2d 81 37 |
| NCP with Tonic (PwT) | 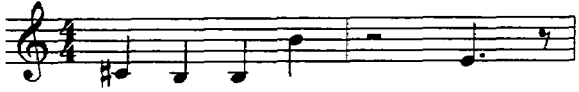 | 00 91 31 70 1e 81 31<br>00 91 2f 64 1e 81 2f<br>00 91 2f 7f 1e 81 2f<br>00 91 3b 72 1e 81 3b<br>3C 91 34 64 2d 81 34 |
| PwT with Mode (PwTM) |  | 00 91 30 70 1e 81 30<br>00 91 2f 64 1e 81 2f<br>00 91 2f 7f 1e 81 2f<br>00 91 3b 72 1e 81 3b<br>3C 91 34 64 2d 81 34 |
| Real Pattern (RP) | 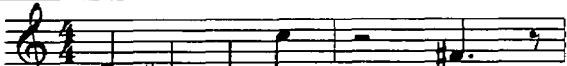 | 00 91 32 70 1e 81 32<br>00 91 31 64 1e 81 31<br>00 91 31 7f 1e 81 31<br>00 91 3d 72 1e 81 3d<br>3C 91 36 64 2d 81 36 |

Example of VP-to-RP Flow

FIG. 21

| Rhythmic Blocks/Sub-Blocks | Conditions |
|---|---|
| (musical notation examples) | All variations, given:<br>• eighth note is smallest unit<br>• length of 1 quarter note<br>• all full rests are indicated separately as 'empty' |
| (musical notation examples) | All variations, given:<br>• eighth note is smallest unit<br>• length of 2 quarter notes<br>• does not include 1 quarter note variations above |

Relative Rhythmic Density

Rhythmic Variations based on Duration

FIG. 22

Relative Mobility of Note Pitch

Pattern Structure Creation Example

Block Structure Creation Example

Pseudo-Random Number Implementation 1

Pseudo-Random Number Implementation 2

| Application Revision | Firmware/application version used to generate the data structure |
|---|---|
| Style, SubStyle | The style and/or substyle |
| Sound Bank, Synth Type | The sound bank/synth type |
| Sample Frequency | How often a sample is played in song |
| Sample List | List of samples associated with the Style |
| Key | First Key used, pitch offset |
| Tempo | Start Tempo (e.g., in pulses per quarter note) |
| Instrument | Identification of a particular instrument in an instrument group. Indexed by type of instrument |
| State | State of instrument indexed by instrument type (e.g., muted, un-muted, normal, Forced play, solo, etc.) |
| Parameter | Instrument parameters indexed by instrument type (e.g., volume, pan, timbre, etc.) |
| PRNG Seed Values | Seed values used to initialize the PRNG routines |

Simple Data Structures

FIG. 28

Example of SDS Flow

| Application Revision | Firmware/application version used to generate the data structure |
|---|---|
| Style, SubStyle | The style and/or substyle |
| Sound Bank, Synth Type | The sound bank/synth type |
| Sample Frequency | How often a sample is played in song |
| Sample List | List of samples associated with the Style |
| Key | First Key used, pitch offset |
| Tempo | Start Tempo (e.g., in pulses per quarter note) |
| Song Structure | Number of types, number of parts, sequence of parts, etc. |
| Structure | For every part: number of sub-parts, sequence of sub-parts, etc. Indexed by Part |
| Filtered Track | Type, function (e.g., sawtooth wave, sine wave, square wave, etc.), initial value, etc., of an effect. Indexed by Part. |
| Progression | Time signature, number of SEQs, list of maked types, etc. Indexed by Sub-Part. |
| Chord | Time stamp, chord vector, key note, progression mode, etc. Indexed by Sub-Part. |
| Pattern | Combination (Instrument), block data, effects data, etc. Indexed by Type. |
| Combination | List of instruments. Sub-set of 'Pattern' above. |
| FX Pattern | Effects data. Sub-set of 'Pattern' above. |
| Blocks | Block data. Subset of 'Pattern' above. |
| Instrument | Identification of a particular instrument in an instrument group. Indexed by type of instrument |
| State | State of instrument indexed by instrument type (e.g., muted, un-muted, normal, Forced play, solo, etc.) |
| Parameter | Instrument parameters indexed by instrument type (e.g., volume, param1, param2, etc.) |
| Improv | Improvisation data (e.g., certain instruments or notes) that might be different each time the song is played. |

Complex Data Structures

FIG. 30

Example of CDS Flow

Additional Variation

Address Map for MP RAM

DSP-Local RAM/Flash Address Space

Bootstrap Mode Addressing

| BOOT | CS_ROM | A24 CS_RAM | 0 | | 1 | | |
|---|---|---|---|---|---|---|---|
| | | | 0 | 1 | 0 | 1 | |
| 0 | 0 | | NA | NA | Flash | RAM | Normal Mode |
| 0 | 1 | | RAM | RAM | NS | NS | |
| 1 | 0 | | NA | NA | RAM | Flash | Upgrade Mode |
| 1 | 1 | | NA | NA | NS | NS | |

CS_RAM and CS_ROM are active low

NS = Nothing Selected

NA = Not Applicable

FIG. 38

MIDI/Audio Stream

Simplified MIDI/Audio Stream Timeline

|    | NRPN Stream (Hexadecimal) | Indication/Meaning |
|----|---------------------------|---------------------|
| 1  | B0 | Channel Number |
| 2  | 63 | NRPN Controller A (e.g., audio sample type) |
| 3  | 40 | Identification of sample type (e.g., long, short, stereo, mono, etc.) |
| 4  | 00 | Delta time |
| 5  | 62 | NRPN Controller B (e.g., audio effects type) |
| 6  | 00 | Identification of effects type (ping pong, ripple, phaser, distortion, etc.) |
| 7  | 00 | Delta time |
| 8  | 06 | Identification of register for NRPN Controller A value |
| 9  | 03 | NRPN Controller A value (play 3$^{rd}$ audio sample in set, '00' is random) |
| 10 | 00 | Delta time |
| 11 | 26 | Identification of register for NRPN Controller B value |
| 12 | 07 | NRPN Controller B value (apply audio effect #7, '00' is random) |

Simplified NRPN Example

FIG. 41

Simplified Special MIDI Type File

| SLS Header | Slot 0 | Slot 1 | ... | Slot N-1 |
|---|---|---|---|---|

Slotted Structure

FIG. 47

| Header Length (= 14) | Checksum | SLS Shade | SLS Type | SLS Version | Data Length Length (= n1) | Num Slots (= N) |
|---|---|---|---|---|---|---|
| 2 bytes | 2 bytes | 2 bytes | 2 bytes | 2 bytes | 2 bytes | 2 bytes |

SLS Header

FIG. 48

| Slot Type | Name Length (= n2) | Name | Data Length (= n3) | Data |
|---|---|---|---|---|
| 2 bytes | 2 bytes | n2 bytes | n1 bytes | n3 bytes | where n1 = Data Length Length value in SLS Header.

Slot Format

FIG. 49

Node/Subscriber Unit Radio Style Selection

Node/Subscriber Unit Functional Blocks

| Application Revision | Firmware/application version used to generate the data structure |
|---|---|
| Style, SubStyle | The style and/or substyle (and/or Radio Station Style) |
| Sound Bank, Synth Type | The sound bank/synth type |
| Sample Frequency | How often a sample is played in song |
| Sample List | List of samples associated with the Style |
| Key | First Key used, pitch offset |
| Tempo | Start Tempo (e.g., in pulses per quarter note) |
| Song Structure | Number of types, number of parts, sequence of parts, etc. |
| Structure | For every part: number of sub-parts, sequence of sub-parts, etc. Indexed by Part |
| Filtered Track | Type, function (e.g., sawtooth wave, sine wave, square wave, etc.), initial value, etc., of an effect. Indexed by Part. |
| Progression | Time signature, number of SEQs, list of maked types, etc. Indexed by Sub-Part. |
| Chord | Time stamp, chord vector, key note, progression mode, etc. Indexed by Sub-Part. |
| Pattern | Combination (Instrument), block data, effects data, etc. Indexed by Type. |
| Combination | List of instruments. Sub-set of 'Pattern' above. |
| FX Pattern | Effects data. Sub-set of 'Pattern' above. |
| Blocks | Block data. Subset of 'Pattern' above. |
| Instrument | Identification of a particular instrument in an instrument group. Indexed by type of instrument |
| State | State of instrument indexed by instrument type (e.g., muted, un-muted, normal, Forced play, solo, etc.) |
| Parameter | Instrument parameters indexed by instrument type (e.g., volume, param1, param2, etc.) |
| PRNG Seed Values | Preferably a series of numerical values that are used to initialize the pseudo-random number generation (PRNG) routines (used in certain embodiments). |
| Sound Bank Data | Soundbank data associated with a particular song; preferably loaded into non-volatile memory such that the sound bank data may be used during the generation of music output. |

Example Music Data File

Figure 59

Example of Music Generation Flow

| Data Services | Description |
|---|---|
| TIA/EIA IS-95A | Mobile Station-Base Station Compatibility standard for Dual-Mode Wideband Spread Spectrum Cellular System |
| TIA/EIA IS-99 | Data Service Option standard for Wideband Spread Spectrum Digital Cellular System |
| TIA/EIA IS-637 | Short Message Service for Wideband Spread Spectrum Cellular System |
| TIA/EIA IS-657 | Packet Data Service Optional standard for Wideband Spread Spectrum Systems |
| TIA/EIA IS-658 | Data Services Interworking Function Interface for Wideband Spread Spectrum Systems |
| TIA/EIA IS-707 | Short Message Service 14.4 Kbps |
| TIA/EIA TSB-79 | Short Message Service for Wideband Spread Spectrum Systems |
| TIA/EIA TSB39-A | Message Type Assignments |

Exemplary Standards associated with

Cellular Data transmission/Reception Services

Fig. 61

SMS Broadcast Message Parameters

| Parameter | Type |
|---|---|
| Broadcast Service Category | Mandatory |
| Bearer Data | Optional |

The Bearer Data parameter variable-length format:

| Field | Length (bits) |
|---|---|
| PARAMETER_ID | 8 |
| PARAMETER_LEN | 8 |
| One or more occurrences of the following subparameter record: | |
| SUBPARAMETER_ID | 8 |
| SUBPARAM_LEN | 8 |
| Subparameter Data | 8 ∞ SUBPARAM_LEN |

PARAMETER_ID: SMS parameter identifier. This field shall be set to '00001000'.

PARAMETER_LEN: SMS message parameter length. This field shall be set to the number of octets in the parameter, not including the PARAMETER_ID and PARAMETER_LEN fields.

SUBPARAMETER_ID: Subparameter identifier.

SUBPARAM_LEN: Subparameter length. This field shall be set to the number of octets in the subparameter, not including the SUBPARAMETER_ID and SUBPARAM_LEN fields.

Subparameter Data: Subparameter data fields.

Exemplary Excerpts from
TIA/EIA IS-637 Short Message Service for Wideband
Spread Spectrum Cellular System

Fig. 62

SYSTEMS AND METHODS FOR CREATING, MODIFYING, INTERACTING WITH AND PLAYING MUSICAL COMPOSITIONS

This application is a continuation of application Ser. No. 10/337,753, filed on Jan. 7, 2003 now U.S. Pat. No. 7,169,996, which is a continuation-in-part of application Ser. No. 10/293,737, filed on Nov. 12, 2002, now U.S. Pat. No. 7,102,069.

FIELD OF THE INVENTION

The present invention relates to systems and methods for creating, modifying, interacting with and playing music, and more particularly to systems and methods employing a top-down and interactive auto-composition process, where the systems/methods provide the user with a musical composition that may be modified and interacted with and played and/or stored (for later play) in order to create music that is desired by the particular user. Furthermore, the present invention relates to systems and methods for auto-generated music, and more particularly to systems and methods for generating a vocal track as part of an algorithmically-generated musical composition. Furthermore, the present invention relates to a file format suitable for storing information in a manner which preferably provides forward and/or backwards compatibility. Furthermore, the present invention relates to systems and methods for algorithmic music generation, and more particularly to improved sample format and control functions, which preferably enable the general conformance of a sound sample to the current pitch and/or rhythmic characteristics of a musical composition. Furthermore, the present invention relates to systems and methods for broadcasting music, and more particularly to systems and methods employing a data-file-based distribution system, where at least portions of the music can be generated by a node/subscriber unit upon reception of a data file, which is processed using a music generation system that preferably composes music based on the data file. Additionally, the present invention relates to such systems and methods wherein music data files can be authored or modified by a node/subscriber unit and shared with others, preferably over a cellular or other wireless network.

BACKGROUND OF THE INVENTION

A large number of distinct musical styles have emerged over the years, as have systems and technologies for creating, storing, and playing back music in accordance with such styles. Music creation, particularly of any quality, typically has been limited to persons who have musical training or who have expended the time and energy required to learn and play one or more instruments. Systems for creating and storing quality musical compositions have tended towards technologies that utilize significant computer processing and/or data storage. More recent examples of such technologies include compact disc (CD) audio players and players of compressed files (for instance as per the MPEG-level 3 standard), etc. Finally, there exist devices incorporating a tuner, which permit reception of radio broadcasts via electromagnetic waves, such as FM or AM radio receivers.

Electronics and computer-related technologies have been increasingly applied to musical instruments over the years. Musical synthesizers and other instruments of increasing complexity and musical sophistication and quality have been developed, a "language" for conversation between such instruments has been created, which is known as the MIDI (Musical Instrument Digital Interface) standard. While MIDI-compatible instruments and computer technologies have had a great impact on the ability to create and playback or store music, such systems still tend to require substantial musical training or experience, and tend to be complex and expensive.

A sound generator system can incorporate samples of existing sounds that are played in combination with interactively generated sounds. As an example, a portable music generation product can preferably be used to interactively generate music according to certain musical rules. It is preferable to also enable the use of pre-recorded sound samples to facilitate a more compelling musical experience for the user.

One problematic aspect of supporting the use of pre-recorded sound samples is that the playback of the sample during a section of music can sometimes sound out of sync with the music in terms of pitch or rhythm. This is a result of the lack of a default synchronization between the sample and the music at a particular point in time. One way around this is to use samples that do not have a clear pitch or melody, e.g., a talking voice, or a sound effect. However, as the use of melodic samples, especially at higher registers, is desirable in many styles of music, it is desirable in certain cases to have a means for associating pitch and/or periodicity information (embedded or otherwise) into a sample.

Broadcast music distribution historically has involved the real-time streaming of music over the airwaves using an FM or AM broadcasting channel. Similarly, the Internet has been used for audio streaming of music data in an approximately real time manner. Both of these examples involve steadily sending relatively large amounts of data, and consume relatively large amounts of the available bandwidth. The number of music styles and the amount of bandwidth required to make effective use of these systems have limited the usefulness of these approaches to a broad range of new products incorporating wireless computing resources (e.g., cellular telephones and/or personal data assistants (PDAs)). In addition, the limitations of these approaches to music distribution make it inordinately difficult to enable a node/subscriber unit to share music, either as part of the radio-type distribution of music, or with other node/subscriber units directly, and in particular music that has been authored or modified by a user of the node/subscriber unit.

In the field of the present invention it is often the case that a file format suitable for storing information associated with the presently discussed inventions does not provide an optimized set of features. As one example, forward and/or backward compatibility is often not achievable, resulting in a music file that cannot be effectively used by a system with a different version than the system that created it. File formats that do provide some level of forwards and/or backwards compatibility often incorporate overhead (e.g., multiple versions of 'same' data) that may be undesirable, e.g., in certain preferred embodiments that are portable and that therefore have relatively limited resources.

Accordingly, it is an object of the present invention to provide systems and methods for creating, modifying, interacting with and/or playing music employing a top-down process, where the systems/methods provide the user with a musical composition that may be modified and interacted with and played and/or stored (for later play) in order to create music that is desired by the particular user.

It is another object of the present invention to provide systems and methods for creating, modifying, interacting with and/or playing music that enables a user to quickly begin creating desirable music in accordance with one or a variety of musical styles, with the user modifying an auto-composed or previously created musical composition, either for a real time performance and/or for storing and subsequent playback.

It is another object of the present invention to provide systems and methods for creating, modifying, interacting with and/or playing music in which a graphical interface is provided to facilitate use of the system and increase user enjoyment of the system by having graphic information presented in a manner that corresponds with the music being heard or aspects of the music that are being modified or the like; it also is an object of the present invention to make such graphic information customizable by a user.

It is another object of the present invention to provide systems and methods for creating, modifying, interacting with and/or playing music in which a graphical interface is provided that presents a representation of a plurality of musical lanes, below each of which is represented a tunnel, in which a user may modify musical parameters, samples or other attributes of the musical composition, with such modifications preferably being accompanied by a change in a visual effect.

It is another object of the present invention to provide systems and methods for creating, modifying, interacting with and/or playing music in which music may be represented in a form to be readily modified or used in an auto-composition algorithm or the like, and which presents reduced processing and/or storage requirements as compared to certain conventional audio storage techniques.

It is another object of the present invention to provide systems and methods for creating, modifying, interacting with and/or playing music in which music may be automatically composed in a variety of distinct musical styles, where a user may interact with auto-composed music to create new music of the particular musical style, where the system controls which parameters may be modified by the user, and the range in which such parameters may be changed by the user, consistent with the particular musical style.

It is another object of the present invention to provide systems and methods for creating, modifying, interacting with and/or playing music based on efficient song structures and ways to represent songs, which may incorporate or utilize pseudo-random/random events in the creation of musical compositions based on such song structures and ways to represent songs.

It is another object of the present invention to provide systems and methods for creating, modifying, interacting with and/or playing music in which songs may be efficiently created, stored and/processed; preferably songs are represented in a form such that a relatively small amount of data storage is required to store the song, and thus songs may be stored using relatively little data storage capacity or a large number of songs may be stored in a given data storage capacity, and songs may be transmitted such as via the Internet using relatively little data transmission bandwidth.

It is another object of the present invention to provide systems and methods for creating, modifying, interacting with and/or playing music in which a modified MIDI representation of music is employed, preferably, for example, in which musical rule information is embedded in MIDI pitch data, musical rules are applied in a manner that utilize relative rhythmic density and relative mobility of note pitch, and in which sound samples may be synchronized with MIDI events in a desirable and more optimum manner.

It is another object of the present invention to provide systems and methods for creating, modifying, interacting with and/or playing music in which a hardware/software system preferably includes a radio tuner so that output from the radio tuner may be mixed, for example, with auto-composed songs created by the system, which preferably includes a virtual radio mode of operation; it also is an object of the present invention to provide hardware that utilizes non-volatile storage media to store songs, song lists and configuration information, and hardware that facilitates the storing and sharing of songs and song lists and the updating of sound banks and the like that are used to create musical compositions.

It is another object of the present invention to provide systems and methods for creating, modifying, interacting with and/or playing music that works in conjunction with a companion PC software program that enables users to utilize the resources of a companion PC and/or to easily update and/or share Play lists, components of songs, songs, samples, etc.

It is another object of the present invention to provide systems and methods for creating, modifying, interacting with and/or playing music in which songs may be generated, exchanged and disseminated, preferably or potentially on a royalty free basis.

It is another object of the present invention to provide systems and methods for creating, modifying, interacting with and/or playing music that may be adapted to a variety of applications, systems and processes in which such music creation may be utilized.

It is another object of the present invention to provide systems and methods for automatically generating a human vocal track as part of a musical piece that is being algorithmically generated.

It is another object of the present invention to provide systems and methods for improved sample format and control functions, preferably to enable the general conformance of a sound sample to the current pitch and/or rhythmic characteristics of a musical piece.

It is an object of the present invention to provide systems and methods for distributing, broadcasting, and/or sharing music employing a node-based music generation process, where the systems/methods enable the user to receive (via the node/subscriber unit) and/or author or modify a data file from which the music may be composed.

It is an object of the present invention to enable music data to be broadcast or transmitted over a cellular or other wireless network.

Finally, it is an object of the present invention to provide an efficient backward and/or forward compatible file format. The advantages of such a file format may be of particular benefit when used in association with certain of the preferred embodiments disclosed herein.

SUMMARY OF THE INVENTION

The present invention addresses such problems and limitations and provides systems and methods that may achieve such objects by providing hardware, software, musical composition algorithms and a user interface and the like (as hereinafter described in detail) in which users may readily create, modify, interact with and play music. In a preferred embodiment, the system is provided in a handheld form factor, much like a video or electronic game. A graphical display is provided to display status information, graphical representations of musical lanes or components, which preferably vary in shape, color or other visual attribute as musical parameters and the like are changed for particular instruments or musical components such as a microphone input, samples, etc. The system preferably operates in a variety of modes such that users may create, modify, interact with and play music of a desired style, including an electronic DJ ("e-DJ") mode, a virtual radio mode, a song/song list playback mode, sample create/playback mode and a system mode, all of which will be described in greater detail hereinafter.

Preferred embodiments employ a top-down process, where the system provides the user with in effect a complete musical composition, basically a song, that may be modified and interacted with and played and/or stored (for later play) in order to create music that is desired by the particular user. Utilizing an auto-composition process employing musical rules and preferably a pseudo random number generator, which may also incorporate randomness introduced by timing of user input or the like, the user may then quickly begin creating desirable music in accordance with one or a variety of musical styles, with the user modifying the auto-composed (or previously created) musical composition, either for a real time performance and/or for storing and subsequent playback.

A graphical interface preferably is provided to facilitate use of the system and increase user enjoyment of the system by having graphic information presented in a manner that corresponds with the music being heard or aspects of the music that are being modified or the like. An LCD display preferably is used to provide the graphical user interface, although an external video monitor or other display may be used as an addition or an alternative. In preferred embodiments, such graphic information is customizable by a user, such as by way of a companion software program, which preferably runs on a PC and is coupled to the system via an interface such as a USB port. For example, the companion software program may provide templates or sample graphics that the user may select and/or modify to customize the graphics displayed on the display, which may be selected and/or modified to suit the particular user's preferences or may be selected to correspond in some manner to the style of music being played. In one embodiment, the companion software program provides one or more templates or sample graphics sets, wherein the particular template(s) or sample graphic set(s) correspond to a particular style of music. With such embodiments, the graphics may be customized to more closely correspond to the particular style of music being created or played and/or to the personal preferences of the user.

The graphical interface preferably presents, in at least one mode of operation, a visual representation of a plurality of musical lanes or paths corresponding to components (such as particular instruments, samples or microphone input, etc.). In addition to allowing the user to visualize the various components of the musical composition, through user input (such as through a joystick movement) the user may go into a particular lane, which preferably is represented visually by a representation of a tunnel. When inside of a particular tunnel, a user may modify musical parameters, samples or other attributes of the musical composition, with such modifications preferably being accompanied by a change in a visual effect that accompany the tunnel.

In accordance with preferred embodiments, music may be automatically composed in a variety of distinct musical styles. The user preferably is presented with a variety of pre-set musical styles, which the user may select. As a particular example, in e-DJ mode, the user may select a particular style from a collection of styles (as will be explained hereinafter, styles may be arranged as "style mixes" and within a particular style mix one or more particular styles, and optionally substyles or "microstyles." After selection of a particular style or substyle, with a preferably single button push (e.g., play) the system begins automatically composing music in accordance with the particular selected style or substyle. Thereafter, the user may interact with the auto-composed music of the selected style/substyle to modify parameters of the particular music (such as via entering a tunnel for a particular component of the music), and via such modifications create new music of the particular musical style/substyle. In order to facilitate the creation of music of a desirable quality consistent with the selected style/substyle, the system preferably controls which parameters may be modified by the user, and the range over which such parameters may be changed by the user, consistent with the particular musical style/substyle. The system preferably accomplishes this via music that may be represented in a form to be readily modified or used in an auto-composition algorithm or the like. The musical data representation, and accompanying rules for processing the musical data, enable music to be auto-composed and interacted with in a manner that presents reduced processing and/or storage requirements as compared to certain conventional audio storage techniques (such as CD audio, MP3 files, WAV files, etc.).

In accordance with certain embodiments, the system operates based on efficient song structures and ways to represent songs, which may incorporate or utilize pseudo-random/random events in the creation of musical compositions based on such song structures and ways to represent songs. Songs may be efficiently created, stored and/or processed, and preferably songs are represented in a form such that a relatively small amount of data storage is required to store the song. Songs may be stored using relatively little data storage capacity or a large number of songs may be stored in a given data storage capacity, and songs may be transmitted such as via the Internet using relatively little data transmission bandwidth. In preferred embodiments, a modified MIDI representation of music is employed, preferably, for example, in which musical rule information is embedded in MIDI pitch data, and in which sound samples may be synchronized with MIDI events in a desirable and more optimum manner.

The system architecture of preferred embodiments includes a microprocessor or microcontroller for controlling the overall system operation. A synthesizer/DSP is provided in certain embodiments in order to generate audio streams (music and audio samples, etc.). Non-volatile memory preferably is provided for storing sound banks. Preferably removable non-volatile storage/memory preferably is provided to store configuration files, song lists and samples, and in certain embodiments sound bank optimization or sound bank data. A codec preferably is provided for receiving microphone input and for providing audio output. A radio tuner preferably is provided so that output from the radio tuner may be mixed, for example, with auto-composed songs created by the system, which preferably includes a virtual radio mode of operation. The system also preferably includes hardware and associated software that facilitates the storing and sharing of songs and song lists and the updating of sound banks and the like that are used to create musical compositions.

In alternative embodiments, the hardware, software, musical data structures and/or user interface attributes are adapted to, and employed in, a variety of applications, systems and processes in which such music creation may be utilized.

In certain embodiments, the present invention involves improved systems and methods for formatting and controlling the playback of pre-recorded samples during the algorithmic generation of music. At least certain of the benefits of the present invention preferably can be achieved through the use of pitch and/or rhythmic characteristic information associated with a given sample. Preferably, such information can optionally be used during the playback of a sample in music, as part of a process that preferably involves using DSP-functionality to alter the playback of the sample, preferably to enable the progression of rhythm and/or pitch of the sample to more desirably conform to the music.

In accordance with certain preferred embodiments of the present invention, the problem of pre-recorded sound samples sounding out of sync with the music in terms of pitch or rhythm can be substantially addressed, without limiting the samples to those that do not have a clear pitch or melody, e.g., a talking voice, or a sound effect. As the use of melodic samples, especially at higher registers, is desirable in many styles of music, even algorithmic or other autocomposed music, it is desirable to have the ability to associate pitch and/or periodicity information (embedded or otherwise) into a sample. Such information can then be interpreted by the musical rules and/or algorithm of the music device to enable a synchronization of the sample to the particular pitch, melody, and/or periodic characteristics of the musical piece.

In accordance with certain preferred embodiments of the present invention, problems associated with broadcast music are addressed by providing systems and methods for broadcasting music, and more particularly systems and methods employing data-file-based distribution, in which at least portions of the music can be generated by a node/subscriber unit upon reception of a data file, which is processed using a music generation system, which preferably composes music based on the data file. The present invention preferably makes use of node-based music generation. By incorporating the generation of the music into a node/subscriber unit, the bandwidth-intensive techniques of the prior art can be avoided. Consequently, the bandwidth also can be used for things such as node-to-node and node-to-base music data transmission features. For example, the node may create or modify a previously received or generated data file from which music may be generated, and the data file created or modified data file may be transmitted from the node to another node, or from the node to a base station, where it may be broadcast or transmitted to one or a plurality of nodes. The present invention is characterized by a relatively small data file transmission that contains various parameters sufficient to describe or define the music that subsequently will be generated. Such a file is then received and used by one or more node/subscriber units to render the music using various music generation and signal processing functions.

Such aspects of the present invention will be understood based on the detailed description to follow hereinafter.

BRIEF DESCRIPTION OF THE DRAWINGS

The above objects and other advantages of the present invention will become more apparent by describing in detail the preferred embodiments of the present invention with reference to the attached drawings in which:

FIGS. 2-3 illustrate exemplary preferred function and mode keys in accordance with the present invention;

FIGS. 4-13B illustrate exemplary preferred screens of the graphical user interface in accordance with the present invention;

FIG. 14 is a table illustrating exemplary configuration parameters used in accordance with certain preferred embodiments of the present invention;

FIG. 17 is a table illustrating exemplary virtual notes/controllers utilized in certain preferred embodiments of the present invention;

FIG. 19 illustrates principles of encoding musical key changes preferably as offsets, which is utilized in accordance with preferred embodiments of the present invention;

FIG. 20 illustrates a mode application musical rule that preferably is part of the overall process in accordance with preferred embodiments of the present invention;

FIG. 21 illustrates an exemplary preferred virtual pattern to real pattern flow utilized in preferred embodiments of the present invention;

FIG. 22 illustrates principles of relative rhythmic density utilized in accordance with certain embodiments of the present invention;

FIG. 28 illustrates attributes of simple data structures utilized in accordance with certain preferred embodiments of the present invention;

FIG. 30 illustrates attributes of complex data structures utilized in accordance with certain preferred embodiments of the present invention;

FIGS. 37-38 illustrate the use of a DSP bootstrap/addressing technique utilized in accordance with certain preferred embodiments of the present invention;

FIGS. 41-42 illustrate the use of Non-Registered Parameter Number for purposes of synchronizing MIDA events and audio samples in accordance with certain preferred embodiments of the present invention;

FIGS. 47-49 illustrate certain exemplary preferred embodiments associated with a file format;

FIG. 59 illustrates exemplary parameter data associated with an exemplary music data file in accordance with certain embodiments of the present invention;

FIG. 61 illustrates certain of the exemplary communications standards associated with cellular data transmission/reception services utilized in accordance with certain embodiments of the present invention; and FIG. 62 illustrates certain exemplary excerpts from IS-637, as preferred examples of aspects of a broadcast format utilized in accordance with certain embodiments of the present invention.

DETAILED DESCRIPTION OF EXEMPLARY PREFERRED EMBODIMENTS

Figure 1:
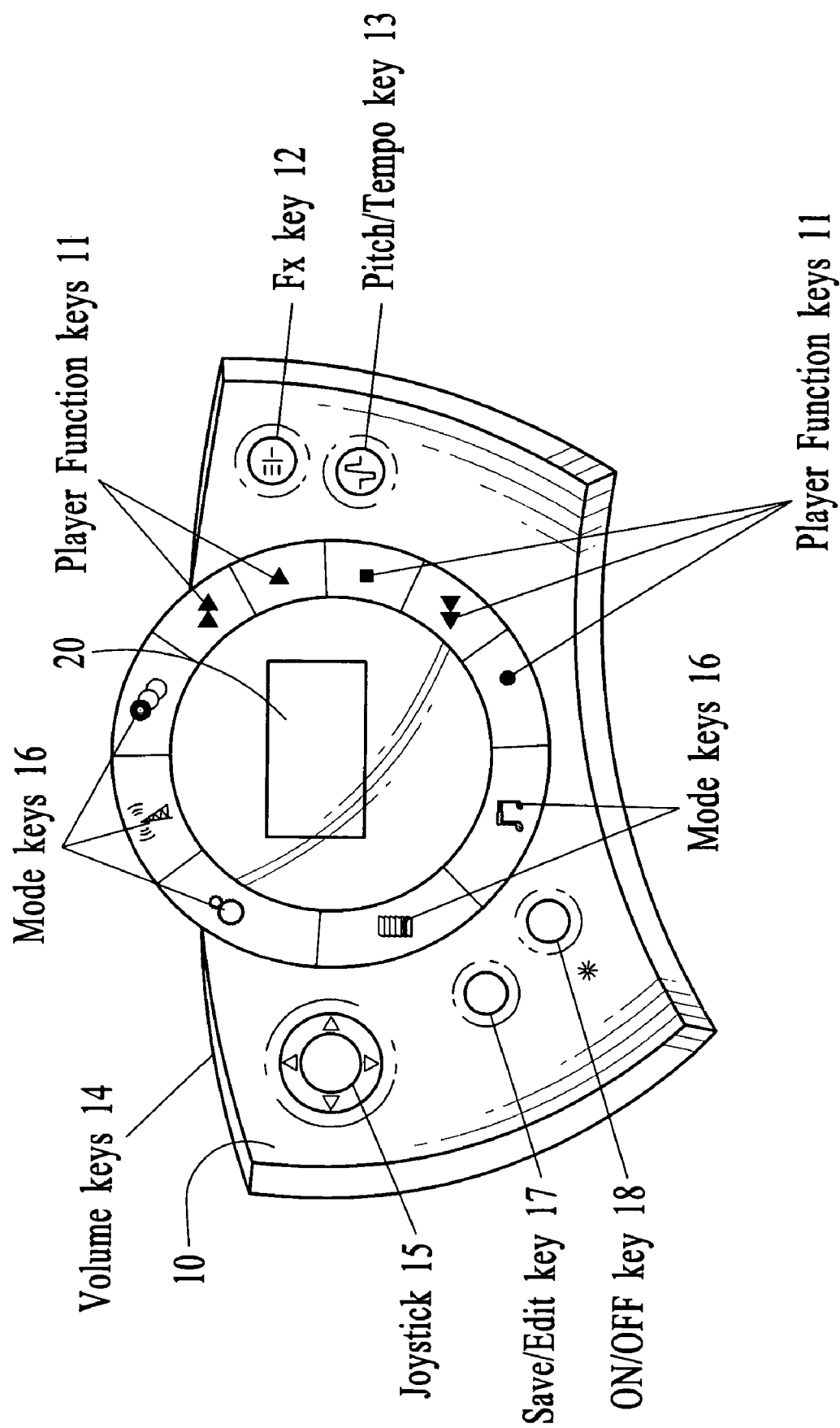
FIG. 1 illustrates an exemplary preferred embodiment of a "Player" in accordance with the present invention.

The present invention will be described in greater detail with reference to certain preferred and certain other embodiments, which may serve to further the understanding of preferred embodiments of the present invention. As described elsewhere herein, various refinements and substitutions of the various elements of the various embodiments are possible based on the principles and teachings herein.

In accordance with the present invention, music may be created (including by auto-composition), interacted with, played and implemented in a variety of novel ways as will be hereinafter described via numerous exemplary preferred and alternative embodiments. Included in such embodiments are what may be considered as top-down approaches to musical creation. Top-down as used herein generally means that a complete song structure for quality music is created for the end user as a starting point. This enables the user to immediately be in position to create quality music, with the user then having the ability to alter, and thereby create new music, based on the starting point provided by the system. Where a particular user takes the music creation process is up to them. More conventional musical creation processes involve a bottom-up approach, wherein the rudiments of each instrument and musical Style are learned, and then individual notes are put together, etc. This conventional approach generally has the side-effect of limiting the musical creation to a small group of trained people, and has, in effect, barred the wider population from experiencing the creative process with music.

A useful analogy for purposes of understanding embodiments of the present invention is that of building a house. In the conventional means of house-building, the user is given a bunch of bricks, nails, wood, and paint. If you want a house, you need to either learn all the intricacies of how to work with each of these materials, as well as electrical wiring, plumbing, engineering, etc., or you need to find people who are trained in these areas. Similarly, in musical creation, if you want a song (that is pleasing), you need to learn all about various types of musical instruments (and each of their unique specialties or constraints), as well as a decent amount of music theory, and acquire a familiarity with specific techniques and characteristics in a given Style of music (such as techno, jazz, hip-hop, etc.).

It would, of course, be far more convenient if, when someone wanted a house, they were given a complete house that they could then easily modify (with the press of a button). For example, they could walk into the kitchen and instantly change it to be larger, or a different color, or with additional windows. And they could walk into the bathroom and raise the ceiling, put in a hot tub, etc. They could walk into the living room and try different paint schemes, or different furniture Styles, etc. Similarly, in accordance with embodiments of the present invention, the user desirably is provided with a complete song to begin with, they can then easily modify, at various levels from general to specific, to create a song that is unique and in accordance with the user's desires, tastes and preferences.

In accordance with the present invention, the general population of people readily may be provided with an easy approach to musical creation. It allows them the immediate gratification of a complete song, while still allowing them to compose original music. This top down approach to musical creation opens the world of musical creativity to a larger group of people by reducing the barriers to creating pleasurable music.

In accordance with the present invention, various systems and methods are provided that enable users to create music. Such systems and methods desirably utilize intuitive and easy to learn and use user interfaces that facilitate the creation of, and interaction with, music that is being created, or was created previously. Various aspects of one example of a preferred embodiment for a user interface in accordance with certain preferred embodiments of the present invention will now be described.

In accordance with such preferred embodiments of the present invention, user interface features are provided that desirably facilitate the interactive generation of music. The discussion of such preferred embodiments to be herein after provided are primarily focused on one example of a handheld, entry-level type of device, herein called 'Player'. However, many of the novel and inventive features discussed in connection with such a Player relate to the visual enhancement of the control and architecture of the music generation process; accordingly they can apply to other types of devices, such as computing devices, web server/websites, kiosks, video, or other electronic games and other entertainment devices that allow music creation and interaction, and thus also may benefit from such aspects of the present invention. A discussion of certain of the other types of devices is provided hereinafter. As will be appreciated by one of ordinary skill in the art, various features of the user interface of the Player can be understood to apply to such a broader range of devices.

Generally, the goal of the user interface is to allow intuitive, simple operation of the system and interaction with various parameters with a minimum number of buttons, while at the same time preserving the power of the system. FIG. 1 illustrates an exemplary system configuration for Player 10. Display 20 provides visual information to the user, as will hereinafter be described. Various mode keys 16 provide buttons that enable a user to directly access, or initiation, modes of operation of the system as will be hereinafter described. Joystick 15 is provided to enable the user to select or interact with various musical or system parameters or the like, as will be hereinafter described. Save/edit key 17 preferably is provided to save songs or parameter changes, etc., that a user may have created or made using the system, and also to initiate editing of parameters, Play lists, samples, etc., such as will be described hereinafter. Volume key(s) 14 is/are provided, either in dual button up/down form or a single knob or dial to enable the output volume level to be adjusted. Function keys 11 preferably are provided to enable player functions such as play (ok), stop (cancel), forward (insert/create), reverse (delete) and record, exemplary uses of which will be described in greater detail hereinafter. FX key 12 preferably is provided to enable a user to easily and intuitively adjust one or more audio effects (e.g., doppler, reverb, wobbler, custom, etc.) of a part of the music (e.g., a particular sample sound); one preferred way to enable an intuitive sound effect selection by the user is to enable to FX key 12 to be used in combination with the Joystick 15 left and right controls, a corresponding preferred way to enable intuitive sound effect adjustment (e.g., increase or decrease the effect of the selected sound effect) is to enable to the FX Key 12 to be used in combination with the Joystick 15 up and down controls. Pitch/tempo key 13 preferably is provided to enable single button activation for pitch/tempo changes (preferably along with joystick movements), as will be hereinafter described in greater detail. On/off button 18 preferably is provided to turn on or off the player, and preferably a brief depression/toggle can be used to turn on/off an LCD backlight, although, for example, other turn off modes may be used as well (such as a time out turn off, when the player is not playing and there has been no activity detected for a predetermined time out period, etc. Exemplary desirable uses of such buttons and keys provided in the illustrative Player 10 embodiment will become more apparent based on the discussion to follow.

Figure 4:
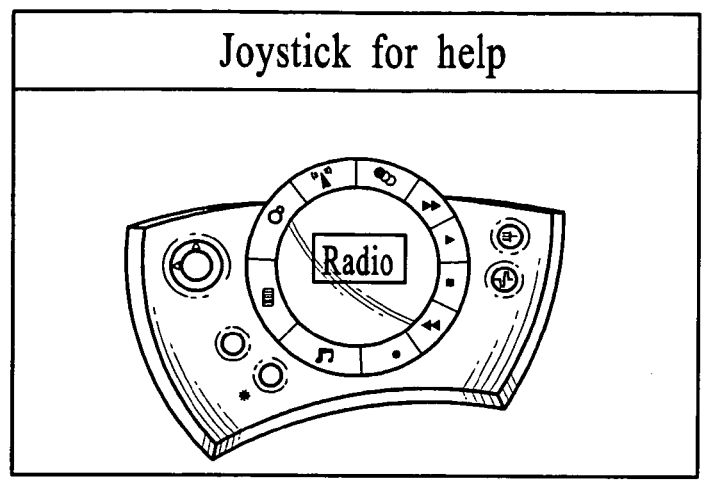
Figure 5:
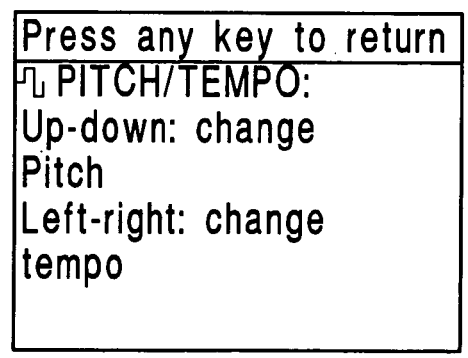

In accordance with preferred embodiments, a Home mode is provided. Home mode is a default mode that can be automatically entered when Player 10 is turned on. As the example of FIG. 4 shows, Home mode preferably displays an animated screen prompting the user to select a mode by pressing a direct access mode key 16 or entering help mode by pressing the joystick (FIG. 4 depicts the moment of the animation that prompts for the Radio direct access key). In preferred embodiments, a user can define the graphics displayed on the display 20 using, for example, a companion PC software program (discussed in greater detail below) to select graphics (animated or otherwise) to be automatically substituted (if available) for the default graphics during the different modes of operation. In this example of custom screens, data files corresponding to the customized screen graphics for each section of a song, and/or each mode of operation, preferably can be stored as part of the song data structure (discussed below) in a storage location of a removable memory means such as the Flash memory in a Smart Media Card (SMC). In preferred embodiments, in Home mode the screen scrolls through various modes that are available in the system, such as modes associated with mode/direct access keys 16 (see, again, FIG. 1). Additionally, Player 10 preferably is configured to return to Home mode from the main menu of any other mode (i.e., from the user pressing the Stop key). When the joystick is pressed in Home mode, preferably a help screen is displayed prompting the user to press any key for help. An example help screen is shown in FIG. 5. In accordance with this example, when a key is pressed while Player 10 is displaying this screen, helpful text relating to that key is displayed.

Figure 6:

Play can be used when in Home mode to enter a particularly important visual interface mode referred to herein as the I-Way mode (discussed in greater detail below). As shown in the example of FIG. 6, the preferably LCD screen can display a message regarding other possible modes, such as "e.DJ Style", in the status line and propose a selection of music Styles/SubStyles (e.g.; Techno Mix, House, Garage, etc.). At this type of screen, to select a desired Style, a user can press Up or Down. In this example, Styles in uppercase preferably denote a category of SubStyles that are randomly chosen for each song, and SubStyles preferably are indicated by lowercase Styles proceeding each uppercase Style. Once the user selects a Style, to enter I-Way mode with the selected Style, the user can press Play. Once the I-Way mode is entered, preferably Player 10 automatically creates, and starts playing, a song in the chosen Style. Exemplary Styles/SubStyles that preferably are provided in accordance with certain preferred embodiments include: Coolmix (SubStyles ballad, bossa, new age); Hip Hop Mix (SubStyles hip hop, rap, R&B, downbeat, ragga); Kitsch; Techno Mix (SubStyles house, garage, trance, jungle); etc. What is important to note is that, in accordance with preferred embodiments, distinct music Styles are determined, at least some of the musical Styles including distinct SubStyles, wherein characteristics of the particular Style and/or SubStyle result in different musical rules being applied to the automatic creation of music in accordance with the particular Style/SubStyle (the use of musical rules and other algorithmic and other details of the preferred music generation process is discussed in greater detail elsewhere herein), with an intuitive and easy to use interface provided to enable the ready creation and user modification of music in accordance with the particular Style/ SubStyle, etc. In additional embodiments the use of an even finer gradation of musical aesthetic is available to the user in the form of a MicroStyle. For example, a plurality of MicroStyles are provided that all generally conform to a particular SubStyle, while the SubStyle is accompanied by one or more other SubStyles that together generally conform to a particular Style. This third tier of musical granularity preferably gives the discerning user even finer control over the musical output of the algorithmic music. Such MicroStyles preferably provide more consistent music, while perhaps losing some of the flexibility of Styles/SubStyles. What is important is that the user is provided with a plurality of levels of musical style categorizations, where basically at each descending level the range of musical parameters that may be varied by the user and/or the auto-composition algorithm and the like are progressively more constrained, consistent with the particular Style, SubStyle or MicroStyle that is selected, etc.

An important feature of Home mode is the ability to configure Player 10 to start playing music quickly and easily. This is because, although Player 10 is configured to be interactive, and many professional-grade features are available to adjust various aspects of the Style and sound, it is desirable to have a quick and easy way for users to use the Player in a 'press-it-and-forget-it' mode. Thus, with only very few button pushes, a user with little or no musical experience, or little or no experience with Player 10, may easily begin composing original music with Player 10 of a desired Style or SubStyle. An additional preferred way to provide an auto-play type of capability is to use a removable storage memory medium (e.g., Smart Media Card) to store a Play list, such as a file containing a list of song data structures that are present on the removable memory. Following this example, when the user inserts the removable memory, or when the system is powered on with a removable memory already inserted, preferably the system will scan the removable memory to look for such a file containing a Play list and begin to play the song data structures that are listed in the system file. Preferably, this arrangement can be configured such that the Auto-Play mode is selectable (such as via a configuration setting in the system file), and that the system will wait a short duration before beginning Auto-Play, to allow the user an opportunity to enter a different mode on the system if so desired.

Figure 7A:
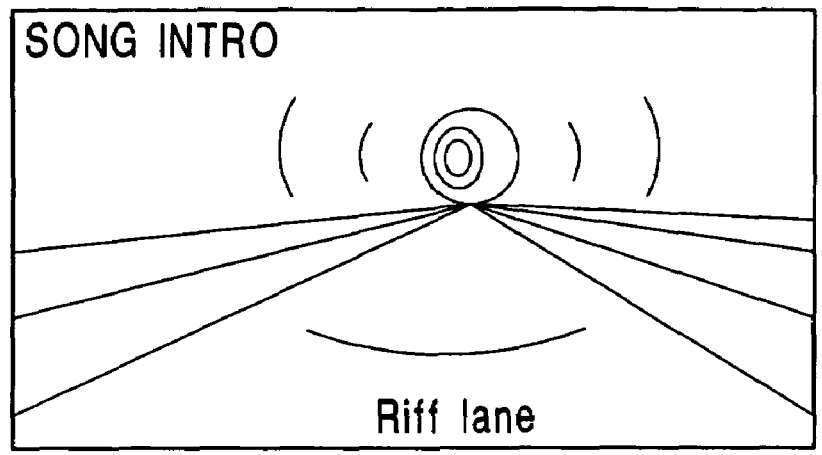

As illustrated in FIG. 7A, an exemplary, preferred screen for an I-Way mode depicts the front view of the user driving or moving down a visual representation of a highway or multi-lane road or path. Along the very top of the screen preferably is a status message that displays the current section or status of the ongoing eDJ session (for example: part 1, filtering drums, chorus, Part 2, <<sample name>>, etc.). Preferably, other ways of displaying messages to the user to more prominently indicate a status message can be used; for example, the system can momentarily flash a large visual indicator that takes up almost the entire screen. Preferably, directly in front of the field of view is a visual representation of a speaker that preferably is pulsing in time with the music being played. Preferably, each lane of the I-Way represents various types of elements of a song; such as instrument lanes (drums, bass, riff, lead), one or more sample lanes (to interact with pre-stored samples of voices, sounds, etc), and one or more microphone lanes which manage the microphone input in real-time. Other categories for lanes can be envisioned that are within the spirit and scope of the present invention. What is important to this aspect of the present invention that the user be presented with a multi-lane visual representation that includes a plurality of lanes, each of which corresponds to a constituent component or effect, etc., of the music that is being composed or played. The user preferably uses joystick 15 (for example, a circular button that can depress in 4 areas: top, bottom, left and right, such as illustrated in FIG. 1) to move the center of view around. Generally, each directional depression of joystick 15 causes the center of view to shift in the corresponding direction. For example, when in the left lane and the right joystick button is pressed, the center of view moves over one lane to the right.

Figure 7B:
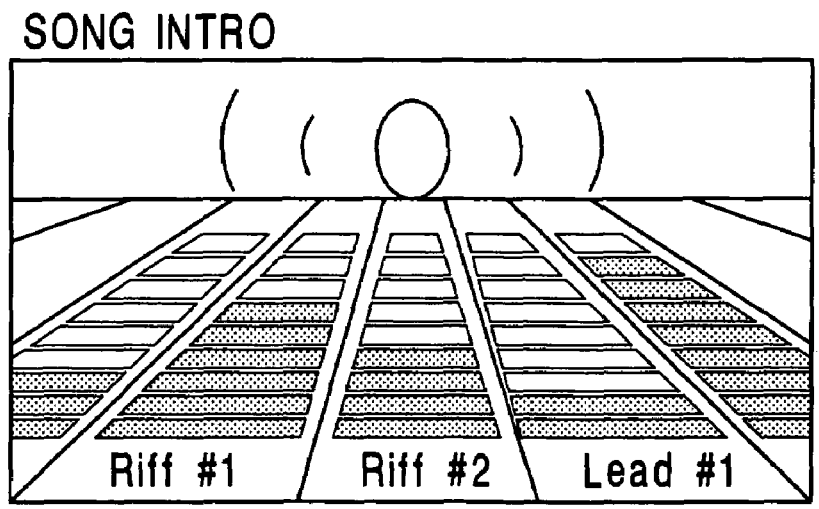

In alternative embodiments, e.g., as shown in FIG. 7B, a meter is provided for each lane that depicts the relative volume of the musical component associated with that lane, e.g., in real time. In alternative embodiments, additional layers of interactivity can be presented with additional horizontal layers of the I-Way. For example, when at the lane of the I-Way for the drums (an instrument with distinct instrument components, such as snare, bass, floor tom, high hat, crash cymbal, ping-ride cymbal, roto-toms, etc.; orchestral percussion, such as tympani, gong, triangle, etc.), the user could press the down key to go down to another I-Way for the drums or other multiple component instrument, with a lane for each drum or component, and/or for different aspects of the drum or instrument sound. This concept of multiple I-Way interfaces can be selectively used for only the instruments that benefit from such an approach, such as the drums or other multiple component instrument (while other instruments maintain a single I-Way interface, etc.). The use of additional I-Way lanes is not necessary to enjoy all the benefits of the present invention, but is a desirable feature for certain uses of the invention, such as products geared for more professional uses, or for music Styles where additional user interface and instrument control complexity is desirable, such as classical music, or jazz.

While in I-Way mode, the screen preferably is animated with sound waves or pulses synchronized with music beats. In the example of FIG. 7A, a visual representation of a round speaker is graphically represented in the center to symbolize the relative volume of the current lane. This graphic item preferably is configured to disappear, or be otherwise altered, when the lane is muted. It also can be configured to become bigger and smaller as the relative volume of that particular lane/section is adjusted (for example, by using a function key in combination with the joystick up and down buttons). Other simple variations are within the scope of the present invention, such as volume indicators visible in each lane at the same time, mute indications for each lane visible at the same time, graphic items in each lane visually reminiscent of the instrument represented by that lane, etc.

In an auto composition mode such as the I-Way mode it is Player 10 itself preferably that decides about a song progression in that it can automatically add/remove instruments, do music breaks, drums progressions, chord progressions, filtering, modulation, play samples in sync with the music, select samples to play based on rules, etc., to end up sounding like in a real song on a CD or from the radio. After a few minutes, if nothing is done by the user, Player 10 preferably is configured to end the song, preferably with an automatic fade out of volume, and automatically compose and play a new song in the same Style, or alternatively a different Style. It also should be understood that I-Way mode also is applicable in preferred embodiments for music that is not auto-composed, such as a song that the user created/modified using Player 10 (which may have been created in part using auto-composition) and stored in Player 10 for subsequent playback, etc.

In certain embodiments, newly composed patterns are numbered from 1 to n. This number can be displayed in the status line to help the user remember a music pattern he/she likes and come back to it after having tried a few other ones. In certain embodiments, this number might only be valid inside a given song and for the current interactive session. In other words, for example, the Riff pattern number 5 for the current song being composed would not sound like the Riff pattern number 5 composed in another song. However, if this song is saved as a user song, although the Riff music will be the same when replayed later, the number associated to it could be different.

In one exemplary embodiment, Player 10 "remembers" up to 16 patterns previously composed during the current interactive session. This means, for example, that if the current pattern number displayed is 25, the user can listen to patterns from number 10 to 25 by browsing forward through the previously composed patterns (patterns 1-9, in this embodiment, having been overwritten or otherwise discarded). If the User wants to skip a given composed pattern that is currently being played, he/she can, and the pattern number will not be incremented, meaning that currently played pattern will be lost. This feature can be used to store only specific patterns in the stack of previously played patterns, as desired by the user. What is important is that the user can create musical patterns, and selectively store (up to some predetermined number of musical patterns), with the stored patterns used to compose music that is determined by the user based on the user's particular tastes or desires, etc. The views presented by I-Way mode desirably facilitate this user creation and interaction with, and modification of, the music that is be created/played by Player 10.

Figure 8A:
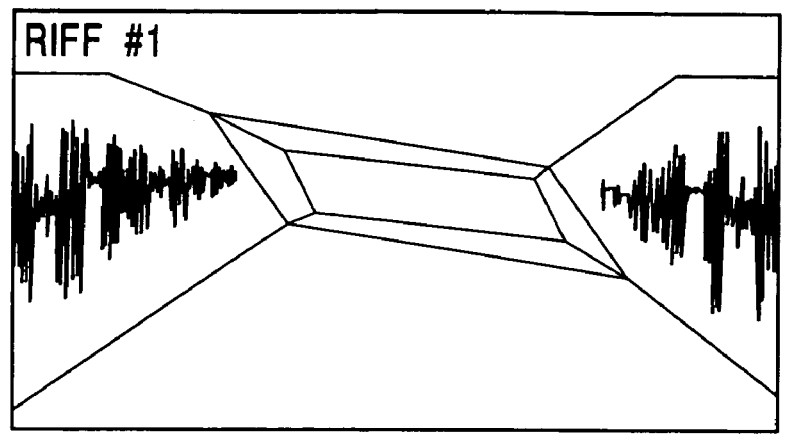
Figure 8B:
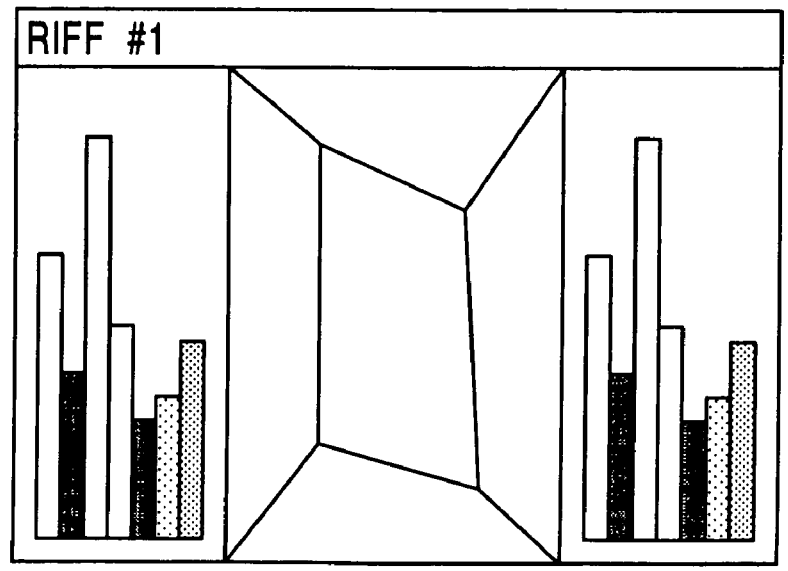

In certain preferred embodiments, if desired by a user, additional music parameters of an instrument associated with a particular lane in the I-Way mode may be "viewed" and interacted with by the user. For example, if a Down is pressed (such as by way of joystick 15) while in I-Way mode, the center of view is taken "underground," to the "inside" of a particular lane (e.g., see FIG. 8A). This transition to Underground mode preferably is made visually appealing by configuring a screen animation depicting the movement of the point of view down through the floor or bottom of the I-Way lane, into what appears to be a visual representation of a tunnel below a particular lane that corresponds to the musical component represented by that lane. In certain embodiments such a visual transition preferably is accompanied by sonic feedback, such as a sound alerting the user that the tunnel mode is being entered/exited. In certain embodiments it is desirable that such sonic feedback is not recorded as part of a 'saved' musical piece, e.g., depending upon a user-definable configuration parameter. In this manner a user interface is enhanced without necessarily effecting the musical song being created. When inside the tunnel beneath a particular lane, a pulse indication (similar to the speaker pulse) preferably occurs in time with the tempo of the I-Way session. Furthermore, the left and right walls of the tunnel can be used to indicate the wave shape of the left and right sound channel outputs. Alternatively, in lieu of such a waveshape effect, in certain embodiments it is desirable to provide a bargraph associated with the left and right sound channel outputs. As an example, FIG. 8B illustrates one such embodiment. Furthermore, in many of these embodiments, it is desirable to provide such a graphic display, even if the display does not exactly correspond to the sound output. For example, in certain embodiments where available processing resources do not afford the ability to have accurate, detailed graphing/charting of the sound in real time, an approximation of the sound is still advantageous as it provides a user with a more intuitive user interface experience.

In certain embodiments it is preferable to provide a force-feedback mechanism (as discussed below in connection with FIG. 29). In certain embodiments, it is preferable to synchronize a force-feedback event (e.g., a vibration in a handheld device) with a sonic characteristic of the music (e.g., the bass drum). In certain embodiments it is preferable to synchronize such force-feedback events with a visual transition, i.e., as part of the graphical user interface experience of the user. As an example, the transition from I-Way mode to underground mode may be accompanied by a force-feedback event.

The far end of the tunnel preferably is comprised of a shape (for example, a rectangle or other geometric) that can change in correlation to the value of one or more of the parameters affecting the sound of that particular lane. By way of example, in the case of drums, a filter parameter can be changed by depressing the function or Fx button (see, again FIG. 1), plus the joystick up or down button; at this time the shape comprising the end of the tunnel either changes shape or visually appears to get farther away or nearer. In another example, the pitch of a guitar can be adjusted by pressing the pitch key along with the left or right joystick button; at the same time, the shape can become more or less slanted as the pitch parameter is incremented or decremented in value, or alternatively a visual representation of the tunnel going up hill or down hill can be provided to visually represent an increase or decrease in pitch. In other examples, to change a right/left or stereo balance type of effect, the function or Fx button could be depressed to put the system in a mode to change the parameter along with left/right or up/down joystick button; such inputs could, for example, result in the sound balance going more towards the right channel than the left channel (and be accompanied by a visual representation of the tunnel turning to the right, or vice versa for the balance shifting towards the left channel), or the tunnel opening becoming larger in width or smaller in width if a wider or narrower stereo effect is desired. These are but several examples of how the shape or other visual effect can be modulated in correlation to the user input to one or more parameters effecting the sound. What is important is that, when the user "tunnels" into a particular instrument lane, various parameters associated with the instrument are changeable by the user, with at least certain of the changes in parameter being accompanied by a change in the visual representations provided to the user, such as the shape, size, color (for color display embodiments) or motions of the displayed visual representations.

While in Underground mode, Player 10 preferably is configured to continue looping with the same musical sequence while the user is able to interact with and modify the specific element (e.g., the drums) using the joystick and other buttons of Player 10. Also, while down in a lane corresponding to a particular component, preferably the left and right buttons of the joystick can be used to move from one component parameter to another. Alternatively, side to side joystick movements, for example, may enable the user to step through a series of preset characteristics or parameters (i.e., with simple joystick type user input, the user may change various parameters of the particular component, hear the music effect(s) associated with such parameter changes, and determine desirable characteristics for the particular music desired by the user at the particular point in time, etc.). In yet another alternative, side to side joystick movements, for example, may cause the view to shift from one tunnel to an adjacent tunnel, etc. All such alternatives are within the scope of the present invention.

In addition to other similar variations, the user can mute a particular lane in the I-Way mode preferably by use of Stop key (shown in FIG. 2). In this example, while the lane is muted, "Muted" can be displayed in the status bar and the round speaker can disappear. Preferably in accordance with such embodiments, the user can un-mute the instrument by again pressing the Stop key.

An additional desirable variation of the user interface preferably involves animating a change to the visual appearance, corresponding to a new song part. For example, if in the Underground mode shown in FIG. 8A, or in the I-Way mode shown in FIG. 7A, the movement to a chorus section is accompanied by a movement through an opening doorway. The graphic animation corresponding to a given section of the song (e.g., chorus, intro, bridge, ending, etc.) can be used each time that section is played during the song. Examples of transitions are: having the user go through a door from a tunnel with one set of visual characteristics, to a tunnel with a second set of visual characteristics. Another example is to have the user move through a transition doorway from a tunnel to a wider tunnel, or even an open area. The preferable feature of this aspect of the present invention is to provide an engaging experience for the user by coordinating an animation transition that is closely linked to a musical transition between song parts.

Figure 8C:
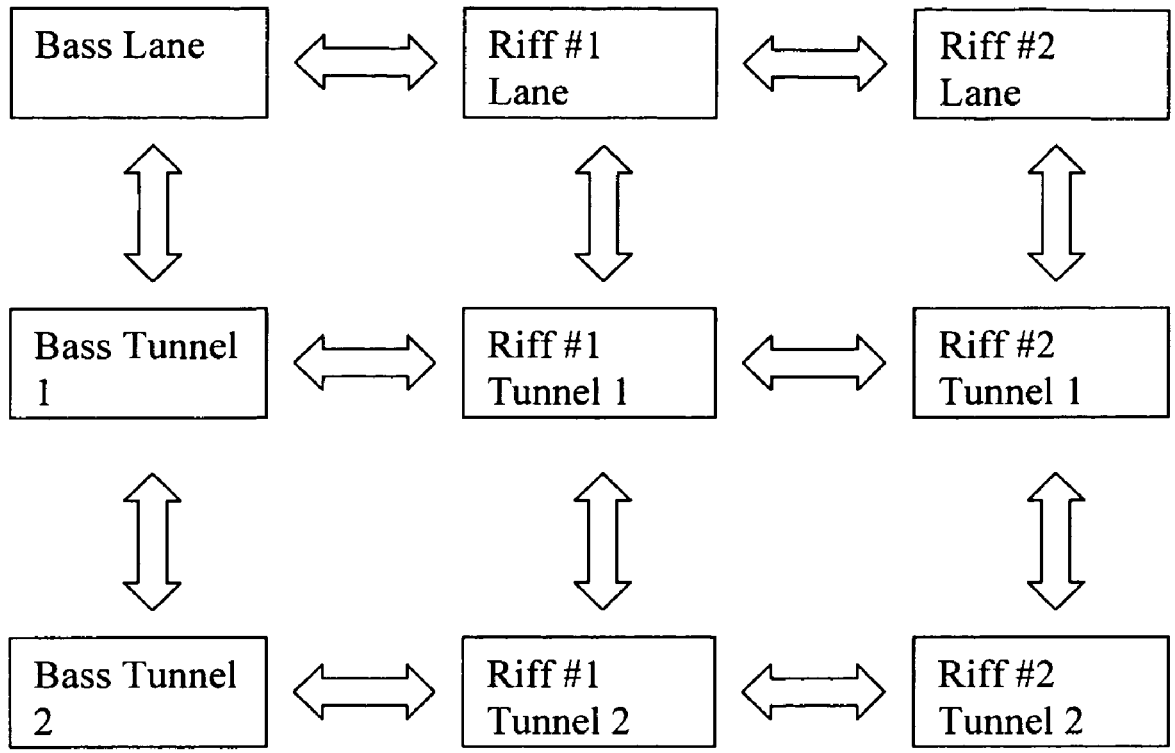

In certain alternative embodiments, it is preferably to provide multiple layers of tunneling, as shown in FIG. 8C, with each layer associated with a given lane providing an intuitive interface for editing a particular aspect of the musical component associated with that lane. In certain of these embodiments, where adjacent lanes have certain related aspects that are editable via a particular tunnel layer, it is preferable to enable the user to move directly between the adjacent tunnels, as shown by the horizontal arrows in FIG. 8C.

Figure 13A:
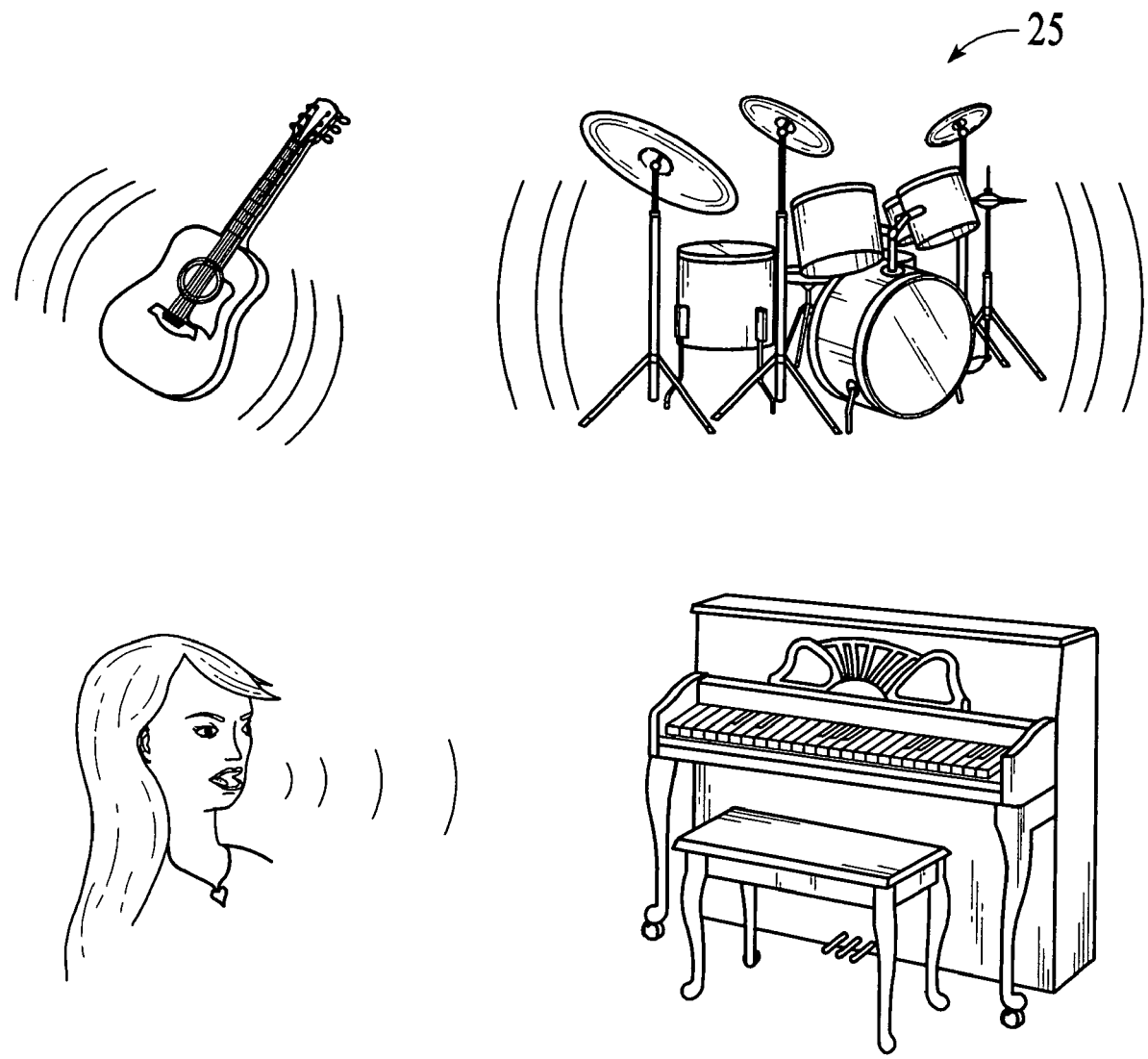

Alternatives to the I-Way and Underground concepts can also be advantageously used with the present invention. For example, a user interface that visually depicts the instruments that are in the current song, and allows the user to select one to go into a tunnel or level where parameters of the particular instrument may be adjusted. In this example, while the music is playing, the user interface provides visual representations of the instruments in the current song, with the active instruments preferably emitting a visual pulse in time with the music. FIG. 13A is an example of such a user interface. In accordance with such embodiments, the user can select a particular visual picture of an instrument (for example, such as with joystick 15 or function keys 11) and go into that instrument. For example, by selecting the vibrating drumset 25, the user can go into another level, such as corresponding to the Underground mode discussed above with reference to FIG. 12, that has each drum shown that is currently being played. Then, the user can select and change different aspects of the drums, as well as the sound effects, and drum tracks. If the user selected another instrument such as are shown in FIG. 13A, they would access a screen that allows them to similarly alter the parameters of that particular instrument track. Accordingly, the use of alternative themes for the user interface can be advantageously employed with the present invention, especially a theme where the actual instruments are depicted, as if on a stage.

Figure 13B:
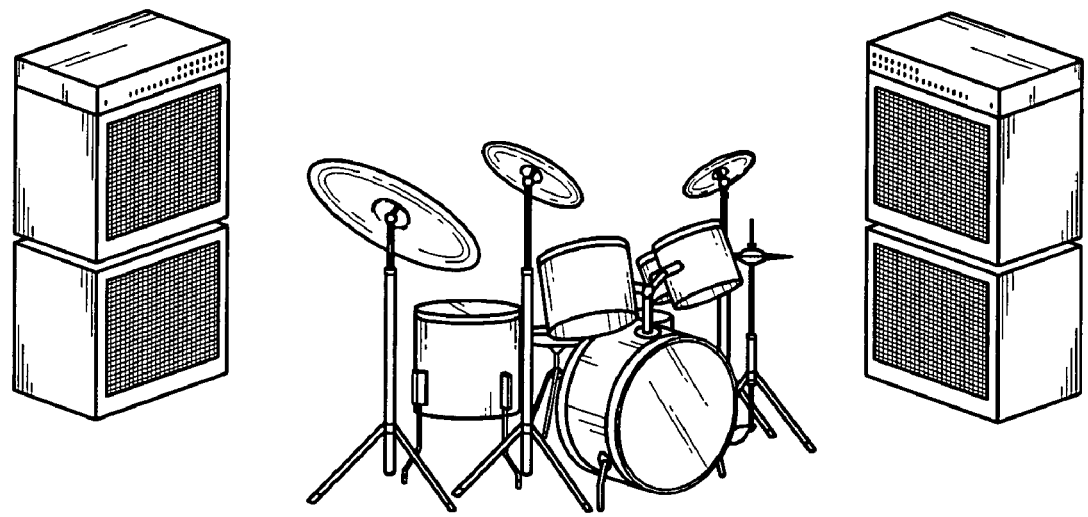

As a particular example of such an embodiment, FIG. 13B depicts a 3D stage. In certain of such embodiments, it is preferable to enable the user to pilot around the stage in a first-person perspective. The user preferably is able to move around intuitively, i.e., the 3D display is updated during user movement to reflect the visual perspective of the user Qn the stage. Techniques to accomplish this first-person effect are widely employed, for example, in well known computer video games such as Quake III Arena, available from ID Software. The user preferably can move towards a given instrument and adjust parameters of the musical component represented by that instrument. As an example, in the case of a bass component, and the example of FIG. 13B, the user is able to move towards a bass amplifier and cabinet on the stage (e.g., the cabinet depicted on stage left of the 3D stage shown in FIG. 13B). Upon moving close to the bass amplifier, certain 3D buttons and/or sliders are enlarged into the display and preferably afford control of the sonic characteristics of the musical component in a manner similar to the Way actual bass amplifier controls may affect the sound of the bass guitar. In this manner, the user is preferably provided with an intuitive graphical user interface that mimics certain visual aspects of a music performance, so that the control of certain sonic characteristics is made more intuitive.

In certain embodiments, both or multiple types of user interfaces are provided, and the user may select an I-Way type of user interface, such as shown in FIG. 7A, or instrument group or other type of interface. What is important is that the user interface in preferred embodiments preferably provide an intuitive and easy to use way for users, who may have little experience in creating music, to visually appreciate the instruments used to create the music, and then have a visual way to access a mode in which parameters and effects associated with particular instruments may be modified by the user, which is preferably accompanied by a visual change that corresponds to the modified parameters/effects, etc.

Additionally, in certain preferred embodiments, the use of an external video display device (e.g., computer monitor, television, video projector, etc.) is used to display a more elaborate visual accompaniment to the music being played. In such cases the I-Way graphical display preferably is a more detailed rendition of the I-Way shown in FIG. 7A (e.g., a higher resolution image in terms of color depth and/or dots per inch).

In certain preferred embodiments, pressing Play preferably causes the lane instrument to enter Forced mode. This can be implemented to force Player 10 to play this instrument pattern at all times until Forced mode is exited by pressing Play again when the lane of that instrument is active. In this case, if the instrument was not playing at the time Forced mode is selected, Player 10 can be configured to automatically compose the instrument pattern and play it starting at the end of the current sequence (e.g., 2 bars). In addition, pressing Play for a relatively long period (e.g., a second or more) can pause the music, at which time a "paused" message can flash in the status line.

In other preferred embodiments, where such a Forced mode may not be desired (e.g., for simplicity, and/or because it may not be needed for a particular type of music), pressing Play briefly preferably causes a Pause to occur. Such a pause preferably would have a 'Paused' message appear on the Display 20, and preferably can be rhythmically quantized such that it begins and ends in musical time with the song (e.g., rhythmically rounded up or down to the nearest quarter note).

Solos

In Solo mode, all other instruments are muted (except for those that may already be in Solo mode) and only this instrument is playing. Solo mode preferably is enabled by entering a tunnel or other level for a particular instrument, and, if the instrument is already playing entering Solo mode upon pressing of Play (e.g., the instrument is in Forced play and subsequent pressing of Play in Underground mode initiates Solo mode for that instrument; the particular key entry into Solo mode being exemplary). An instrument preferably remains soloed when leaving the corresponding tunnel and going back to the music I-Way. The user also preferably must re-enter the corresponding tunnel to exit Solo mode. Also, in certain embodiments multiple levels of Solo mode are possible in that you can solo several tracks, one at a time or at the same time, by going into different tunnels and enabling Solo mode. In addition, in certain embodiments the user preferably can enable/disable Solo mode from the 1-Way by, for example, pressing Play for a long time (e.g., 2 seconds) while in a lane. Following this example, upon disabling Solo mode, any lanes that had previously been manually muted (before Solo mode was invoked) preferably will remain muted.

Preferably, from a Sample menu different sample parameters can be edited. From the Samples menu, the user can record, play and change effects on voice, music or sound samples. This menu also preferably permits the creation and edition of sample lists. The LCD preferably displays "e.Samples" in the status line and a list of available samples or sample lists in the storage media (for example, the SmartMedia card, discussed in connection with FIG. 32) to choose from.

When playing back a sample, the LCD preferably displays the play sample screen. The name of the sample preferably scrolls in a banner in the center right part of the LCD while the audio output level is indicated by a sizable frame around the name. The status line preferably shows the current effect.

Sample sets or lists preferably are used by the e.DJ, for user songs, as well as MIDI files. In the case of MIDI files, preferably a companion PC software program (e.g., a standard MIDI editing software program such as Cakewalk) is used to enable the user to edit their own MDI files (if desired), and use MIDI non-registered parameter numbers (NRPNs are discussed below in more detail) to effectuate the playing of samples at a specific timing point. Following this example, the companion PC software program can be enabled to allow the user to insert samples into the MIDI data, using NRPNs. When a new e.DJ song is created, Player 10 preferably picks one of the existing sample lists (sample sets preferably being associated with the particular Style/SubStyle of music) and then plays samples in this list at appropriate times (determined by an algorithm, preferably based on pseudo random number generation, as hereinafter described) in the song. When creating or editing a user song, the user preferably can associate a sample list to this user song. Then, samples in this list will be inserted automatically in the song at appropriate times. Each sample list can be associated with an e.DJ music Style/SubStyle. For instance, a list associated with the Techno Style can only be used by a Techno user song or by the e.DJ when playing Techno Style. In additional variations, the user preferably can specify specific timing for when a particular sample is played in a song, by way of NRPNs discussed below. This specification of the timing of a particular sample preferably can be indicated by the user through the use of a companion PC software program (e.g., a standard MIDI editing software program such as Cakewalk), and/or through a text interface menu on the Player 10 itself.

New Sample lists preferably are created with a default name (e.g., SampleList001). The list preferably can be renamed in the System-files menu. When the selected item is a sample, the current effect preferably is displayed in the status line. When the selected item is a sample list, "List" preferably is displayed in the status line.

Playback of preferably compressed audio, MIDI, Karaoke, and User songs (e.g., e.DJ songs that have been saved) preferably is accessible via the "Songs" mode. Songs can be grouped in so-called Play lists to play programs (series) of songs in sequence. The LCD will display "e.Songs" in the status line and a list of available songs or Play lists on the SmartMedia card to choose from.

Depending on the type of the song (for example, user song, MIDI or WMA), different parameters can be edited. The type of the current selection preferably is indicated in the status bar: WMA (for WMA compressed audio), MID (for MIDI songs), KAR (for MIDI karaoke songs), MAD x (for user songs {x=T for Techno Style, x=H for Hip-Hop, x=K for Cool, etc.}), and List (for Play lists).

The name of the song preferably scrolls in a banner in the center right part of the LCD while the audio output level is indicated by a sizable frame around the name. If the song is a karaoke song, the lyrics preferably are displayed on two (or other number) lines at the bottom of the LCD. The animated frame preferably is not displayed. If the song is a user song (i.e., composed by the e.DJ and saved using the Save/Edit button), the music I-Way mode is entered instead of the play song mode.

The edit screen preferably is then displayed, showing two columns; the left column lists the editable parameters or objects in the item, the right column shows the current values of these parameters. For example, a Play list edit screen preferably will display slot numbers on the left side and song names on the right side. The current object preferably is highlighted in reverse video.

Play lists are used to create song programs. New Play lists are preferably created with a default name (e.g., PlayList001), and preferably can be renamed by the user. When a list is selected and played in the song select screen, the first song on the list will begin playing. At the end of the song, the next song preferably will start and so on until the end of the list is reached. Then, if the terminating instruction in the list is End List, the program preferably stops and Player 10 returns to the song select screen. If the terminating instruction is Loop List, the first song preferably will start again and the program will loop until the user interrupts the song playing, such as by pressing the stop button.

Figure 32:
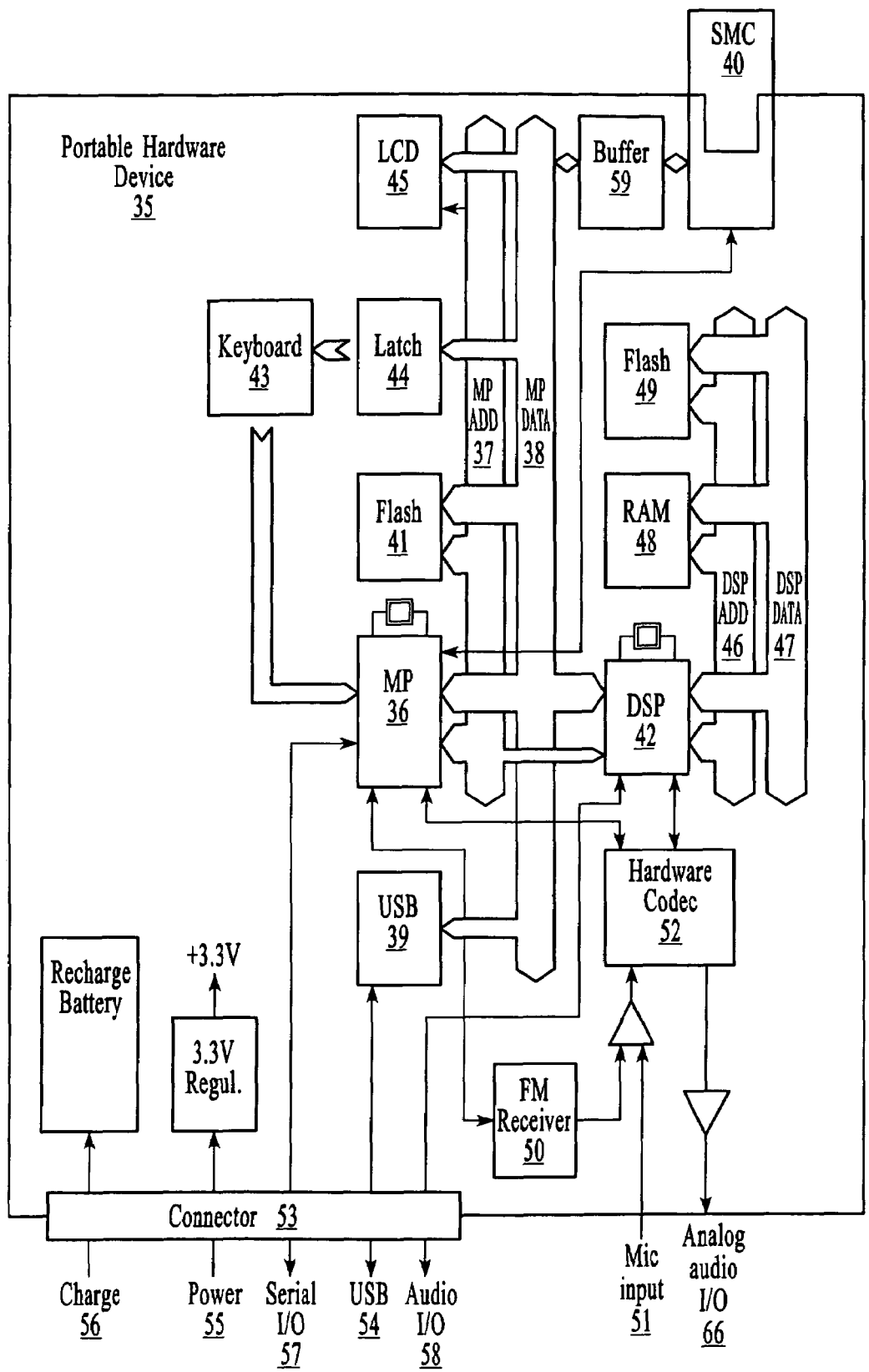
FIGS. 32-34 illustrate exemplary hardware configurations of certain preferred embodiments of the player and a docking station in accordance with the present invention.

In one embodiment of the present invention, the features of a conventional radio are effectively integrated into the user interface of the present invention (see, e.g., the FM receiver 50 of FIG. 32). For example, when playing a station in Radio mode, the LCD preferably will display a radio screen. The LCD preferably will display "Radio" in the status line as well as a list of available station presets to choose from. If no preset has been preset, only the currently tuned frequency might be displayed. The name of the radio station (or frequency if it is not a stored preset) can scroll in a banner in the center right part of the LCD. An animation representing radio waves can also be displayed. The status line preferably shows the tuned frequency. In such embodiments Player 10 is enabled to operate as a conventional radio device.

In preferred embodiments, radio-type functionality involves the use of the same type of Radio interface, with virtual stations of different Styles. Each virtual station preferably will generate continuous musical pieces of one or more of a particular Style or SubStyle. In this v.Radio mode, the user can "tune-in" to a station and hear continuous music, without the use of an actual radio. Such an arrangement can provide the experience of listening to a variety of music, without the burden of hearing advertising, etc., and allows the user to have more control over the Style of music that is played. In such embodiments, a user will enter v.Radio mode and be presented with a list of v.Radio stations, each preferably playing a particular Style or SubStyle of music. The user then preferably "tunes" to a v.Radio channel by selecting a channel and pressing play, for example (see, e.g., FIG. 10), which causes Player 10 to begin auto-composing and playing songs in accordance with the particular v.Radio channel. In certain embodiments, the v.Radio may be controlled to play user songs of the particular Style or SubStyle associated with the particular v.Radio channel, which may be intermixed with auto-composed songs of the particular type of SubStyle. In yet other embodiments, one or more v.Radio channels may be provided that play songs of more than a single Style or SubStyle, which also may be intermixed with user songs of various Styles or SubStyles. With such embodiments, the user is provided options to select the particular type of v.Radio channel that Player 10 "tunes" in. Additionally, in certain embodiments the v.Radio mode preferably can be used to play a variety of different song formats (e.g., MP3, WAV, WMA, eDJ, etc.).

In accordance with certain embodiments, another variation of the Radio feature integrates some aspects of the v.Radio with other aspects of the Radio. As one example, a user could listen to a Radio station, and when a commercial break comes on, Player 10 switches to the v.Radio. Then, when the real music comes back on, the device can switch back to a Radio. Another integration is to have news information from the Radio come in between v.Radio music, according to selectable intervals. For example, most public radio stations in the USA have news, weather, and traffic information every ten minutes during mornings and afternoons. The v.Radio can be configured to operate as a virtual radio, and at the properly selected interval, switch to a public station to play the news. Then it can switch back to the v.Radio mode. These variations provide the capability for a new listening experience, in that the user can have more control over the radio, yet still be passively listening. It is considered that such an arrangement would have substantial use for commercial applications, as discussed elsewhere in this disclosure.

Special functions can preferably be accessed from the System menu. These functions preferably include: file management on the SmartMedia card (rename, delete, copy, list, change attributes) (the use of such SmartMedia or other Flash/memory/hard disk type of storage medium is discussed, for example, in connection with FIG. 32), Player configuration (auto-play, power off, delay, keypad auto-repeat, language, etc.), firmware upgrade, SmartMedia card formatting, microphone settings, and equalizer user presets. The Player can preferably modify various attributes of a file stored on the SmartMedia card. As a precaution, by default, all system files preferably can be set as read only.

In certain embodiments a User Configuration interface preferably enables the user to enter a name to be stored with the song data on the removable memory storage (e.g., SMC), and/or to enable the user to define custom equalization settings, and/or sound effects. As an example of EQ settings, it is preferable to enable the user to select from a group of factory preset equalizer settings, such as flat (e.g., no EQ effect), standard (e.g., slight boost of lower and higher frequencies), woof (e.g., bass frequency boost), and hitech (e.g., high frequency boost). In addition to such preset EQ settings, it is preferable to enable the user to define their own desired settings for the EQ (as an example, a 4 band EQ with the ability to adjust each of the 4 bands by way of the joystick). Additionally, in certain embodiments it is preferable to enable the user to similarly customize sound effects to be used for particular samples. Following this example, in addition to a set of standard factory preset sound effects such as Lowvoice (e.g., plays the song with a slower speed and lower pitch to enable the user to sing along with a lower voice), reverb, Highvoice (e.g., plays the song with a faster speed and higher pitch), Doppler (e.g., varying the sound from Highvoice to Lowvoice), and Wobbler (e.g., simulating several voices with effects), it is preferable to make a customized effect capability available to the user that can incorporate various combinations of standard effects, and in varying levels and/or with varying parameter values.

When the user saves a song that is being played in e-DJ mode, the song is preferably created with a default name (e.g. TECHNO001). The song can preferably be renamed in the System-files menu. When entering the Files menu, files present on the SmartMedia card and the free memory size are preferably listed in an edit screen format. The status line preferably indicates the number of files and the amount of used memory. The file management menu preferably offers a choice of actions to perform on the selected file: delete, rename, copy, change attributes, etc. The name of the current file preferably is displayed in the status line. Additionally, in certain embodiments it is preferable to enable the use of System parameter files that contain, for example, settings for radio presets (e.g., radio station names and frequencies), settings for certain parameters (e.g., pitch, tempo, volume, reverb, etc.) associated with music files such as WAV, WMA, MP3, MIDI, Karaoke, etc. In these embodiments it is preferable for the parameter setting to apply to the entire file.

When entering the Configuration menu, an edit screen preferably is displayed showing various configurable parameters. FIG. 14 describes some of the parameters that are preferably configurable by the Configuration menu, along with possible values. When modifying a selected character in a file name, Forward preferably can be used to insert a character after the highlighted one, and Backward preferably to delete the highlighted character. To save the edits and go back to file menu, Play preferably can be used.

With regard to FIG. 14, in certain embodiments it is preferable to support multiple languages (e.g., French, English, Spanish, etc.) for representing the various menu options, etc. In certain of these embodiments, the use of a data structure (e.g., a lookup table residing in memory) is employed that defines the corresponding word for each term in each supported language. In such embodiments, before displaying a term (such as a menu option), it is preferable to access a variable associated with the desired language to determine which word among a set of words to use in as the displayed term. Furthermore, in certain embodiments it is desirable to make a plurality of the words user-definable/editable, so that the user can operate the system in a mode where he/she can type in a word for the system to use in association with a particular term. Accordingly, in the case where the word "drum" might be displayed, in certain of these embodiments it is preferable to allow the user to edit the word so that "phat beat" or other desired word or phrase may be displayed. Clearly, other examples for user-customized menus and terms can be envisioned here.

When selecting copy, a screen proposing a name for the destination file in a large font preferably is displayed. This name preferably is proposed automatically based on the type of the source file. For instance if the source file is a Hiphop user song, the proposed name for the destination file could be HIPHOP001 (alternatively, the user preferably can use the rename procedure described above to enter the name of the destination file).

The Firmware Upgrade menu preferably permits the upgrade of the Player firmware (embedded software) from a file stored on the SmartMedia card. Preferably, it is not possible to enter the Upgrade firmware menu if no firmware file is available on the SmartMedia card. In this case a warning message is displayed and the Player preferably returns to Systems menu. In additional embodiments, the use of a bootstrap program preferably is enabled to allow the firmware to be updated from a removable memory location (e.g., SMC). Such a bootstrap program preferably can alternatively be used for upgrading the DSP 42 soundbank located in Flash 49.

The Player function keys, identified in FIG. 2, preferably are comprised of the standard buttons found on CD-players or VCRs, and are used to control the playback of songs (e.g.; Player-proprietary, MIDI, WMA, MP3, etc). The Record key controls recording (e.g.; samples). When used in editing or selection menus the player keys also have the following actions: Play preferably is used to select a sub menu or validate a change, Stop preferably is used to go back to previous menu, cancel an action or discard a change, Forward preferably is used to insert an item in a list, and REVERSE preferably is used to delete an item in a list. This is one example of how to use a minimum of keys in a device, while retaining a relatively large set of features, while also keeping the user interface relatively intuitive for a variety of users.

In certain embodiments, one or more of the user interface controls are velocity-sensitive (e.g., capable of measuring some aspect of speed and/or force with which the user presses the control. As an example, one or more of the Player function keys can detect such velocity-type of information and incorporate it into the sounds. In these exemplary embodiments, if the Play button is being used to trigger a sample, it is preferable to incorporate the velocity-type information derived from the button press into the actual sound of the sample. In some embodiments, the result preferably is that the sample will sound louder when the button is pressed quickly and/or more forcefully. In other embodiments, this will preferably result in a changed sound effect, i.e., depending how hard and or forcefully the control is pressed, the resulting sound will be modulated, filtered, pitch-changed, etc., to a different degree. As will be discussed later in more detail, many of the music events involve a MIDI-type (or MIDI-similar) event descriptor, and accordingly, in certain embodiments it is preferable to use the velocity portion (and/or volume, aftertouch, etc.) of a MIDI-type descriptor to pass on the velocity and/or force characteristics of a button push to the DSP (e.g., via the generation algorithms, etc.). Clearly, separate descriptor events can alternatively be used, such as system exclusive messages or MIDI NRPN messages.

When a list is selected in the song select screen, pressing Play preferably will start playing the first song in the list. While the sample lane is selected, Play preferably can be configured to start playing the selected sample. While in an instrument lane, Play preferably can be configured to enter solo mode for the current instrument, or Forced mode.

To create a song/sample list, Forward preferably can be used while in the song or sample select screen.

To leave an edit screen, Stop preferably can be used to discard the edits and exit. For example, in the sample selection screen press Stop to go back to the Home screen. Additionally, for any given instrument during playback, Stop preferably can be used as a toggle to mute/unmute the instrument.

Record preferably can be pressed once to start recording a sample (recording samples preferably is possible in almost any operating mode of the Player). Record preferably can be pressed again to end the recording (recording preferably is stopped automatically if the size of the stored sample file exceeds a set size, such as 500 Kbytes). The record source preferably is chosen automatically depending on the operating mode. If no music is playing, the record source preferably is the active microphone (local or docking station). If music is playing songs, e.DJ or radio, the record source preferably is a mix of the music and the microphone input if not muted.

Further, it is possible to use different sample recording formats that together provide a range of size/performance options. For example, very high quality sample encoding format may take more space on the storage medium, while a relatively low quality encoding format may take less space. Also, different formats may be more suited for a particular musical Style, etc.

In certain embodiments it is preferable to support a sample edit mode. In these cases, sample edit mode is preferably used by a user to edit a selected sample. The selected sample is displayed (e.g., as a simplified waveform representation on LCD 20) and the user is able to select a start point and an end point of the sample. Preferably, such graphical clipping functions enable a user to easily crop a selected sample, e.g., so as to remove an undesired portion, etc. After clipping/cropping the sample, the user is presented with the option of saving the newly shortened sample file, e.g., with a new name. Clearly, other similar edit-type functions in addition to or besides such clipping can be supported, to make use of LCD 20 to provide a graphic version of the waveform of a selected sample, and to provide the end user with a simple way to carryout basic operations on the selected sample.

In v-Radio mode, to listen to the selected station, Play preferably can be used. Press Play to mute the radio. Press Stop to go back to station preset selection screen. To launch an automatic search of the next station up the band, press Forward until the search starts. To launch an automatic search of the next station down the band, press Backward until the search starts. Press Forward/Backward briefly to fine-tune up/down by 50 kHz steps.

In eDJ Mode, while in Sample lane, Play preferably can be pressed to play a selected sample. As mentioned previously, in certain embodiments it is preferable to detect the velocity or force of a particular button press, and to impart the detected information into the resulting sound (e.g., in the case of a sample play event, preferably adjusting the volume, aftertouch, pitch, effect, etc. of the sample sound). If sample playback had previously been disabled, the first press on Play preferably will re-enable it. Subsequent presses preferably will play the selected sample. If a sample if playing, Stop preferably will stop it. If no sample is playing, pressing Stop preferably will mute the samples (i.e. disable the automatic playback of samples by the e-DJ when returning to I-Way mode). When muted, "Muted" preferably is displayed in the status bar and the round speaker preferably disappears on the I-Way sample lane.

In Song mode, to start the playback of selected song or Play list, preferably press Play and the LCD will preferably display the play song screen. In Song mode, Stop preferably can be pressed to stop the music and preferably go back to song selection screen. Preferably press Forward briefly to go to next song (if playing a Play list, this preferably will go to the next to song in the list; otherwise, this preferably will go to the next song on the SmartMedia). Preferably press Forward continuously to fast forward the song. Preferably press Backward briefly to go to the beginning of the song and a second press preferably takes you to the previous song (if playing a Play list, this preferably will go to the previous song in the list; otherwise, this preferably will go to the previous song on the SmartMedia). Preferably press Backward continuously to quickly go backward in the song.

Pressing Stop can be a way to toggle the muting of an instrument/lane. For example, when on a Drums lane, pressing Stop briefly preferably can mute the drums, and pressing it again briefly preferably can un-mute the drums. Additionally, pressing Stop for relatively long period (e.g., a second or so) preferably can be configured to stop the music and go back to Style selection screen.

Forward preferably can be configured to start a new song. Backward preferably can be used to restart the current song.

Forward or Backward preferably can be used to keep the same pattern but change the instrument playing (preferably only "compatible" instruments will be picked and played by the Player).

Preferably press Stop to mute microphone. Preferably press Play to un-mute the microphone.

To start the playback of the selected sample, preferably press Play. Preferably press Stop to stop the sample and go back to sample selection screen.

In Song mode, preferably press Play to pause the music. Preferably press Play again to resume playback. Pressing Forward key in the song select screen preferably will create a new Play list. In the song selection screen, preferably press Stop to go back to the Home screen.

In the Style selection screen preferably press Stop to go back to the Home screen.

To enter the file management menu for the highlighted file, preferably press Play.

While browsing the file management list, preferably press Forward to scroll down to next page. Press Backward preferably to scroll up to previous page.

In the file management menu, to start a selected action, preferably press Play.

When selecting Delete, preferably a confirmation screen is displayed.

When selecting Rename, preferably a screen showing the name of the file in big font is displayed and the first character is preferably selected and blinking.

When copying a file, preferably press Play to validate the copy. If a file of the same type as the source file exists with the same name, preferably a confirmation screen asks if the file should be overwritten. Select YES or No and preferably press Play to validate. Press Stop to abort the copy and preferably return to file menu. It is a preferable feature of this embodiment to allow files to be copied from one removable memory storage location (e.g., SMC) to another by use of MP 36 RAM. In this example, it is a desirable to enable the copying of individual song or system files from one SMC to another without using a companion PC software program, however, in the case where an entire removable memory storage volume (e.g., all the contents of a particular SMC) is to be copied, it is desirable to use a companion PC software program to allow larger groups of data to be temporarily buffered (using the PC resources) by way of the USB connection to the PC. Such a feature may not be possible in certain embodiments without the PC system (e.g., using the MP 36 internal RAM) because it likely would involve the user repeatedly swapping the SMC target and source volumes.

The e-DJ, v-Radio, Songs, Samples and System direct access keys detailed in FIG. 3 preferably permit the user to directly enter the desired mode from within any other mode. These keys preferably can also be used to stop any mode, including the current mode. This can be faster than the Stop key, because in some cases, such as while in eDJ Mode inside a lane, the Stop key preferably may be used to mute the lane, rather than stop the eDJ Mode.

The audio output control is identified in FIG. 1 as Vol. Up/Down. Audio output control keys preferably are also used to control the microphone input when used in combination with prefix keys.

The Up/Down/Left/Right keys preferably comprise a joystick that can be used for: menu navigation, song or music Style selection, and real time interaction with playing music. Additionally, Up/Down preferably can be used for moving between modes such as the Underground & I-Way modes in an intuitive manner.

When editing a list, objects preferably can be inserted or deleted by pressing Forward to insert an object after the highlighted one or pressing Backward to delete the highlighted object.

To browse the list or select parameters, preferably use Up/Down. To edit the highlighted object preferably press Right. Press Left preferably to go directly to first item in the list.

In instrument tunnels (i.e.; Drums, Bass, Riff and Lead), Right preferably can be configured to compose a new music pattern. Similarly, Left preferably can be used to return to previous patterns (see note below on music patterns). The new pattern preferably will be synchronized with the music and can start playing at the end of the current music sequence (e.g., 2 bars). In the mean time, preferably a "Composing . . . " message can be configured to appear on the status line. Additionally, Down can be used to compose a new music pattern without incrementing the pattern number. This preferably has the same effect as Right (compose and play another pattern), except that the pattern number preferably won't be incremented.

One benefit of these composition features is that they enable the user to change between patterns during a live performance. As can be appreciated, another reason for implementing this feature is that the user preferably can assemble a series of patterns that can be easily alternated. After pressing Right only to find that the newly composed pattern is not as desirable as the others, the user preferably can subsequently select Down to discard that pattern and compose another. Upon discovering a pattern that is desirable, the user preferably can thereafter use Right and Left to go back and forth between the desirable patterns. Additionally, this feature preferably allows the system to make optimum use of available memory for saving patterns. By allowing the user to discard patterns that are less desirable, the available resources preferably can be used to store more desirable patterns.

In the file management menu, to select a desired action, preferably use Up/Down. When renaming files, the user preferably can use Left/Right to select the character to be modified, and Up/Down to modify the selected character. Pressing Right when the last character is selected preferably will append a new character. The user preferably can also use the Forward/Backward player function keys at these times to insert/delete characters.

In the microphone tunnel, Left/Right preferably can be configured to change microphone input left/right balance. In the sample tunnel, Left/Right preferably can be used to select a sample. Pressing Forward in the sample select screen preferably will create a new sample list.

Down is an example of an intuitive way to enter the Underground mode for the current I-Way mode lane. In this mode, the user preferably can change the pattern played by the selected instrument (drums, bass, riff or lead) and preferably apply digital effects to it. Similarly, Up preferably can be configured to go back to music I-Way from the Underground mode.

In v-Radio mode, to select the desired station preset, preferably use Up/Down. Preferably use Up/Down to go to previous/next station in the preset list and preferably press Save/Edit while a station is playing to store it in the preset list.

The Save/Edit key preferably can be used to save the current song as a User song that can be played back later. Such a song preferably could be saved to a secondary memory location, such as the SmartMedia card. In the case of certain Player embodiments, this preferably can be done at any time while the e-DJ song is playing, as only the "seeds" that generated the song preferably are stored in order to be able to re-generate the same song when played back as a User song. In certain embodiments it is preferable to incorporate a save routine that automatically saves revised files as a new file (e.g., with the same name but a different suffix). Such a feature can be used to automatically keep earlier versions of a file.

While the use of seeds is discussed elsewhere in this disclosure, it may be helpful at this point to make an analogy on the use of the Save/Edit 17 key. This key is used to save the basic parameters of the song in a very compact manner, similar to the way a DNA sequence contains the parameters of a living organism. The seeds occupy very little space compared to the information in a completed song, but they are determinative of the final song. Given the same set of saved seeds, the Player algorithm of the present invention preferably can generate the exact same sequence of music. So, while the actual music preferably is not stored in this example (upon the use of the Save/Edit 17 key), the fundamental building blocks of the music is stored very efficiently. The desirability of such an approach can be appreciated in a system with relatively limited resources, such as a system with a relatively low-cost/low performance processor and limited memory. The desirability of such a repeatable, yet extremely compact method of storing music can also be contemplated in certain alternative embodiments, such as those involving the communication with other systems over a relatively narrow band transmission medium, such as a 56 kbps modem link to the internet, or an iRDA/bluetooth type of link to another device. Clearly this feature can be advantageously employed using other relatively low bandwidth connections between systems as well. Additionally, this feature allows the user to store many more data files (e.g., songs) in a given amount of storage, and among other advantages, this efficiency enhances other preferable features, such as the automatic saving of revised files as new files (as discussed above).

In certain embodiments, it is desirable to check the resources available to a removable memory interface (e.g., the SMC interface associated with SMC 40) to safeguard the user song in instances where a removable memory volume is not inserted, and/or there is not enough available storage on an inserted removable memory volume. In these cases, when the user saves a song (e.g., pushes the Save/Edit key 17 button) it is advantageous to prompt the user to insert an additional removable memory volume.

The name of the song preferably can be temporarily displayed in the status line, in order to be able to select this song (as a file) later on for playback. Of course the song file name preferably can be changed later on if the User wishes to do so. Once an item has been created, it preferably can be edited by selecting it in the song or sample selection screens and pressing Save/Edit. Pressing Save/Edit again will preferably save the edited item and exit. When the On/Off key is pressed for more than 2 seconds, the Player preferably can be configured to turn on or off, yet when this combination is pressed only briefly, the On/Off key can alternatively preferably be configured to turn the LCD backlight on or off.

When Pitch/Tempo is pressed simultaneously with Left or Right, it preferably can be used as a combination to control the tempo of the music. When Pitch/Tempo is pressed simultaneously with Up/Down, it preferably can control the pitch of the microphone input, the music, etc.

When Effects/Filters is pressed simultaneously with Left/Right or Up/Down, it preferably can control the effect (for example, cutoff frequency or resonance) and/or volume (perhaps including mute) applied on a given instrument, microphone input, or sample.

As will be appreciated by one of ordinary skill in the art, other related combinations can be employed along these lines to provide additional features without detracting from the usability of the device, and without departing from the spirit and scope of the present invention.

Various examples of preferred embodiments for the structuring of a song of the present invention will now be described. Preferably for a new song, the only user input needs to be an input Style. Preferably even this is not required when an auto-play feature is enabled that causes the Style itself to be pseudo-randomly selected. But assuming the user would like to select a particular Style, that is the only input preferably needed for the present embodiment to begin song generation.

Before moving into the actual generation process itself, it is important to note that preferably implicit in the user's Style selection can be a Style and a SubStyle. That is, in certain embodiments of the present invention, a Style is a category made up of similar SubStyles. In these cases, when the user selects a Style, the present embodiment will preferably pseudo-randomly select from an assortment of SubStyles. Additionally, it is preferably possible for the user to select the specific SubStyle instead, for greater control. In these particular embodiments, preferably whether the user selects a Style or a SubStyle, the result preferably is that both a Style and a SubStyle can be used as inputs to the song generation routines. When the user selects a SubStyle, the Style preferably is implicitly available. When the user selects a Style, the SubStyle preferably is pseudo-randomly selected. In these cases, both parameters are available to be used during the song generation process to allow additional variations in the final song.

Figure 15:
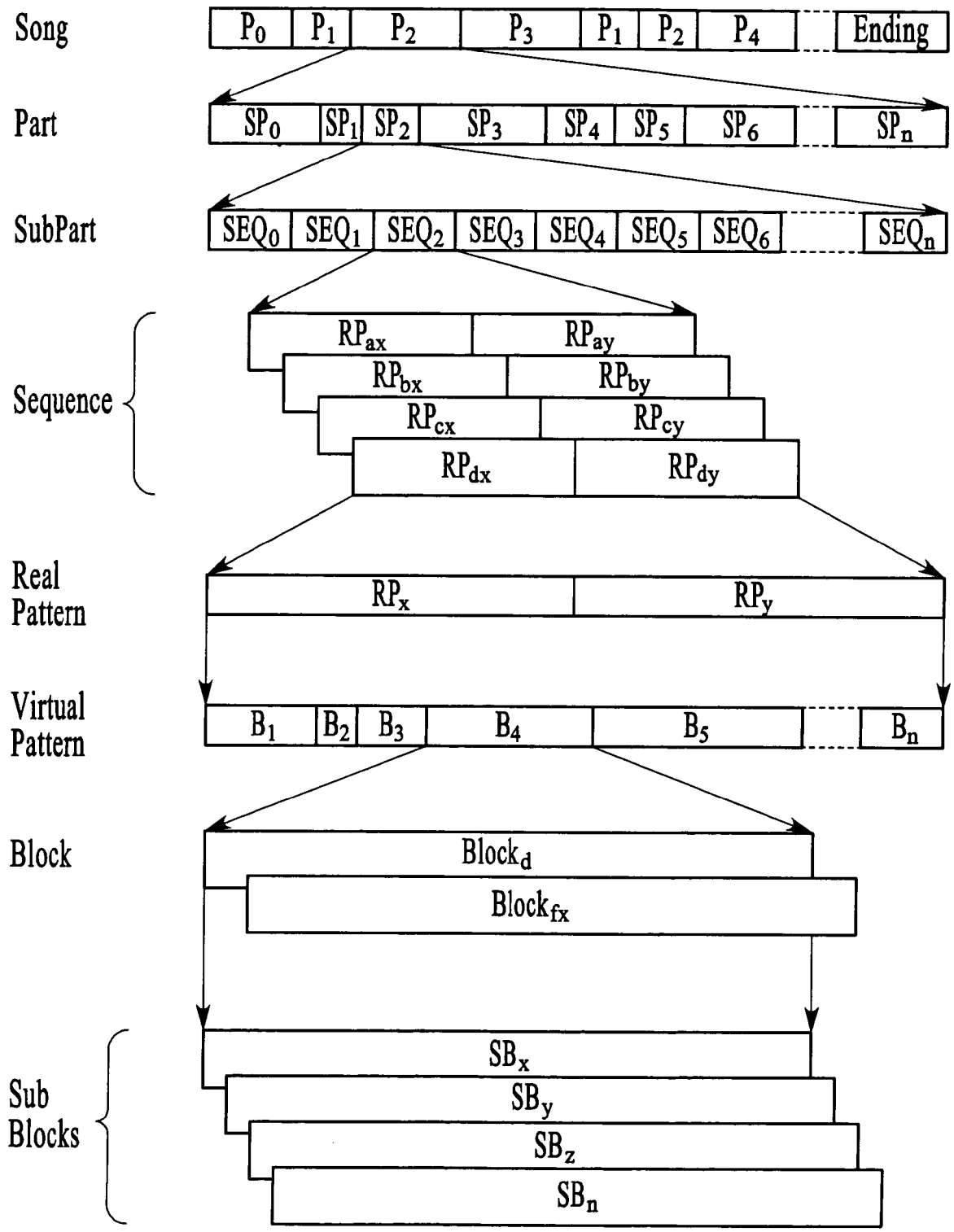
FIG. 15 illustrates the song structure used in certain preferred embodiments of the present invention.

As shown in FIG. 15, the Song is preferably comprised of a series of Parts. Each part preferably might be an intro, theme, chorus, bridge, ending, etc.; and different parts preferably can be repeated or returned to later in a song. For example, one series of parts might be: intro, theme, chorus, theme, chorus, theme, chorus, end. Certain Styles preferably may have special types of parts, and other Styles preferably may only use a subset of the available parts. This depends on the desired characteristics for a particular Style or SubStyle. For example, a 'cool' Style may not use a bridge part. Additionally, certain Styles that have a generally faster tempo preferably can use a virtually-doubled part size by simply doubling each part (i.e., intro, theme, theme, chorus, chorus, theme, theme, chorus, chorus, etc.).

Also, in certain cases, the user experience preferably may benefit from having the display updated for a particular Part. For example, an indication of the current position within the overall length of the song may be helpful to a user. Another example is to alert the user during the ending part that the song is about to end. Such an alert preferably might involve flashing a message (i.e., 'Ending') on some part of the display, and preferably will remind the user that they need to save the song now if they want it saved.

Another optimization at this level is preferably to allow changes made by the user during the interactive generation of a song to be saved on a part-by-part basis. This would allow the user to make a change to an instrument type, effect, volume, or filter, etc., and have that revised characteristic preferably be used every time that part is used. As an example, this would mean that once a user made some change(s) to a chorus, every subsequent occurrence of the chorus would contain that modified characteristic. Following this particular example, the other parts of the song would contain a default characteristic. Alternatively, the characteristic modifications preferably could either be applied to multiple parts, or preferably be saved in real time throughout the length of the song, as discussed further below.

Each Part preferably can be a different length, and preferably can be comprised of a series of SubParts. One aspect of a preferred embodiment involves the SubPart level disclosed in FIG. 15, but the use of the SubPart level is optional, in that the Part structure can be comprised directly by Sequences without the intervening SubPart level.

In certain embodiments, where a SubPart layer is implemented, each SubPart preferably can be of a different size. Such an approach can enhance the feel of the resulting musical composition, as it affords a degree of variety to the Parts.

Each SubPart preferably is comprised of a series of Sequences (SEQs). In keeping with the previous comment regarding the relationship between consistent sizing and flexibility of rule applications, each SEQ preferably can be the same length and time signature. In the example of FIG. 15, each SEQ is two bars long with a 4/4 time signature. Of course, these can be adjusted in certain variations of the invention, but in this example, this arrangement works well, because it allows us to illustrate how we can hold notes across a measure boundary. Typically, it might be advantageous to lengthen the size of the SEQs (as well as the RPs to be discussed hereinafter) to allow greater diversity in the musical outcome. Such a variation is certainly within the scope of the present discussion, as well as FIG. 15.

Following the example of FIG. 15, each SEQ preferably consist of multiple Real Patterns (RPs) in parallel. Generally, it is useful to have 1 RP for each type of instrument. In this case, a type of instrument preferably corresponds to a single lane of the I-Way user interface (i.e., drums, bass, riff, etc.). RP data preferably is actual note data; generally, information at this level preferably would not be transposed unless through user interaction, and even then such interaction preferably would likely apply to multiple instruments. Of course this is a user interface decision, and is not a limitation to the embodiments discussed here.

In this case, the multiple RPs preferably are merged together to comprise the SEQ. As will be recognized by those skilled in the art, this is analogous to the way a state-of-the-art MIDI sequencer merges multiple sets of MIDI Type 1 information into MIDI Type 0 file.

Further background detail on this can be found in the "General MIDI Level 2 Specification" (available from the MIDI Manufacturer's Association) which is hereby incorporated by reference.

One reason for allowing multiple RPs in parallel to define a SEQ, is that at certain times, certain lanes on the I-Way may benefit from the use of multiple RPs. This is because it may be desirable to vary the characteristics of a particular piece of the music at different times during a song. For example, the lead preferably may be different during the chorus and the solo. In this case it may be desirable to vary the instrument type, group, filtering, reverb, volume, etc., and such variations can be enacted through the use of multiple RPs. Additionally, this method can be used to add/remove instruments in the course of play. Of course, this is not the only way to implement such variations, and it is not the only use for multiple RPs.

Following the example of FIG. 15, each RP preferably is comprised of two bars, labeled RPx and RPy. Such a two bar structure is useful because it preferably allows some variations in MIDI information (chord changes, sustain, etc.) across the internal bar boundary. Such variation can provide the effect of musical variation without adding the complexity of having chordal changes occur inside a bar, or having notes sustained among multiple RPs.

Generally, it is cumbersome to allow notes to be held over multiple RPs. This is partly because of the characteristics of MIDI, in that to hold a note you need to mask out the Note Off command at the end of a pattern, and then mask out the Note On command at the beginning of the next pattern. Also, maintaining the same note across pattern boundaries is a concern when you switch chords, because the end of a pattern preferably is an opportunity to cycle through the chord progression, and you need to make sure that the old note being sustained is compatible with the new chord. The generation and merging of chord progression information preferably occurs in parallel with the activities of the present discussion, and shall be discussed below in more detail. While is considered undesirable to hold notes across patterns, there are exceptions.

One example of a potentially useful time to have open notes across multiple patterns is during Techno Styles when a long MIDI event is filtered over several patterns, herein called a 'pad'. One way to handle this example, is to use a pad sequence indicator flag to check if the current SEQ is the beginning, in the middle, or the end of a pad. Then the MIDI events in the pad track can be modified accordingly so that there will be no MIDI Note Offs for a pad at the beginning, no MIDI Note Ons at the beginning of subsequent RPs, and the proper MIDI Note Offs at the end.

Continuing our discussion of FIG. 15, RPs preferably are comprised of Virtual Patterns (VPs) that have had musical rules applied to them. Musical rules are part of the generation and merging of chord progression information that will be discussed in more detail below. A VP can be generally thought of as the rhythm of a corresponding RP, along with some general pitch information. Preferably, musical rules are applied to the VP, and the result is the RP. Musical rules are discussed in more detail below.

A VP preferably can be considered as a series of Blocks. In the example of FIG. 15, each Block has two dimensions: Blockd and Blockfx, but this is but one possible variation. In this example, Blockd corresponds to the data of the block, and Blockfx corresponds to effects that are applied to the data (i.e., volume, filtering, etc.). In this example, the Blockd information can be thought of as individual rhythmic pattern information blocks selected from a variety of possible rhythmic blocks (certain desirable approaches to create such a variety of possible rhythmic blocks, and the corresponding selection thereof in creating a VP, is discussed in greater detail later in this disclosure, with reference to FIGS. 22 and 23).

The Blockfx dimension described in FIG. 15 is an optional way to add certain preferably characteristics to the Blockd information. For example, in addition to volume or filtering information mentioned above, the Blockd dimension preferably can be used for allocation or distribution of musical information predictors, discussed in more detail below as Virtual Note/Controller (VNC) information. However, the Blockfx dimension is optional, and the Blockd information can be processed independently of such volume or filtering information, to great success.

Assuming the example presented earlier wherein the time signature is 4/4 and the RP is two bars, all Blocks in a pattern preferably must add up to 8 quarter notes in duration. In this example, assuming n Blocks in a particular RP, the duration in quarter notes of each Block in the corresponding VP would be between 1 and $(8-\{n-1\})$. While this example describes 4/4 time with a quarter note being the basic unit of length for a Block, simple variations to this example preferably would include alternate time signatures, and alternate basic units for the Block (i.e., 13/16 time signature and $32^{nd}$ note, respectively, etc.).

Getting at the bottom of FIG. 15 we see an optional implementation of SubBlocks (SBs). Such an implementation could preferably be used, for example, for the drum lane of the I-Way during certain Styles, where it might be desirable to have separate SBs for the bass drum, cymbal, snare, etc. A further optimization of this implementation of the present embodiment would be to have the SB level of the drum lane preferably comprise directly the VP of the drum lane. Such an arrangement preferably would effectively remove the complexity of having a separate Blockfx for each individual SB of the drum lane. An example of where such an optimization might be useful when implementing the present invention is in an environment with limited resources, or an environment where having separate effects for separate parts of the drums (snare, bass drum, etc.) is not otherwise desirable.

Additionally, in some applications of the present invention, it may be desirable to enable certain levels in FIG. 15 to be bypassed. In such cases, this would preferably allow a user to input real pattern data in the form of actual note events (e.g., in real time during a song via a MIDI instrument as an input). Further, with the use of a companion PC software application (and a connection to the PC), in certain embodiments it is preferable to allow users to input their own MIDI patterns for use as Block data.

Various examples of preferred embodiments of the Music Rules used in the creation of a Song of the present invention will now be described.

Figure 16:
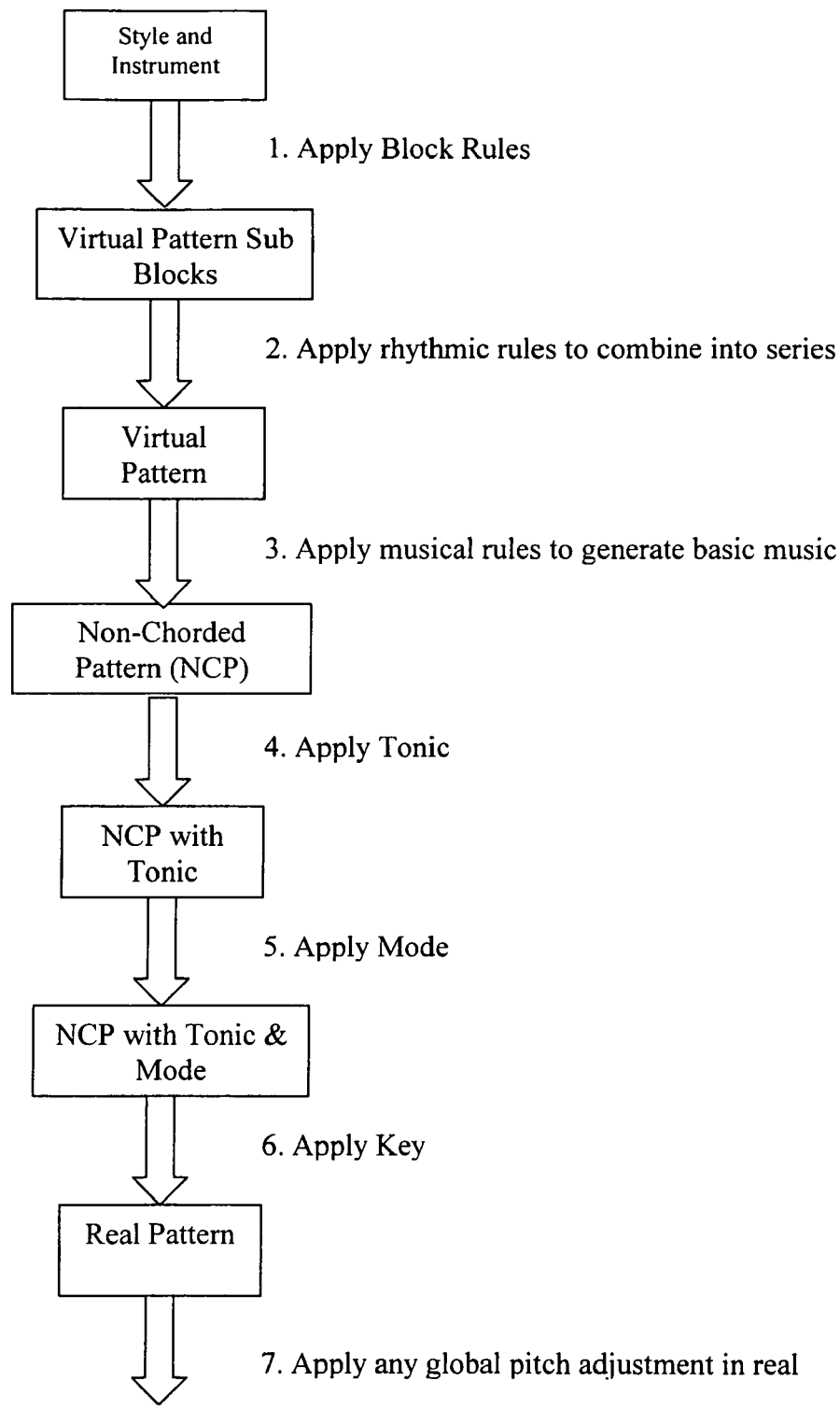
FIG. 16 illustrates an exemplary preferred musical generation flow utilized in certain preferred embodiments of the present invention.

FIG. 16 is a flow diagram depicting a general overview of a preferred approach to generating music in the context of the present invention. Starting at step 1, a style of music and a selected instrument are defined or loaded. Once the style of music and the type of instrument are known, the algorithm can apply Block rules to develop individual virtual pattern sub-blocks (e.g., those shown in FIG. 22). In certain alternative embodiments, the individual virtual pattern sub-blocks preferably are selected from a list or other data structure. Once the sub-blocks are available (e.g., from a list or from a block rule algorithm) they are processed into a Virtual Pattern (VP) at step 2. At this point in this example, a VP preferably is not music, although it does contain rhythmic information, and certain other embedded musical characteristics. At step 3, using the embedded musical characteristics of the VP data structure, musical rules preferably are applied to the VP to add more musicality to the pattern, and the result preferably contains both the rhythmic information of the VP, as well as actual musical information. At step 4 a tonic is preferably applied to the output from step 3, in that each measure preferably is musically transposed according to a tonic algorithm to impart a chordal progression to the data structures. Then at step 5, a mode preferably is applied that makes subtle changes to the musical information to output music information preferably set to a particular musical mode. Then, at step 6, a key preferably is applied to the data structure to allow key changes, and/or key consistency among various song components. Finally, at step 7, a global pitch adjustment preferably can be applied to the data structure, along with the rest of the song components, to allow real time pitch/tempo shifting during song play.

This process of applying various musical rules to generate a RP preferably can be a part of the overall song generation process mentioned above in connection with FIG. 15. Before going through the steps described in FIG. 16 in more detail, a discussion of the embedded characteristics mentioned above, as well as some mention of tonic and key theory will be helpful.

Bearing in mind that the MIDI Specification offers a concise way to digitally represent music, and that one significant destination of the output data from the presently discussed musical rules is the MIDI digital signal processor, we have found it advantageous to use a data format that has some similarities with the MIDI language. In the discussion that follows, we go through the steps of FIG. 16 in detail, with some examples of the data that can be used at each step. While the described data format is similar to MDI, it is important to understand the differences. Basically, the present discussion describes how we embed additional context-specific meaning in an otherwise MIDI compliant data stream. During processing at each of the steps in FIG. 16, elements of this embedded meaning preferably is extracted, and the stream preferably is modified in some musical way accordingly. Thus, one way to consider this process is that at each step, our stream becomes closer to the actual MIDI stream that is played by the MIDI DSP (this aspect is addressed in more detail below with reference to FIG. 21).

In the present example it is considered advantageous to break down the rhythmic and musical information involved in the music into Virtual Notes and/or Controllers (VNC). In the example of FIG. 17, we have provided several examples of VNCs that we have found to be useful. Basically, these VNCs represent our way of breaking down the musical rules of a particular genre into simplified mechanisms that can be used by an algorithm preferably along with a certain random aspect to generate new music that mimic the characteristics and variety of other original music in the genre. Depending on the Style of music, different types of VNCs will be useful. The list in FIG. 17 is simply to provide a few examples that will be discussed later in more detail.

In an important feature of this aspect of the present invention is that we have embedded control information for the music generation algorithm into the basic blocks of rhythmic data drawn upon by the algorithm. We have done this in a preferably very efficient manner that allows variety, upgradeability, and complexity in both the algorithm and the final musical output. A key aspect of this is that we preferably use a MIDI-type format to represent the basic blocks of rhythmic data, thus enabling duration, volume, timing, etc. Furthermore, we preferably can use the otherwise moot portions of the MIDI-type format of these basic blocks to embed the VNC data that informs the algorithm how to go about creating a part of the music. As an example, we preferably can use the pitch of each MIDI-type event in these basic sub-blocks of rhythmic data to indicate to the algorithm what VNC to invoke in association with that MIDI-type event. Thus, as this rhythmic data is accessed by the algorithm, the pitch-type data preferably is recognized as a particular VNC, and replaced by actual pitch information corresponding to the VNC function. FIG. 17 shows, in the first column, examples of such embedded values, and in the second and third columns, examples of recognized VNC nomenclature, and potential pitch information associated therewith.

In the example of FIG. 17, the fundamental type of VNC preferably is the Base Note. This can be considered in certain musical styles as the cornerstone of the melody, except, for example, when these notes are relatively short notes in a run. This is why rhythm exists in a VP to provide context to the VNCs. Example values of the Base Note are C, E, G or B. Which value is finally used preferably depends on a pseudo-random seed as part of an algorithm. We find that in these examples, these values provide pretty good music for the genres we have studied so far. The Magic Notes preferably can have the values indicated in FIG. 17 (assuming a diatonic scale is used), and these values are preferably relative to the preceding Base Note. Unlike a Base Note, Magic Notes preferably are useful at providing a note that does not strongly impact the melody. For example, the algorithm will see that the next note to be generated is a Magic Note 1, and it will use the Pseudo Random Number Seed to predictably select one of the possible values: +1, −1, +2, −2. The predictably-selected value preferably will be used to mathematically adjust the value from the preceding Base Note to preferably result in a note value. Following this example, if the preceding Base Note was a C2, and the result of the algorithm is to select a +1, then the Magic Note value is a D2. Note that preferably the only difference between Magic Note 0 and 1 is that Magic Note 0 can have a value of 0. Thus, the use of Magic Note 0 will occasionally result in a note that is the same value as the preceding Base Note. This is an example of a way to influence the sound of a particular Style in relatively subtle ways.

In the discussion above, by 'predictably-selected' we refer to the process of pseudo-randomly selecting a result based on a seed value. If the seed value is the same, then the result preferably will be the same. This is one way (though not the only way) to enable reproducibility. Further discussion of these pseudo random and seed issues is provided elsewhere in the present specification.

Continuing with FIG. 17, a High Note preferably simply adds an octave to the preceding Base Note, and is useful to make a big change in the melody. What is interesting here is that multiple VNCs preferably can occur in between the previous Base Note and the High Note, and this is a way to allow a musical phrase run to a tonic note, corresponding to an earlier Base Note. Obviously, this VNC is very useful, as it again preferably enables the structure of music to exist before the actual music itself is written. The algorithm preferably does not know what the final key, or mode will be at this point, but the octave and tonic preferably are available.

Similar to the Magic Note, the Harmonic Note VNC preferably allows the algorithm to pseudo-randomly select a harmonic from a set of possible harmonics. This capability is useful when there are multiple notes sounding at the same time in a chord. When this VNC is used, it preferably can result in any of the relative harmonics described in FIG. 17. These values are only examples of possible values, and ones that we find particularly useful for the types of music we have addressed.

Last Note is a VNC that is very similar to the Base Note, except that it preferably only contains a subset of the possible values. This is because, as we understand musical phrasing for the types of music we address, the final note preferably is particularly important, and generally sounds best when it has a relative value of C or G (bearing in mind that in this example, all the notes preferably can subsequently be transposed up or down through additional steps). As with all the VNCs, the precise note that might be played for this value preferably depends on the Mode and Key applied subsequently, as well as general pitch shifting available to the user. However, in the music we address, we find this to be a useful way to add subtlety to the music, that provides a variety of possible outcomes.

One Before Last Note is a VNC that preferably immediately precedes the Last Note. Again, this is because we have found that the last two notes, and the harmonic interval between them, are important to the final effect of a piece, and accordingly, we find it advantageous with the Final Notes of C and G to use One Before Last Notes of E, G, or B. These values can be adapted for other Styles of music, and only represent an example of how the VNC structure can be effectively utilized.

The last example VNC in FIG. 17 is the ALC controller. This is one example of how certain musical non-pitch concepts can preferably be employed using a MIDI controller. In this example, the ALC controller can be thought of as a prefix which modifies the meaning of immediately following notes. The ALC controller can be used to indicate that the next note is to be treated in a special manner, for example, to setup a chord. In this example, you can use a particular predefined value for the ALC controller to precede a sequence of a fixed note with additional harmonic notes. Similar to the Magic Note VNC discussed above, the Harmonic Notes following a ALC controller preferably allow the algorithm to pseudo-randomly select a harmonic from a set of possible harmonics. This capability is useful when there are multiple notes sounding at the same time in a chord. When this VNC is used, it preferably can result in any of the relative harmonics described in FIG. 17. These values are only examples of possible values, and ones that have been found particularly useful for the types of music addressed up to the time hereof. Another example use of the ALC controller is to setup fixed notes. In this case, preferably one follows the appropriate ALC controller with Fixed Note values for any desired actual note value. This approach is useful in many instances to have a more carefully limited song output where a particular interval between notes in the desired music can be achieved. Additionally, playing well-known phrases or sequences preferably is possible with this use of the ALC controller. One preferably could encode portions of an entire song this way to have a piece that closely resembles an existing musical piece. In this example, one preferably could have certain parts of the music still interactively generated to enable a song to sound just like an existing song (in melody, for example), yet preferably still allow other parts to be different (like bass or drums, for example).

In this manner, you can setup the resulting chord because the ALC value preferably will alert the software routine that is processing all of the VNCs to let it know that the following note is to be the basis of a chord, and that the next number of harmonic notes will be played at the same as the basis note, resulting in a chord being played at once. This example shows one way that this can be done effectively. Other values of VNC controllers preferably can be used to perform similar musical functions.

It is important to note that an additional variation can preferably be implemented that addresses the natural range, or Tessitura, of a particular instrument type. While the software algorithm preferably is taking the VNCs mentioned above and selecting real values, the real pitch value preferably can be compared to the real natural range of the instrument type, and the value of subsequent VNC outcomes preferably can be inverted accordingly. For example, if the Base Note of a given pattern is near the top of the range for a bass instrument Tessitura, any subsequent Magic Notes that end up returning a positive number can be inverted to shift the note to be below the preceding Base Note. This is a particular optimization that adds subtlety and depth to the outcome, as it preferably incorporates the natural range limitations of particular instrument types.

Figure 18A:
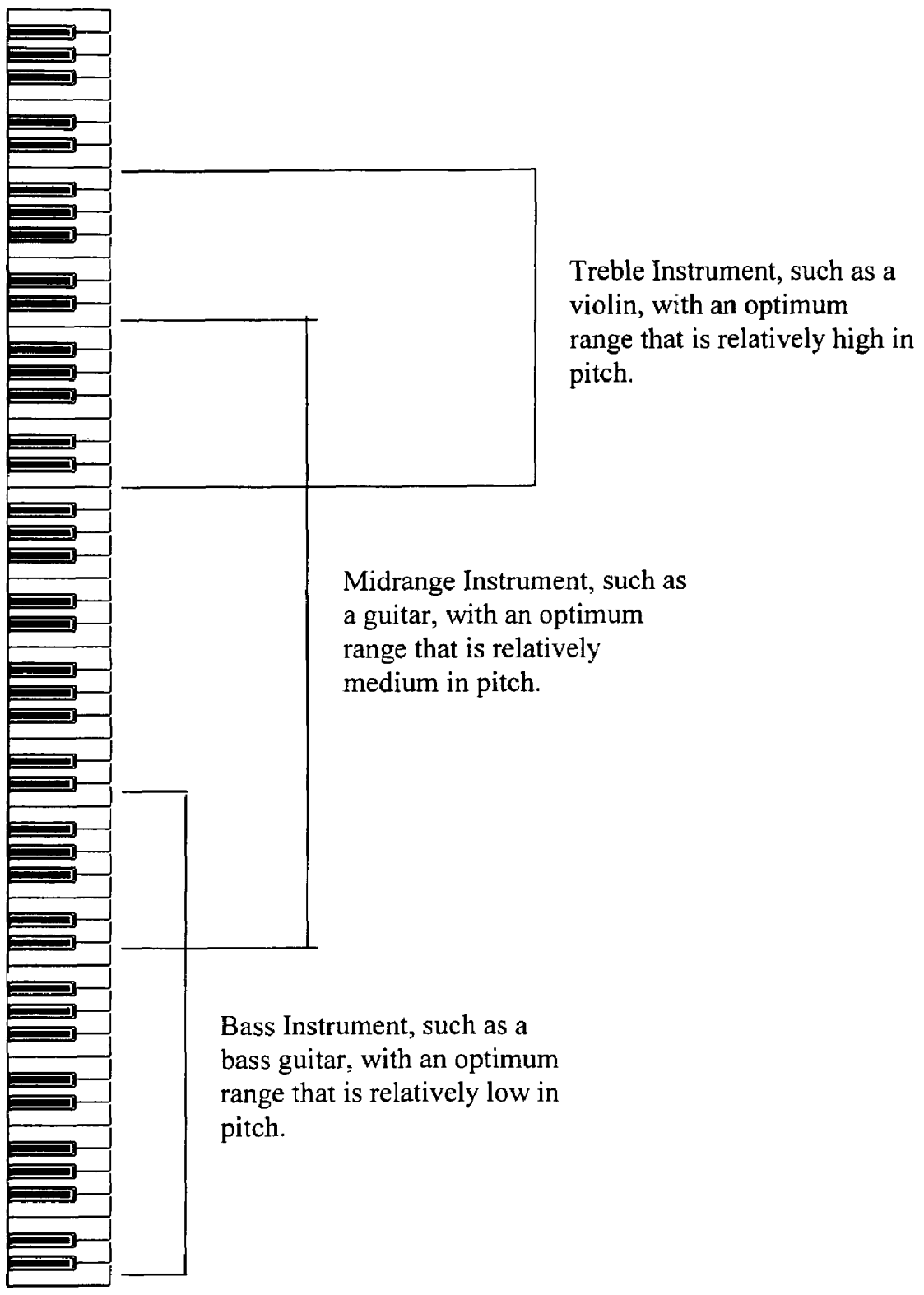
FIGS. 18A-B are diagrams illustrating Tessitura principles utilized in accordance with certain embodiments of the present invention.

As a simplified example of Tessitura, FIG. 18A depicts the relative optimal ranges of particular instrument types. In the present context, the Tessitura of an instrument preferably is the range at which it sounds optimal. Certain sounds in the MIDI sound bank preferably are optimized for particular ranges. If you select a bass guitar sound and play very high pitched notes, the result may not be very good. For higher pitches, a guitar or violin sound may work better. Accordingly, when the musical rule algorithm is processing VNCs, the Tessitura of the selected instrument type preferably can play a role in the outcome of the real note value generated. If the selected instrument is approaching the top edge of its' Tessitura, and the musical rule routine comes across a High Note VNC, then the algorithm preferably can be designed to bump the generated pitch down an octave or two. Similarly, other VNCs can be processed with deference to the Tessitura of the selected instrument.

In certain alternative embodiments, it is preferable to perform the conversion between virtual note controllers (VNCs) and real notes by relying in part upon state machines, tables, and a "Magic Function" routine. In this manner, new musical styles preferably can subsequently be released without changing the magic function. As an example, new styles can be created that involve new and/or modified VNC types, by merely updating one or more tables and/or state machines. Such an approach is desirable in that it enables the magic function to be implemented in an optimized design (e.g., a DSP) without sacrificing forward compatibility.

Figure 18B:
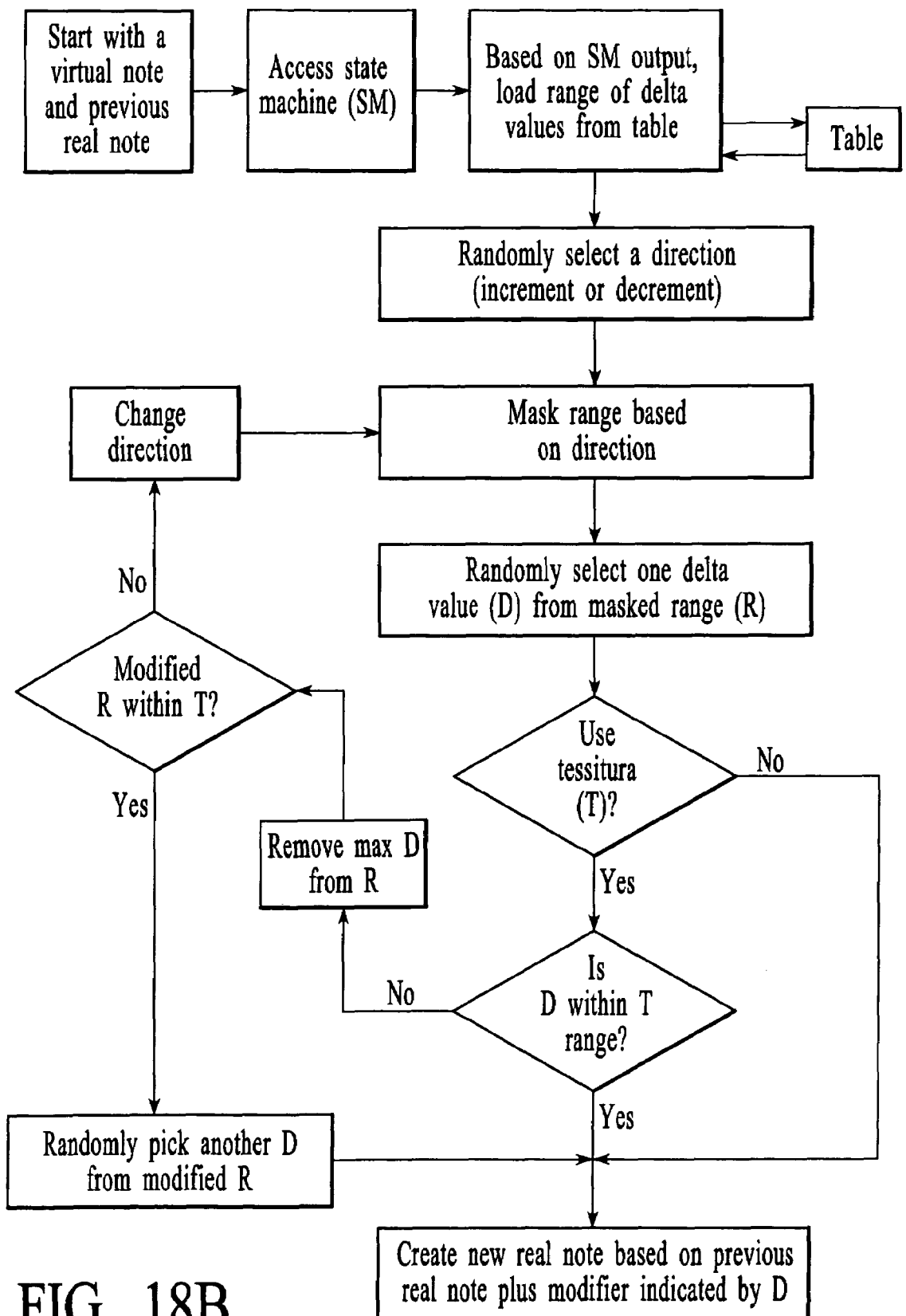

FIG. 18B illustrates a flow diagram of an exemplary magic function that relies on tables and/or state machines for forward compatibility. This magic function is called by the algorithmic music generator to generate a real note event based on a VNC event. It is expected that this function preferably will be called upon many times during a music piece, and, accordingly, the benefits of using an optimized design such as a relatively efficient DSP hardware design will be evident for certain implementations.

Starting at the top left of FIG. 18B, the magic function starts with the previous real note and the current virtual note (VNC) to be processed. The purpose of the function is to determine a real note event to correspond with the current VNC. In this example, we illustrate the use of a finite state machine (such as a Moore state machine, described in more detail by the National Institute of Standards and Technology at http://www.nist.gov/dads/HTML/finiteStateMachine.html) as part of the magic function, though it is not required in order to realize many of the advantages of the present invention. Continuing the discussion of FIG. 18B, it is preferable to access a state machine (SM) and thereby load a range of delta values from a table. Again, as discussed herein, the table and/or state machine can be stored in a manner that preferably affords easy updates. As an example of the range of delta values described here, assuming the use of a VNC such as the Magic Note 1 described herein in connection with FIG. 17, the range of delta values preferably loaded from a table is: {−2, −1, +1, +2}. At this point in FIG. 18B, the magic function randomly selects a direction (e.g., increment or decrement) to move in from the previously determined real note. For purposes of explanation herein, assume that a decrementing direction is chosen at this point. Then, the range of delta values is masked so that it contains only decrementing values (e.g., {−2, −1}). From this masked range, a single delta value preferably is then selected by the magic function.

In certain embodiments where a tessitura associated with a particular musical component (e.g., as described herein in connection with FIG. 18A) is NOT used, at this point in the magic function the delta value preferably can be applied to the previously determined real note to create a new real note. By way of example, assuming the previous real note was a G3, and the delta value is −2, then the new real note preferably might be an E3.

In certain embodiments where a tessitura of allowable ranges IS desired, at the point of the magic function illustrated in FIG. 18B that an individual delta value is selected from the masked range, it is desirable to check if the selected delta value is within the tessitura range of values. If it is not within the range, preferably the function discards the selected delta value (e.g., −2), removes the max value (e.g., −2) from the range of masked delta values, and checks whether the new max value is within the range of allowed values corresponding to the tessitura. If the new max value is within the range, the exemplary function randomly selects another one of the remaining values in the masked range, and proceeds to create the new real note. If, however, the new max value is not allowed by the tessitura range, then the magic function then preferably discards the current masked range of delta values, changes the direction (e.g., from decrement to increment), and masks the original range of delta values in the new direction. In this manner, when the magic function is operating near one edge of the allowed range of tessitura values, it preferably can 'sense' the edge and turn around. So, in the event that VNCs associated with an instrument such as a flute (e.g., with a relatively high tessitura range) are currently being processed, and the randomness of the process causes the melody being composed to approach the bottom edge of the normal range associated with a flute instrument, the present exemplary magic function preferably can change from a decrementing direction to an incrementing one, and thereby stay within the normal pitch range associated with a flute. In a manner such as the one described here, it is possible to provide an efficient algorithm (e.g., DSP) for creating real pitch events from virtual pitch events, while allowing future upgrades in the types of virtual pitch events (e.g., by updating the state machine tables), as well as the individual delta values associated with each virtual is pitch event (e.g., by updating the table of values associated with a particular VNC). Furthermore, while the representative examples discussed here are directed to the functions involved in moving from a VNC to a real note, it will be clear to one of skill in this art that such an approach can be similarly applied to any of the other composing elements described elsewhere in this disclosure, such as the selection of a chord progression, a song structure, etc.

FIG. 19 describes another aspect of this musical process. Musical Key changes preferably can be encoded as offsets. By this we mean that given a Key of X, the Key can be shifted up or down by inserting an offset. Such an offset preferably will transpose everything by the exact value to result in a musical phrase that is exactly as it was, but now in a different Key. FIG. 19 has as examples the Keys of A, C, D, and G. A Key of C preferably would have an offset of 0, A an offset of −3, D an offset of +2, and G an offset of +8. As will be appreciated by a student of Musical Theory, the offset preferably corresponds closely with a number of half steps in an interval. The interval between C and G is 8 half steps. Other Keys can be similarly achieved.

The use of halfsteps for encoding Keys is advantageous because, as mentioned previously, the MIDI language format uses whole numbers to delineate musical pitches, with each whole number value incrementally corresponding to a half step pitch value. Other means of providing an offset value to indicate Keys can be applied, but in our experience, the use of half steps is particularly useful in this implementation because of we are preferably using a MIDI DSP, and so the output of the Musical Rules preferably will be at least partly MIDI based.

FIG. 20 describes another Musical Rule that preferably is part of the overall process: Mode application. As can be appreciated by a student of Musical Theory, assuming the mode is described in terms of sharps (as opposed to flats) the particular placement of sharps is a large part of what gives each musical phrase its own identity. In FIG. 20 we give the example of a Lydian Mode, with Ascending or Descending versions preferably available. Other well established musical modes exist (Ionian, Dorian, Hypodorian, Phrygian, Hypophrygian, Hypolydian, Mixolydian, Aeolian, Locrian, etc.) and we only use Lydian here in the interests of space. Clearly, the present invention can involve other modes, with corresponding values as those in FIG. 20. In cases where a mode is desired that is not a conventional western mode, it is preferable to upgrade or alter the soundbank (e.g., located in Flash 49) so that other musical intervals are possible.

FIG. 20 begins with a list of all preferably available notes in the genre of music that we are addressing. That is followed by the corresponding preferably natural note values that we term Natural Mode. The values of notes in the Natural Mode preferably correspond to the All Notes row of notes without the sharps (again assuming that in the present discussion we are defining our modes in terms of sharps, and not flats). Then the Lydian mode preferably is listed, which does not allow F naturals. In order to decide whether an F natural is to be raised to the next available pitch of F sharp, or lowered to the next available pitch of E, an algorithm preferably will decide between an ascending or descending transposition. Accordingly, a descendingly transposed F natural preferably will be changed to an E, and an ascendingly transposed F natural preferably will be transposed to a F sharp. Given that sharps vary from the Natural Mode, the use of an ascending Lydian Mode results in music that has more F sharps, and is thus more aggressively Lydian. This general concept is evident in other Modes as well, with ascending transpositions typically being more aggressive than descending transpositions.

At this point we will go through a detailed example of the Musical Rule portion of the algorithm, using FIG. 21 as the example. This discussion will incorporate the earlier discussions of the preceding figures, to demonstrate how a preferred embodiment of the present invention preferably incorporates them.

FIG. 21 depicts the data as it preferably exists between each of the numbered steps 2-6 in FIG. 16. The Musical Notation is represented to clarify the overall concept, as well as to indicate a simplified example of the preferable format the data can take in the software routine.

Beginning at the top row, there is a collection of predefined VP Sub-Blocks that preferably can advantageously be indexed by music Style and/or length. These blocks preferably are of variable sizes and preferably are stored in a hexadecimal format corresponding to the notation of pitch (recognizing that in certain embodiments the pitch information of a VP does not represent actual pitch characteristics, but VNC data as discussed above), velocity, and duration of a MIDI file (the preferable collection of predefined VP-Sub-Blocks is discussed in more detail below with reference to FIGS. 22-23). As shown in the top row of FIG. 21, Rests preferably are also available in this collection of available patterns. This collection of indexed Sub-Blocks preferably is used by a software routine to construct Virtual Patterns (VPs). As mentioned earlier, certain alternative embodiments preferably involve using algorithmic block rules to generate the collection of Sub-Blocks. Such algorithmic rules preferably are configured to accept the music style and instrument type as inputs to then output a collection of Sub-Blocks that are appropriate for that style/instrument combination. Whether the Sub-Blocks are selected from predefined collection, or generated on the fly with an algorithm, they preferably are organized into a VP. VPs preferably are a collection of Sub-Blocks that have been assembled by the routine into preferably consistently-sized groupings.

After step 2 of FIG. 16 is applied, we preferably have a VP. The second row of FIG. 21 (VP) depicts an example VP that is 2 bars long, and composed of the following sequence: Base Note, Magic Note 1, Magic Note 0, High Note, and another Base Note. Note that at this time the rhythm of the part preferably is in place, and the value of each note is conceptually the embedded VNC information. If the VP is played at this point, the output would likely not be pleasing. The right column of row 2 depicts the format that this data preferably is stored in; as is discussed elsewhere in this disclosure, this format is remarkable similar to MIDI format data, with one exception being that the VNC information preferably is implicitly embedded in the data stream.

The third row (NCP) depicts the same data after step 3 of FIG. 16 is applied. The VNCs embedded in the VP from row 2 preferably have been interpreted by the routine with the help of pseudo-random selections from the possible VNC values. Thus, for the first Base Note in row 2, we have a real note value of E in row 3, and for the Magic Note Type 1 of row 2 we have decremented the previous Base Note two half steps to a D in row 3. For the Magic Note Type 0 we have adjusted the previous value by 0, resulting in another D. This goes on through the VP, and the result is clear in row 3. At this point, we preferably have the basic musical information that will end up in the song, except that the Chord and Mode transpositions preferably have not yet been made.

The fourth row in FIG. 21 (PwT) depicts the data stream after step 4 of FIG. 16 is applied. As can be seen, the NCP of row 3 has been transposed down. This is to allow the particular pattern being constructed to preferably conform to a particular Tonic note, thus placing it into a suitable chord preferably to match the other elements of the musical piece. This feature allows different portions of the melody preferably to conform to different tonic notes, thus preferably proceeding through a chord progression, while ensuring that all instruments preferably conform to the same chord progression.

Row 5 of FIG. 21 (PwTM) takes the pattern of notes and preferably conforms it to a particular Mode (e.g., Ionian, Dorian, Hypodorian, Phrygian, Hypophrygian, Lydian, Hypolydian, Mixolydian, Aeolian, Locrian, etc.) preferably as well as a particular Mode type (like descending, ascending, etc.). A more complete list of musical modes and mode types has been prepared by Manuel Op de Coul (available on the world wide web at: www.xs4all.nl/~huygensf/doc/modename.html) and is hereby incorporated herein by reference. The conformation of the pattern of notes to a particular Mode preferably is done in a manner consistent with FIG. 20, discussed above. In the example of FIG. 21, the resulting musical phrase is very similar to that of Row 4, except the notable difference of the C sharp being reduced to a C. This is because there is no such C sharp in the Lydian mode, and so it's removal is preferably required at this step. If the Modal adjustment were using the Lydian ascending mode, which is more aggressively ascending because there are more sharps, this C sharp would have preferably 'rounded up' to the next Lydian note of D. But, since in this example we are using a Lydian descending mode, the C sharp is preferably 'rounded-down' to a C.

The final row of FIG. 21 (RP) indicates the point when the musical phrase preferably can be globally transposed up or down the scale. This is advantageous in the case where a global pitch adjustment feature is desired to preferably allow the user to quickly and easily shift the pitch of a song up or down (such as is discussed in an earlier example of the Pitch/Tempo key used in combination with the Up/Down keys). The example of Row 6 shows a transposition of 2 half steps. As with all the rows of this figure, this can be seen in the musical notation, as well as the software notation, where the third pair of numbers can be seen to increment by a value of two, for each line.

There are instances where certain elements of the music preferably do not need the musical rules discussed above to be invoked. For example, drum tracks preferably do not typically relate to Mode or Key, and thus preferably do not need to be transposed. Additionally, many instrument types such as drums, and MIDI effects, preferably are not arranged in the MIDI sound bank in a series of pitches, but in a series of sounds that may or may not resemble each other. In the example of drums, the sound corresponding to C sharp may be a snare drum sound, and C may be a bass drum sound. This means that in certain cases, different levels of the process discussed above in reference to FIG. 21 preferably may be advantageously bypassed in these cases.

Figure 23:
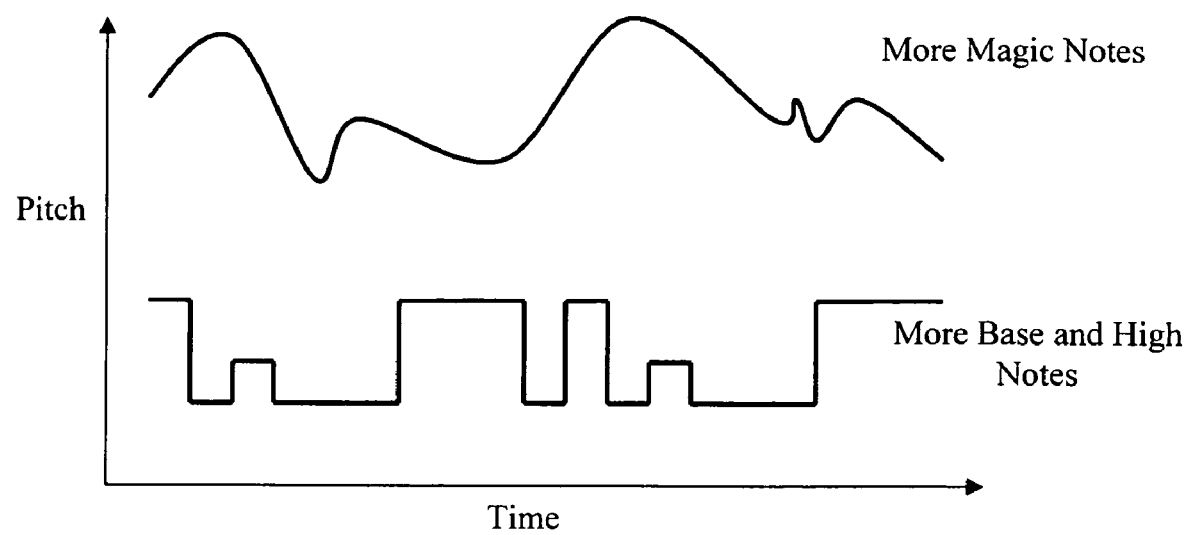
FIG. 23 illustrates principles of the relative mobility of note pitch utilized in accordance with certain embodiments of the present invention.

The collection of sub-blocks discussed above, from which VPs preferably are constructed, can be better understood in light of FIGS. 22 and 23.

FIG. 22 depicts an example of the rhythmic variations that preferably are possible, based on example durations of 1 or 2 quarter notes. The first row indicates the 4 possible variations, given a few basic conditions: that the eighth note is the smallest unit, the length is 1 quarter note, and that all full rests are indicated separately as 'empty'. The second row in FIG. 22 lists the possible variations, given similar variations: that the eighth note is the smallest unit, that any variations in the first row are not included, and that the length is 2 quarter notes.

One way to create a set of rhythmic variations such as those in FIG. 22 preferably is to put the variation data into MIDI event format. This approach preferably involves using a MIDI sequencer software tool (such as Sonar from Cakewalk, and Cubase from Steinberg) to generate the rhythmic blocks. This preferably allows the use of a variety of input methods (e.g., a keyboard controller, a MIDI wind controller, a MIDI guitar controller, etc.), and further preferably allows the intuitive copying, pasting, quantizing, and global characteristic adjustments (e.g., selecting multiple events and adjusting the pitch for all). Then, the MIDI events preferably can be exported as a MIDI file (possibly 1 file for each instrument group). Finally, a software batch file program preferably can be written to open the MIDI file and parse out the substantial header information, as well as any unneeded characteristic information (such as controller or patch information), and preferably output the optimized data into a file that is suitable to include in the source code (e.g., ASCII text tables). The use of the sequencing tool preferably enables one to quickly generate a variety of appropriate rhythmic blocks for a given instrument type, since the vast array of MIDI controller devices are available that can mimic the characteristics of a particular instrument type. For example, one can use a MIDI guitar controller to strum in patterns for a guitar type of instrument group.

The example of FIG. 22 is simplified to convey a concept; that all rhythmic variations covering up to two quarter notes (given the conditions discussed above) preferably can be organized very efficiently according to rhythmic density. FIG. 22 teaches an advantageous way to efficiently organize the set of blocks used to construct a VP shown in FIG. 15. If the example of FIG. 22 were expanded to include additional rows for rhythmic blocks with longer durations, given conditions such as those described above that are consistent across the rows, then each subsequent row would have patterns of less density than those above it. This is because of the condition that each row does not include any of the variations present in rows above it, and because the duration of the pattern increases for each subsequent row. Thus, there is a direct relationship between the example shown in FIG. 22 and the relative rhythmic density of patterns used to make a VP.

Clearly, if any of the conditions described in FIG. 22 were changed, e.g., if a sixteenth note were the smallest unit or full rests were indicated with a pattern containing a rest, then preferably the number of variations would be different. While the number would be different, the desirable effects of organizing patterns based on this concept of rhythmic density would remain.

In addition to efficiency, such an approach to organizing the available rhythmic blocks preferably enables the use of rhythmic density as an input to a software (e.g., algorithmic function) or hardware (e.g., state table gate array) routine. Thus, one preferably can associate a relative rhythmic density with a particular instrument type and use that rhythmic density, possibly in the form of a desired block length, preferably to obtain a corresponding rhythmic block. This preferably can be repeated until a VP is complete (see FIG. 15). The VP preferably can thereby be constructed with a desired relative rhythmic density. This is particularly useful because it preferably allows the creation of VPs with almost limitless variations that have rhythmic characteristics preferably generally corresponding to a given instrument type.

As will be apparent to one of ordinary skill in the art of MIDI, given the context of VP generation discussed herein, the rhythmic variations shown in FIG. 22 can be represented in the form of MIDI events. In this case, many of the available characteristics in the MIDI events, such as pitch, velocity, aftertouch, etc., preferably might be generically set. Then, additional functions for such characteristics preferably can be applied to the MIDI events during the creation of VPs to impart additional subtlety to the finished music. Such functions preferably can be fairly simple and still be effective. As one example, for a given Style of music (e.g., rock), the velocity of any MIDI events in the VP that fall on a particular location in the measure (e.g., the downbeat) can be modestly increased. Similarly, in a music Style that generally has a rhythmic swing feel, where one or more of the beats in a measure may be slightly retarded or advances, the corresponding MIDI events in a VP preferably can be modified so as to slightly adjust the timing information. Clearly, these types of simple functions preferably can be selectively applied to either a given instrument type, and/or a given musical Style.

Similar to the concept of using relative rhythmic density as a deterministic characteristic in creating algorithmic music, FIG. 23 describes a concept of relative mobility of note pitch. As shown in FIG. 23, the vertical axis indicates pitch change, and the horizontal axis indicates time. Two example types of melody streams are depicted; the top having a fluid movement through a variety of pitches, and the bottom having rather abrupt, discrete changes among a fewer number of pitches. Thus, the melody on the top of FIG. 23 has a higher relative mobility of note pitch. As can be appreciated by the previous discussion of VNCs, the melody example on the top preferably would generally require more Magic Notes to imitate, and the melody example on the bottom preferably would generally require more Base Notes and High Notes to imitate.

This concept preferably applies to most instrument types in a given musical Style as well, in that certain instruments have a higher relative mobility of note pitch than others. As an example, a bass guitar in a rock Style can be thought of as having a lower relative mobility of note pitch compared to a guitar in the same Style. The relationship between relative mobility of note pitch and relevant VNC type can be very helpful in creating the collection of predefined sub-blocks discussed above, in that it serves as a guide in the determination of actual VNC for each rhythmic pattern. When one wants to create a set of rhythmic building blocks for use in a particular musical Style and/or instrument type, it is advantageous to consider/determine the desired relative mobility of note pitch, and allocate VNC types accordingly.

As an additional variation, and in keeping with the discussion above regarding relative rhythmic density, an architecture that constructs a VP for a given instrument type and/or musical Style preferably can greatly benefit from a software (e.g., algorithmic function) or hardware (e.g., state table gate array) routine relating to relative mobility of note pitch. As an example, a particular music Style and/or instrument type can be assigned a relative rhythmic density value, and such a value can be used to influence the allocation or distribution of VNC types during the generation of a VP.

The use of relative rhythmic density and relative mobility of note pitch in the present context preferably provides a way to generate VPs that closely mimic the aesthetic subtleties of 'real' human-generated music. This is because it is a way of preferably quantifying certain aspects of the musical components of such 'real' music so that it preferably can be mimicked with a computer system, as disclosed herein. Another variation and benefit of such an approach is that these characteristics preferably are easily quantified as parameters that can be changeable by the user. Thus a given musical Style, and/or a given instrument type, preferably can have a relative mobility of note pitch parameter (and/or a relative rhythmic density parameter) as a changeable characteristic. Accordingly, the user preferably could adjust such a parameter during the song playback/generation and have another level of control over the musical outcome.

Various examples of preferred embodiments for the block creation aspects of the present invention will now be described.

Figure 24:
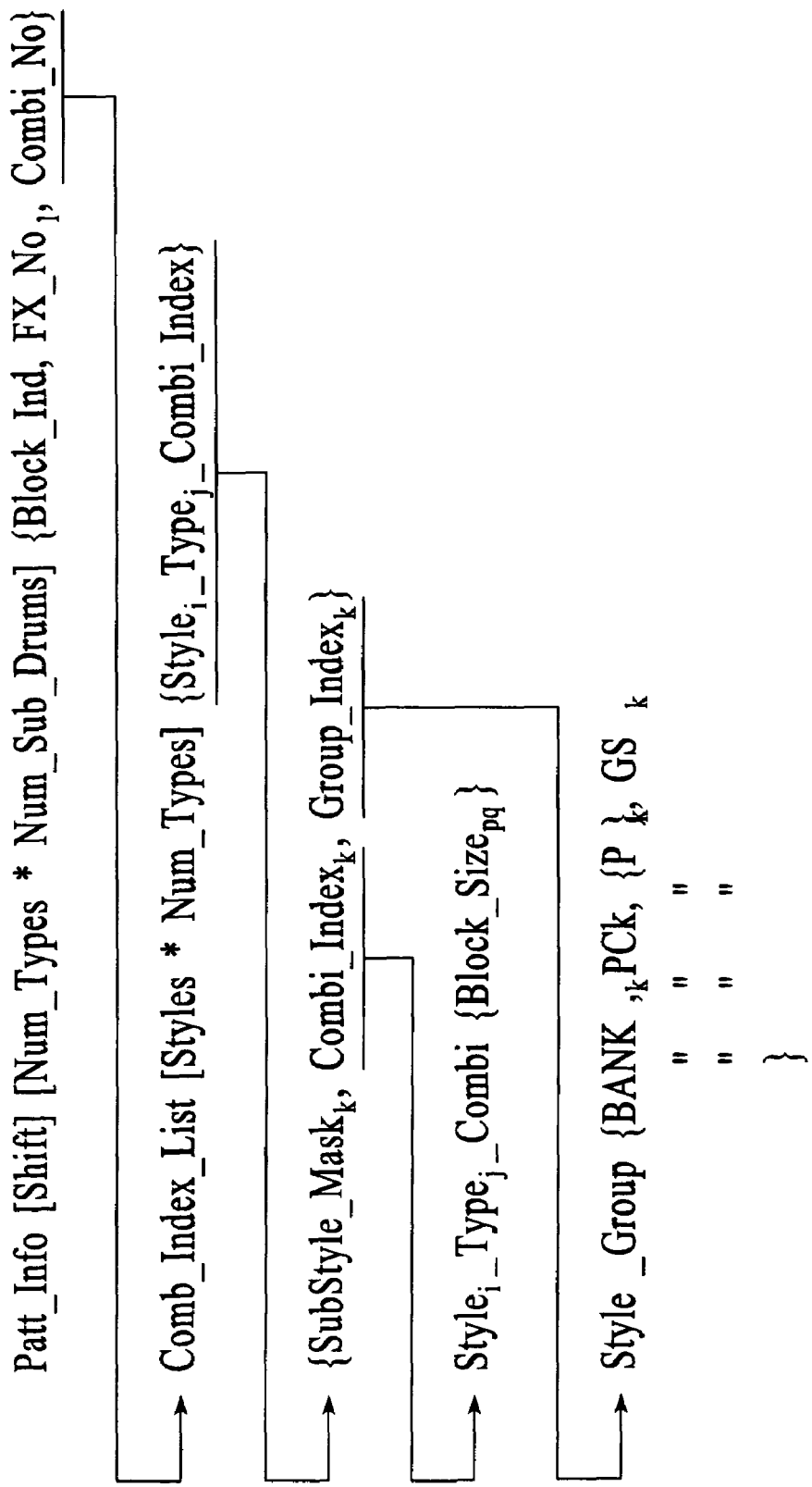
FIG. 24 illustrates a pattern structure creation example in accordance with certain embodiments of the present invention.

Continuing the example presented in FIG. 15, wherein a RP preferably is 2 bars, and a VP preferably is comprised of 8 quarter notes (QN), the pattern structure creation example of FIG. 24 assumes that the particular song generation implementation preferably involves a VP length of 8 QN, a 2 bar RP, and variably-sized Blocks. While those skilled in the art will appreciate the considerable number of advantages arising from the architecture of this preferred embodiment, they will additionally appreciate that various adaptations and modifications to these embodiments can be configured without departing from the spirit and scope of the invention.

As shown in FIG. 24, one preferred embodiment of the present invention involves the creation of a pattern structure. This pattern structure preferably is comprised of the information needed to select the actual Blocks, which in many ways are the fundamental unit of the song generation. This example of pattern structure creation involves determining each Block's duration (in a given VP), as well as the group of instruments from which the Block will be selected. Following this step, and discussed below, this information preferably is used to directly generate the Blocks themselves.

Patt_Info is a routine that preferably can be used to generate the pattern structure information as part of the creation of a particular VP from Blocks.

Shift is a multiplier that preferably can be used in a variety of ways to add variation to the composed VP; for example, it could be a binary state that allows different Block variations based on which of the 2 bars in the RP that a particular Block is in. Other uses of a Shift multiplier can easily be applied that would provide similar variety to the overall song structure.

Num_Types is the number of instruments, and Num_Sub_Drums is the number of individual drums that make up the drum instrument. This latter point is a preferable variation that allows an enhanced layer of instrument selection, and it can be applied to other contexts other than the drum instrument. Conversely, this variation is not at all necessary to the present invention, or even the present embodiment.

Block_Ind is the Block index, FX_No is for any effects number information. Combi_No is an index that preferably points to a location in a table called Comb_Index_List. This table preferably is the size of the number of Styles multiplied by the number of instrument types; each entry preferably contains: SubStyle_Mask to determine if the particular entry is suitable for the present SubStyle, Combi_Index to determine the Block length, and Group_Index to determine the group of individual MIDI patches (and related information) from which to determine the Block.

Combi_Index preferably points to a table called Style_Type_Combi that preferably contains multiple sets of Block sizes. Each Block_Size preferably is a set of Block sizes that add up to the length of the SEQ. An example SEQ length is 8 QN.

Group_Index preferably points to a table called Style_Group that preferably contains sets of MIDI-type information for each group of Styles, preferably organized by MIDI Bank. PC refers to Patch Change MIDI information, P refers to variably sized MIDI parameters for a given Patch, and GS stands for Group Size. GS for group 1 preferably would indicate how many instruments are defined for group 1.

One preferable optimization of the execution of this step is to incorporate a pseudo-random number generator (PRNG) that preferably will select a particular patch configuration from the group identified by GS. Then, as the user elects to change the instrument within a particular SubStyle, and within a particular lane, another set of patch information preferably is selected from the group identified by GS. This use of a PRNG preferably can also be incorporated in the auto-generation of a song, where, at different times, the instrument preferably can be changed to provide variation or other characteristics to a given song, Part, SubPart, SEQ, RP, VP, etc. There are other areas in this routine process that preferably could benefit from the use of a PRNG function, as will be obvious to one of ordinary skill in the art.

Figure 25:
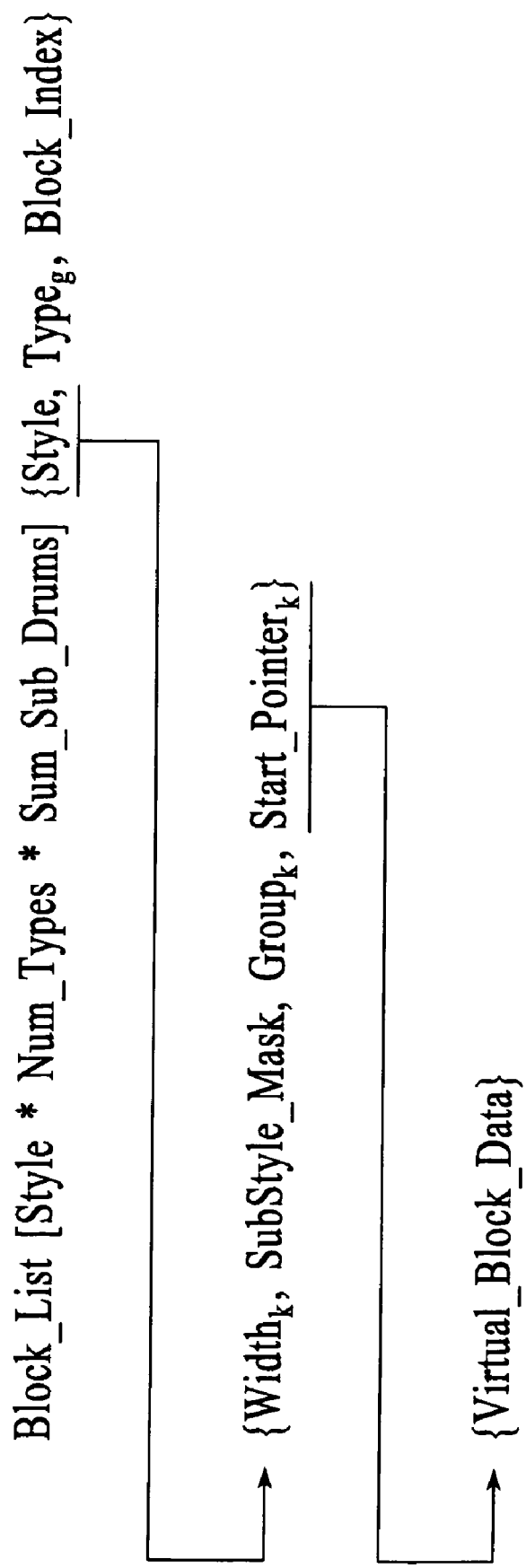
FIG. 25 illustrates a block structure creation example in accordance with certain embodiments of the present invention.

Once the Block duration and instrument patch information preferably are determined for a given VP, the virtual Block information preferably can be determined on a Block-by-Block basis, as shown in FIG. 25.

Block_List preferably is a routine that can determine a virtual Block using the Block size, and the instrument type. As shown in FIG. 25, Style preferably is a pointer to a table of Virtual_Block_Data pointers that preferably are organized by Width (i.e., 1-8 QN) and Group (i.e., instrument group). Once the Start_Pointer is determined, the Block data preferably can be obtained from a Virtual_Block_Data table. Special cases exist where the Block data may be already known; for example, empty Blocks, repeating Blocks, etc.

Again, as discussed above in connection with the pattern structure generation, the present steps of the overall process preferably can use an optional PRNG routine to provide additional variety to the Block. Another fairly straightforward extension of this example is to use 'stuffing' (i.e.; duplicate entries in a particular table) preferably to provide a simple means of weighting the result. By this we refer to the ability to influence the particular Block data that is selected from the Virtual_Block_Data table preferably by inserting various duplicate entries. This concept of stuffing can easily be applied to other tables discussed elsewhere in this specification, and other means of weighting the results for each table lookup that are commonly known in the art can be easily applied here without departing from the spirit and scope of the invention.

Additionally, as one of ordinary skill in the art will appreciate, though many of these examples of preferred embodiments involve substantial reliance on tables, it would be fairly easy to apply concepts of state machines, commonly known in the art, to these steps and optimize the table architecture into one that incorporates state machines. Such an optimization would not depart from the spirit and scope of the present invention. As an example, refer to the previous discussion regarding FIG. 18B.

Various examples of preferred embodiments for pseudo-random number generation aspects of the present invention will now be described.

Some of the embodiments discussed in the present disclosure preferably involve maximizing the limited resources of a small, portable architecture, preferably to obtain a complex music generation/interaction device. When possible, in such embodiments (and others), preferably it is desirable to minimize the number of separate PRNG routines. Although an application like music generation/interaction preferably relies heavily on PRNG techniques to obtain a sense of realism paralleling that of similarly Styled, human-composed music, it is tremendously desirable to minimize the code overhead in the end product so as to allow the technology preferably to be portable, and to minimize the costs associated with the design and manufacture. Consequently, we have competing goals of minimal PRNG code/routines, and maximal random influence on part generation.

In addition, another goal of the present technology is preferably to allow a user to save a song in an efficient way. Rather than storing a song as an audio stream (i.e.; MP3, WMA, WAV, etc.), it is highly desirable to save the configuration information that was used to generate the song, so that it preferably can be re-generated in a manner flawlessly consistent with the original. The desirability of this goal can easily be understood, as a 5 minute MP3 file is approximately 5 MB, and the corresponding file size for an identical song, preferably using the present architecture, is approximately 0.5 KB, thus preferably reduced by a factor of approximately 10,000. In certain preferred embodiments, the sound quality of a saved song is similar to a conventional compact disc (thereby demonstrably better than MP3). In this comparison, a 5 minute song stored on a compact disc might be approximately 50 MB; thus the file size of a song using the present invention is reduced from a compact disc file by a factor of approximately 100,000.

Saving the configuration information itself, rather than an audio stream, preferably allows the user to pick up where they left off, in that they can load a previously saved piece of music, and continue working with it. Such an advantage is not easily possible with a single, combined audio stream, and to divide the audio into multiple streams would exponentially increase the file size, and would not be realizable in the current architecture without significant trade-offs in portability and/or quality.

Additionally this aspect of the present invention preferably enables the user to save an entire song from any point in the song. The user preferably can decide to save the song at the end of the song, after experiencing and interacting with the music creation. Such a feature is clearly advantageous as it affords greater flexibility and simplicity to the user in the music creation process.

Figure 26:
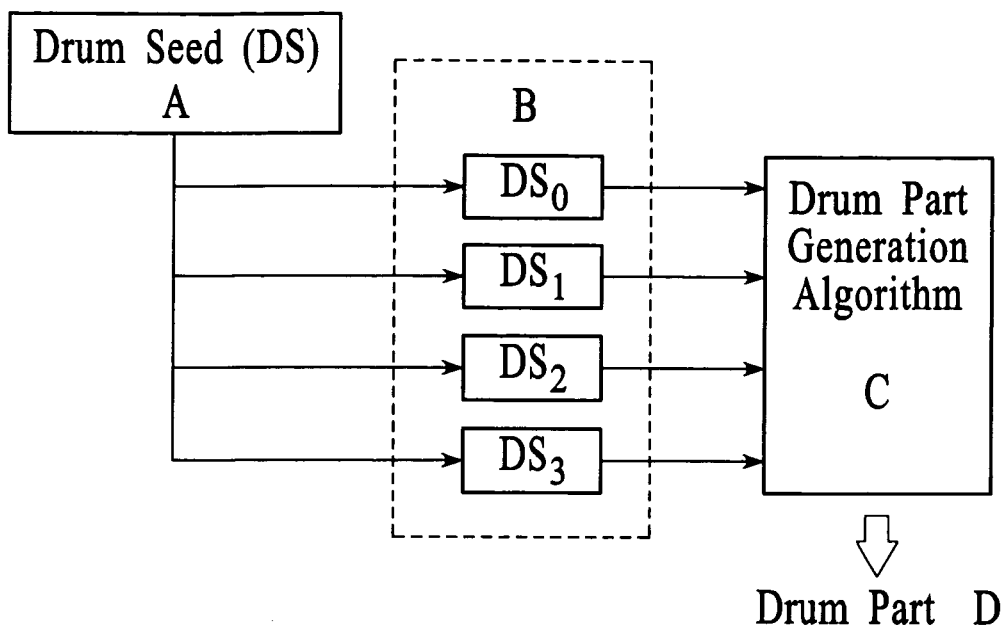
FIGS. 26-27 illustrate Pseudo-Random Number generation examples utilized in certain preferred embodiments of the present invention.

Turning now to FIG. 26, we have a diagram representing the preferable algorithmic context for some examples of Pseudo-Random Number Generation (PRNG). Drum Seed (DS) is a number that preferably is used as input to a simple PRNG routine to generate DS0-DS4. As would be apparent to one of ordinary skill in this art, the number of outputs preferably can be varied; we use 4 here for illustrative purposes. The 4 values that are output from the PRNG preferably are fed into various parts of the Drum Part Generation Algorithm to provide some pseudo-random variation to the drum part.

It is important to note that if the same seed input to the simple PRNG routine is used a plurality of times, the same list of values preferably will be output each time. This is because simple PRNG routines are not random at all, as they are a part of a computing system that is, by its very nature, extremely repeatable and predictable. Even if one adds some levels of complexity to a PRNG algorithm that take advantage of seemingly unrelated things like clocks, etc., the end user can discern some level of predictability to the operation of the music generation. As can be imagined, this is highly undesirable, as one of the main aspects of the device is to generate large quantities of good music.

One benefit of the preferably predictable nature of simple PRNGs is that, by saving the seed values, one preferably can generate identical results later using the same algorithm. Given the same algorithm (or a compatible one, preferably), the seeds preferably can be provided as inputs and preferably achieve the exact same results every time. Further discussion of the use of seeds in the music generation/interaction process is discussed elsewhere in this specification.

Figure 27:
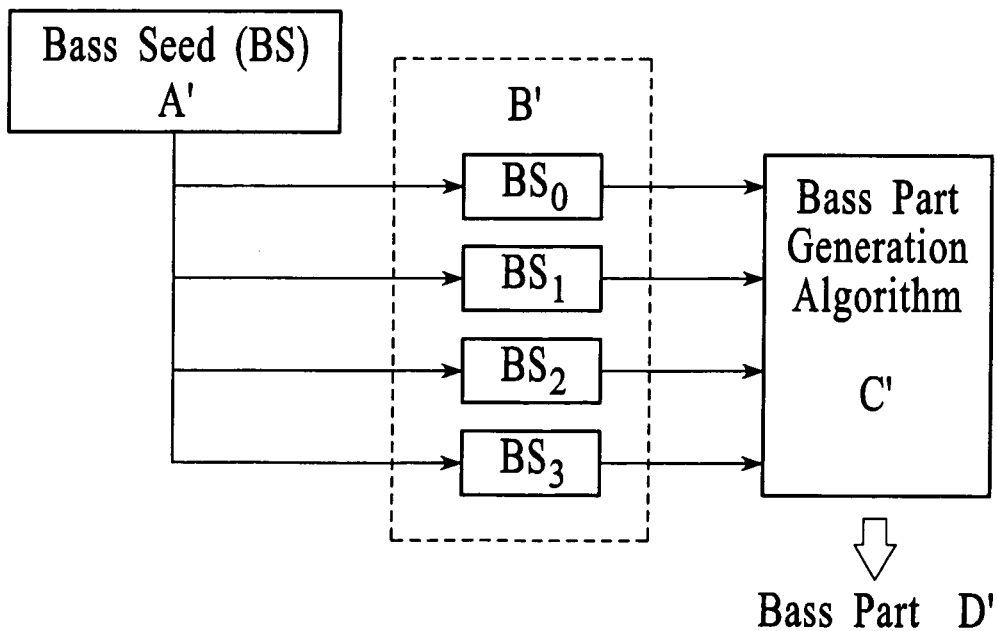

While it is a feature of the present invention to preferably incorporate PRNG that are repeatable, there are also aspects of the present invention that preferably benefit from a more 'truly-random' number generation algorithm. For purposes of clarity, we call this 'complex PRNG'. Using the example of FIGS. 26 and 27, if, on a regular basis, the same seed input were used for both the Drum part and the Bass part, it might limit the variability of the outcome. Another example is that, although preferably when playing a previously saved song, you want A and A' to always be the same, when you are generating a new song, it preferably is highly desirable that these seed inputs be randomly different. Otherwise the song generation suffers from the same repeatability as the song playback.

One example of a complex PRNG that works within the cost/resource constraints we have set, is one preferably with an algorithm that incorporates the timing of an individual user's button-presses. For example, from time to time in the process of generating music and providing user interaction in that generative process, we preferably can initialize a simple timer, and wait for a user button press. Then the value of that timer preferably can be incorporated into the PRNG routine to add randomness. By way of example, one can see that, if the system is running at or around 33 MHz, the number of clocks between any given point and a user's button press is going to impart randomness to the PRNG. Another example is one preferably with an algorithm that keeps track of the elapsed time for the main software loop to complete; such a loop will take different amounts of time to complete virtually every time it completes one loop because it varies based on external events such as user button presses, music composition variations, each of which may call other routines and/or timing loops or the like for various events or actions, etc. While it preferably is not desirable to use such a complex PRNG in the generation of values from seeds, due to repeatability issues discussed above, it preferably can be desirable to use such a PRNG in the creation of seeds, etc., as discussed above. As an additional example, such a complex PRNG routine can be used to time interval, from the moment the unit is powered up, to the moment the 'press-it-and-forget-it' mode is invoked; providing a degree of randomness and variability to the selection of the first auto-play song in Home mode (discussed earlier in this disclosure). Of course, this type of complex PRNG preferably is a variation of the present invention, and is not required to practice the invention.

In certain embodiments, one desirable aspect of the present invention involves the limiting of choices to the end user. The various ways instruments can be played are limitless, and in the absence of a structure, many of the possible ways can be unpleasant to the ear. One feature of palatable music is that it conforms to some sort of structure. In fact, it can be argued that the definition of creativity is expression through structure. Different types of music and/or instruments can have differing structures, but the structure itself is vital to the appeal of the music, as it provides a framework for the listener to interpret the music. The present invention involves several preferable aspects of using seed values in the generation of a piece of music. One preferable way to incorporate seeds is to use two categories of seeds in a song: 1) seeds determining/effecting the higher-level song structure, and 2) seeds determining/effecting the particular instrument parts and characteristics. Preferably, the first category of seeds is not user-changeable, but is determined/effected by the Style/SubStyle and Instrument Type selections. Preferably, the second category of seeds is user-changeable, and relates to specific patterns, melodies, effects, etc. The point in this example is that, in certain embodiments, there are some aspects of the music generation that are preferably best kept away from the user. This variation allows the user to have direct access to a subset of the seeds that are used for the music generation, and can be thought to provide a structure for the user to express through. This preferable implementation of the present discussion of seeds enables a non-musically-trained end user to creatively make music that sounds pleasurable.

It is contemplated, however, that in certain cases it may be desirable to make some or all of the choices accessible to a user. As an example, while for a given style of music it may be desirable to limit some of the parameter values available to the generation algorithm to a particularly appropriate range, in certain cases it is desirable to allow a user to edit available range, and thereby have some influence on the style in question. As another example, the range of values associated with a particular instrument or other component may be associated with the typical role of that instrument/component in the song. Preferably, in certain embodiments, such ranges of acceptable parameters are editable by a user (e.g., via the companion PC program, etc.) to allow the user to alter the constraints of the style and/or instrument or component. As an example, while in certain styles there may be an instrument type "lead" that has a relatively high pitch mobility, it may be desirable to allow the user to lower the parameters associated with "lead" that may influence the pitch mobility. Other examples along the lines of the magic notes, etc., also can be used advantageously in certain of these embodiments.

Various examples of preferred embodiments for a simple data structure (SDS) to store a song of the present invention will now be described.

The use of PRNG seeds preferably enables a simple and extremely efficient way to store a song. In one embodiment of the present invention, the song preferably is stored using the original set of seeds along with a small set of parameters. The small set of parameters preferably is for storing real time events and extraneous information external to the musical rules algorithms discussed above. PRNG seed values preferably are used as initial inputs for the musical rules algorithms, preferably in a manner consistent with the PRNG discussion above.

FIG. 28 lists some examples of the types of information in an SDS:

'Application Number' is preferably used to store the firmware/application version used to generate the data structure. This is particularly helpful in cases where the firmware is upgradeable, and the SDS may be shared to multiple users. Keeping track of the version of software used to create the SDS is preferable when building in compatibility across multiple generation/variations of software/firmware.

'Style/SubStyle' preferably is used to indicate the SubStyle of music. This is helpful when initializing various variables and routines, to preferably alert the system that the rules associated with a particular SubStyle will govern the song generation process.

'Sound Bank/Synth Type' preferably indicates the particular sound(s) that will be used in the song. This preferably can be a way to preload the sound settings for the Midi DSP.

'Sample Frequency' preferably is a setting that can be used to indicate how often samples will be played. Alternatively, this preferably can indicate the rate at which the sample is decoded; a technique useful for adjusting the frequency of sample playback.

'Sample set' preferably is for listing all the samples that are associated with the Style of music. Although these samples preferably may not all be used in the saved SDS version of the song, this list preferably allows a user to further select and play relevant samples during song playback.

'Key' preferably is used to indicate the first key used in the song. Preferably, one way to indicate this is with a pitch offset.

'Tempo' preferably is used to indicate the start tempo of the song. Preferably, one way to indicate this is with pulses per quarter note (PPQN) information.

'Instrument' preferably is data that identifies a particular instrument in a group of instruments. Such as an acoustic nylon string guitar among a group of all guitar sounds. This data is preferably indexed by instrument type.

'State' preferably is data that indicates the state of a particular instrument. Examples of states are: muted, un-muted, normal, Forced play, solo, etc.

'Parameter' preferably is data that indicates values for various instrument parameters, such as volume, pan, timbre, etc.

'PRNG Seed Values' preferably is a series of numerical values that are used to initialize the pseudo-random number generation (PRNG) routines. These values preferably represent a particularly efficient method for storing the song by taking advantage of the inherently predictable nature of PRNG to enable the recreation of the entire song. This aspect of the present invention is discussed in greater detail previously with respect to FIGS. 26 and 27.

Through the use of these example parameters in a SDS, a user song preferably can be efficiently stored and shared. Though the specific parameter types preferably can be varied, the use of such parameters, as well as the PRNG Seeds discussed elsewhere in this disclosure, preferably enables all the details necessary to accurately repeat a song from scratch. It is expected that the use of this type of arrangement will be advantageous in a variety of fields where music can be faithfully reproduced with a very efficient data structure.

Figure 29:
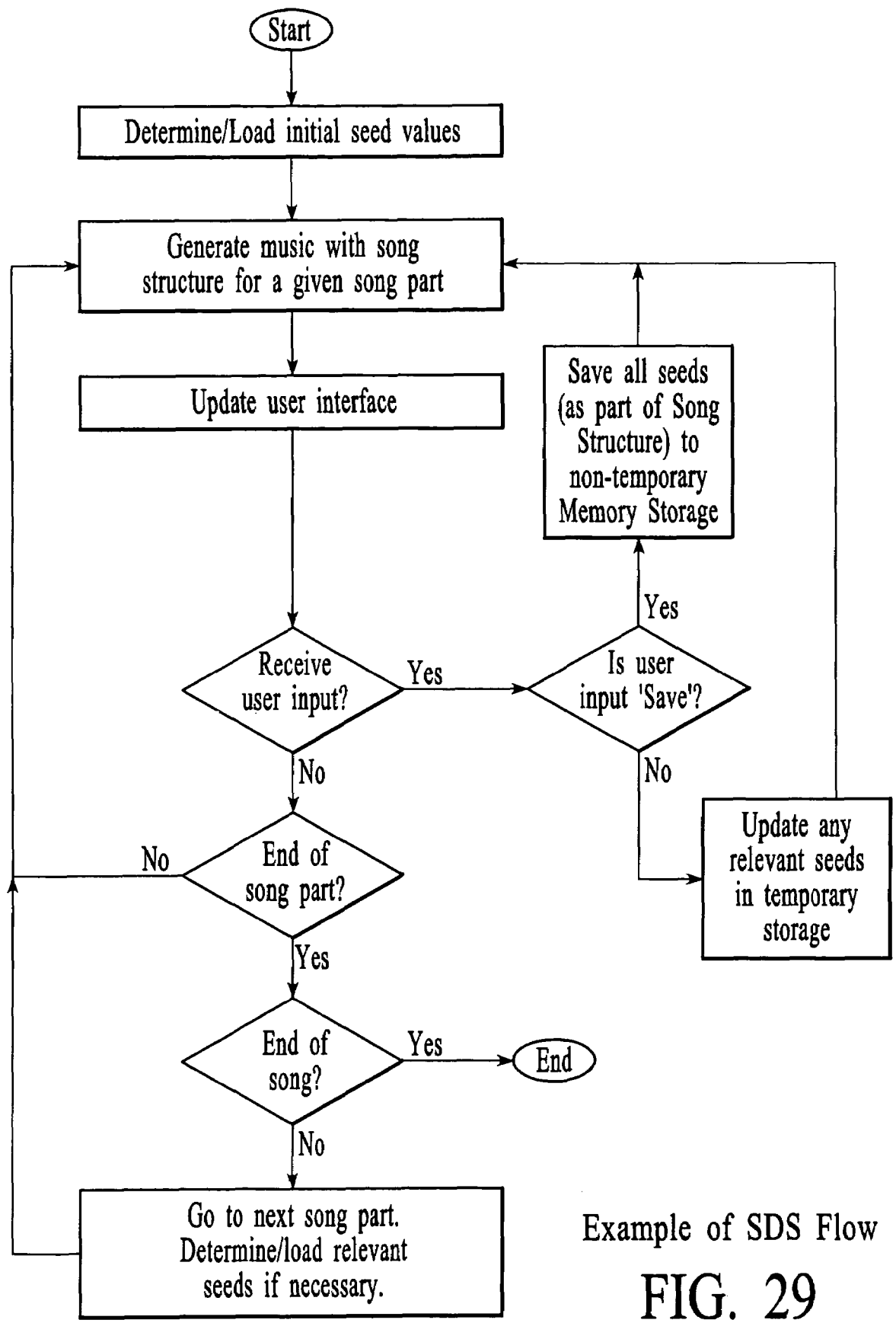
FIG. 29 illustrates an exemplary simple data structure flow in accordance with certain preferred embodiments of the present invention.

FIG. 29 depicts a logical flow chart for a preferable general architecture that could be used in combination with the SDS to practice the present invention. This flow chart describes the big picture for a preferable software/firmware implementation, and describes in more detail how the song preferably is efficiently and interactively generated using seed values.

At the start of FIG. 29, an initial set of seed values preferably is either loaded from a data file (e.g., SDS) or determined anew (e.g., using the Complex PRNG approach discussed elsewhere in this disclosure). While this set of values preferably can effectively be determined/loaded for the entire song at this point, it may be considered advantageous to only determine/load them in sections as needed, preferably to provide a degree of randomness to a freshly generated song. Further, as discussed above, the seed values may preferably be arranged in two categories, one user-changeable, and the other not. Once at least some seed values preferably are determined/loaded, the music for a given song part preferably begins to be generated, and the user interface (e.g., display, video output, force-feedback, etc.) preferably can be updated accordingly. At any point in this process, if a user input is detected (other than a 'save' command), such as a change of instrument or effect, the relevant seeds for the part of the song currently being changed by the user preferably are updated and the generation of the music for the given part preferably continues. If a user input 'save' command is detected, all seeds (not just the relevant seeds for the given song part) preferably can be saved to a non-temporary storage location, such as Flash memory, a hard drive, or some other writeable memory storage location that affords some degree of permanence. This arrangement is desirable because it preferably allows a user to listen to most of a song before electing to save it in its entirety. As long as there is no user input, the generation of music for a given song part preferably continues until the end of song part is detected, at which time the flow preferably proceeds to the next song part. At this time, if necessary, the relevant seeds for the next song part preferably are determined/loaded. Eventually, when an end-of-song condition preferably is detected, the song ends.

Various examples of preferred embodiments for a complex data structure to store a song of the present invention will now be described.

In another variation to the present invention, it is contemplated that, for purposes of saving and playing back songs, the reliance on seeds as inputs to the musical rule algorithms (see SDS discussion above) preferably may be exchanged for the use of Complex Data Structures (CDS). In part because of it's efficiency, the seed-based architecture discussed above is desirable when forward/backward compatibility is not an issue. However, it has some aspects that may not be desirable, if compatibility across platforms and/or firmware revisions is desired. In these cases, the use of an alternative embodiment may be desirable.

As described above, a seed preferably is input to a simple PRNG and a series of values preferably are generated that are used in the song creation algorithm. For purposes of song save and playback, the repeatability preferably is vital. However, if the algorithm is modified in a subsequent version of firmware, or if other algorithms would benefit from the use of the simple PRNG, while it is in the middle of computing a series (e.g.; DS0-DS3 in FIG. 26), or if additional elements are needed for subsequent music Styles, etc., that involve additional seeds, it is possible that the repeatability and backwards-compatibility may be adversely impacted. This means that in certain applications of the present invention, preferably in order to allow future upgrades to have significant leeway, and in order to maintain backwards-compatibility with songs saved before the upgrade, another preferably more complex data structure for saving the song is desirable.

FIG. 30 describes some example parameters to include in such a CDS. In general, the difference between this structure and the SDS example described in FIG. 28 is that this preferably does not rely on seed values to recreate the song. Instead, this CDS preferably captures more of the actual data in the song, resulting in a file size that is larger than the SDS example. The use of CDS preferably is still a tremendously more efficient and desirable means of saving a song compared to an audio stream, as mentioned above in connection with the seed method. While the seed method preferably gives you a size reduction over a typical MP3 audio stream of 10,000, the CDS method preferably might give an approximate size reduction of 1,000; for a WAV audio of 100,000, the size reduction results in 10,000 (or when compared to a compact disc the size reduction is approximately 100,000). While much larger than the seed approach, the CDS approach is still advantageous over the audio stream methods of music storage in the prior art.

In certain embodiments, a further distinction with a CDS is that it provides greater capabilities to save real time user data, such as muting, filtering, instrument changes, etc.

While both examples have their advantages, it may also be advantageous to combine aspects of each into a hybrid data structure (HDS). For example, the use of some seed values in the data structure, while also incorporating many of the more complex parameters for the CDS example, preferably can provide an appropriate balance between compatibility and efficiency. Depending on the application and context, the balance between these two goals preferably can be adjusted by using a hybrid data structure that is in between the SDS of FIG. 28 and the CDS of FIG. 30.

In the example of FIG. 30, 'Application Number', 'Style/SubStyle', 'Sound Bank/Synth Type', 'Sample Frequency', 'Sample List', 'Key', 'Tempo', 'Instrument', 'State', and 'Parameter' are preferable parameters that are described above in reference to FIG. 28.

However, in certain embodiments it is desirable to capture many real time events actuated upon by the user during a song. In these cases it is preferable to store the real time data as part of the CDS, i.e., via the 'Parameter' parameter. In this example, real time changes to particular instrument parameters preferably are stored in the 'Parameter' portion of the CDS, preferably with an associated time stamp. In such a manner, the user events that are stored can be performed in real time upon song playback. Such embodiments may involve a CDS with a significantly greater size, but provide a user with greater control over certain nuances of a musical composition, and are therefore desirable in certain embodiments.

'Song Structure' preferably is data that preferably lists the number of instrument types in the song, as well as the number and sequence of the parts in the song.

'Structure' preferably is data that is indexed by part that preferably can include the number and sequence of the sub-parts within that part.

'Filtered Track' preferably is a parameter that preferably can be used to hold data describing the characteristics of an effect. For example, it preferably can indicate a modulation type of effect with a square wave and a particular initial value. As the effect preferably is typically connected with a particular part, this parameter may preferably be indexed by part.

'Progression' preferably is characteristic information for each sub-part. This might include a time signature, number and sequence of SEQs, list of instrument types that may be masked, etc.

'Chord' preferably contains data corresponding to musical changes during a sub-part. Chord vector (e.g., +2, −1, etc.), key note (e.g., F), and progression mode (e.g., dorian ascending) data preferably are stored along with a time stamp.

'Pattern' and the sub-parameters 'Combination', 'FX Pattern', and 'Blocks', all preferably contain the actual block data and effects information for each of the instruments that are used in the song. This data is preferably indexed by the type of instrument.

'Improv' preferably is for specifying instruments or magic notes that will be played differently each time the song is played. This parameter preferably allows the creation of songs that have elements of improvisation in them.

Additional parameters can preferably be included, for example to enable soundbank data associated with a particular song to be embedded. Following this example, when such a CDS is accessed, the sound bank data preferably is loaded into non-volatile memory accessible to a DSP such that the sound bank data may be used during the generation of music output.

Figure 31:
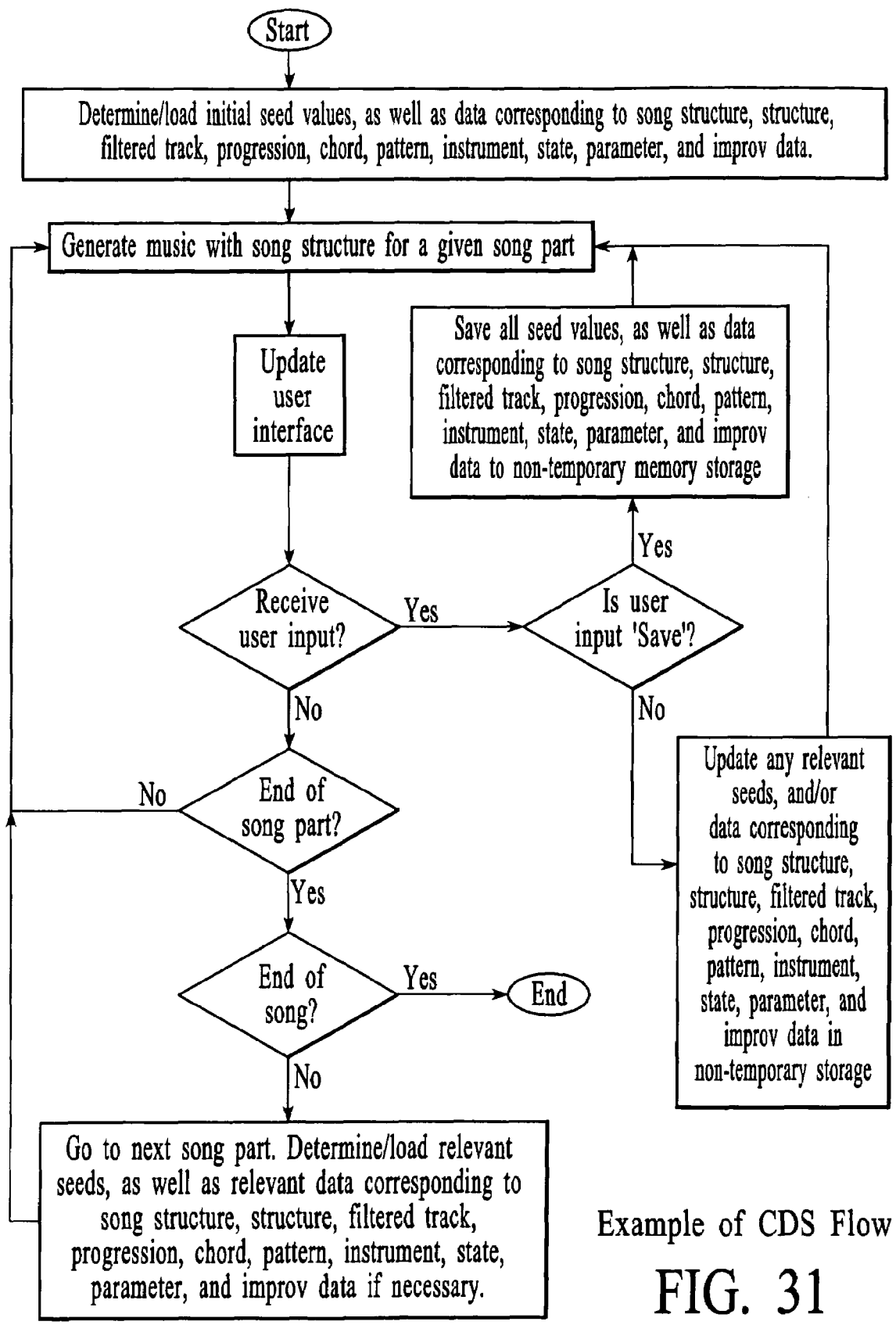
FIG. 31 illustrates an exemplary complex data structure flow in accordance with certain preferred embodiments of the present invention.

FIG. 31 depicts a preferable example flow chart for the CDS approach discussed above. It is similar to FIG. 29, except that at the points in the flow where the Seeds are loaded, determined, updated, and/or stored, there are corresponding references to loading, determining, updating, and/or storing CDS parameter data corresponding to Song Structure, Structure, Filtered Track, Progression, Chord, Pattern, Instrument, State, Parameter, and Improv.

In certain preferred embodiments the Player 10 is accompanied by a companion PC software system designed to execute on a PC system and communicate with Player 10 via a data link (e.g., USB 54, Serial I/O 57, and/or a wireless link such as 802.11b, Bluetooth, IRDA, etc.). Such a PC software system preferably is configured to provide the user with a simple and effective way to copy files between the Player 10 and other locations (e.g., the PC hard drive, the Internet, other devices, etc.). For example, the companion PC software program preferably operates under the MS Windows family of Operating Systems and provides full access to the User for all Player 10 functions and Modes, as well as the local Player memory (e.g., SMC). Following this example, a user can connect to the Internet and upload or download music related files suitable to be used with the Player 10 (e.g., MIDI, WMA, MP3, Karaoke, CDS, SDS, etc.) as well as user interface-related files such as customized user-selectable graphics preferably to be associated with music styles or songs on the Player 10. Such a companion PC program preferably is also used to enable hardware and/or software housekeeping features to be easily managed, such as firmware and sound bank updates. This companion PC software system preferably is used to provide the user with an easy way to share music components and/or complete songs with other users in the world (e.g., via FTP access, as attachments to email, via peer-to-peer networking software such as Napster, etc.). It is important to note the potentially royalty-free nature and extreme size efficiency of musical output from the Player 10 lends itself well to the Internet context of open source file sharing.

In addition to, or in combination with, the aforementioned embodiments involving a portable system linked to a PC system, certain additional features are advantageously employed in certain embodiments. For example, a companion PC software application provides a sample edit mode to depict a graphic associated with the waveform of the selected sample, e.g., via the PC display. In these embodiments, the user is provided with a simple way to easily select the start and end points of the selected sample, e.g., via a pointing device such as a mouse. Preferably, such graphical clipping functions enable a user to easily crop a selected sample, e.g., so as to remove an undesired portion, etc. After clipping/cropping the sample, the user is presented with the option of saving the newly shortened sample file, e.g., with a new name. Clearly, other similar functions in addition to or besides such clipping can be supported, to make use of the display and/or processing resources available on the PC system, to provide a graphic version of the waveform of a selected sample, and to provide the end user with a simple way to carryout basic operations on the selected sample. In these embodiments, the newly modified sample file is then transferable to the portable system, e.g., via connector 53 in FIG. 32 (for example, via USB bus 54 and USB interface 39, etc.).

In certain embodiments where a link (e.g., wireless 802.11) is present between more than one device, the devices preferably can operate in a cooperative mode, i.e., wherein a first user and/or device is in control of parameters relating to at least one aspect of the music (e.g., one instrument or effect), and a second user/device is in control of parameters relating to a second aspect of the music (e.g., another instrument, or microphone, etc.). In certain of these embodiments, the plurality of devices preferably will exchange information relating to music style, as well as certain musical events relating to the music generation. In at least some embodiments it is preferably to commonly hear the resulting music, e.g., via a commonly accessible digital audio stream. Furthermore, as will be clear to one of ordinary skill in the art, the aforementioned cooperative mode can advantageously be utilized in embodiments where one or more of the devices are computers operating while connected to a network such as a LAN and/or the Internet.

Various examples of preferred embodiments for hardware implementation examples of the present invention will now be described.

FIG. 32 is a block diagram of one portable hardware device embodiment 35 of the present invention. The microprocessor (MP 36) controls local address and data busses (MP Add 37 and MP Data 38); the universal serial bus interface (USB 39), the smart media card interface (SMC 40) (as discussed previously, alternatives to SmartMedia, such as other types of Flash or other memory cards or other storage media such as hard disk drives or the like may be used in accordance with the present invention), and a memory such as Flash 41 are preferably on the MP data bus 38; and the MIDI/Audio DSP (DSP 42) is preferably on both the MP address bus 37 and MP data bus 38. The SMC interface 40 preferably has a buffer 59 between it and the MP Data bus 38, and there preferably are keyboard interface 42 (with MP Data Latch 44) and LCD interface 45 associated with the MP busses as well. In this example, the MP 36 can preferably perform as a sequencer to extract timing information from an input data stream and send MIDI information (possibly including NRPN-type data discussed elsewhere in this disclosure) to the DSP 42. The DSP 42 additionally preferably has dedicated address and data busses (DSP Add 46 and DSP Data 47) that preferably provide access to local RAM 48 and Flash 49 memories.

The MP 36, DSP 42, FM receiver 50, and Microphone input 51 all preferably have some type of input to the hardware CODEC 52 associated with the DSP 42.

Figure 34:
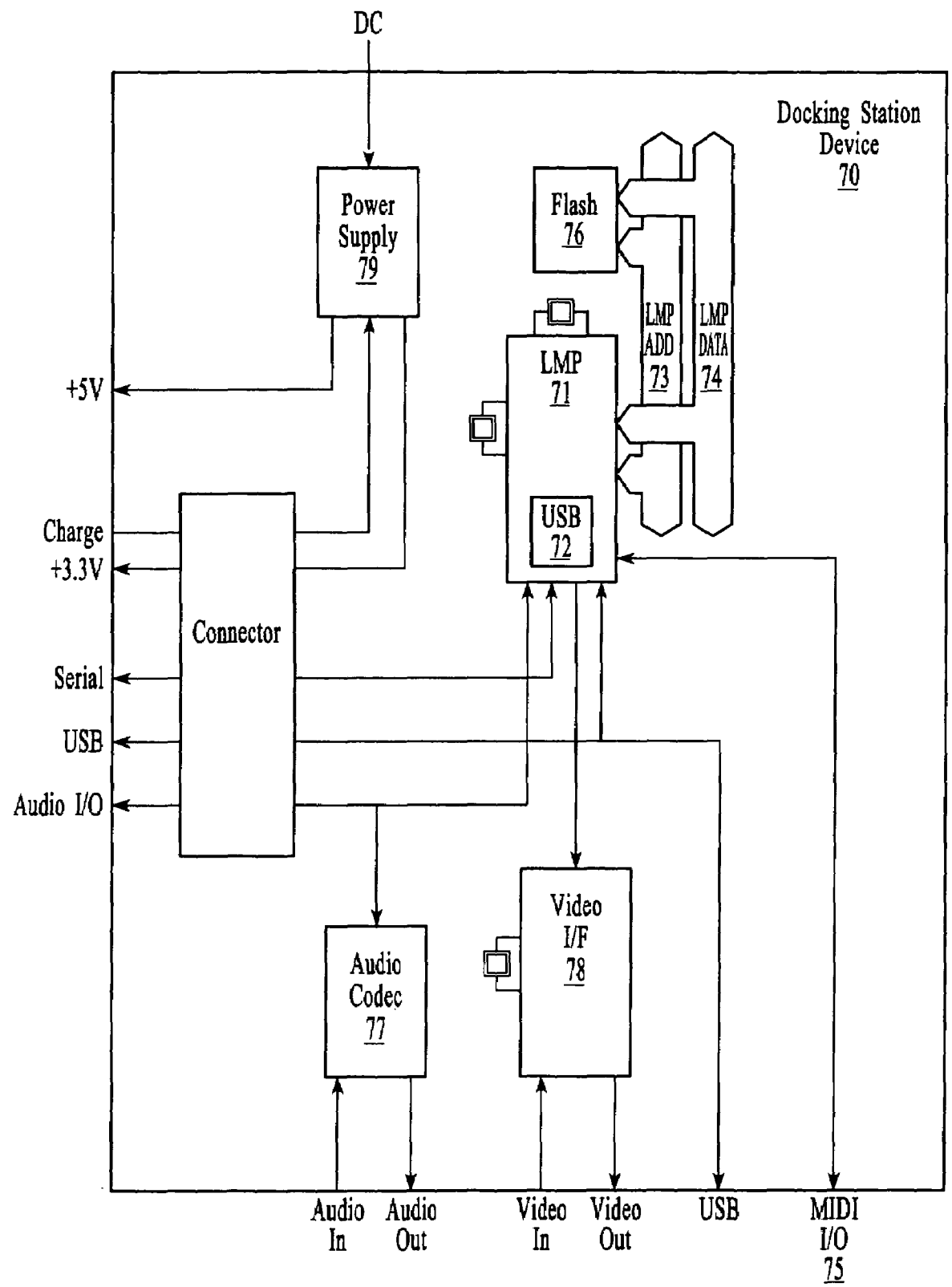

The connector 53 at the top left of FIG. 32 can be considered as a docking station interface or as a pure USB interface or external power interface, preferably complete with interfaces for USB 54, power 55, rechargeable battery charge 56, serial I/O 57, and Audio I/O 58. An example of a block diagram for a docking station device 70 of the present invention is provided in FIG. 34. As is shown in FIG. 34, the docking station 70 preferably includes a local microprocessor (LMP 71), preferably with a USB interface 72, address and data busses (LMP ADD 73 and LMP Data 74), a MIDI I/O interface 75, and memory such as Flash 76. Additionally, the docking station device 70 preferably contains an Audio Codec 77, a Video I/O interface 78, and a Power Supply 79.

The MP 36 in this example is preferably the ARM AT91R40807, though any similar microprocessor could be utilized (such as versions that have on-board Flash, more RAM, faster clock, lower voltage/lower power consumption, etc.). This ARM core has 2 sets of instructions: 32 bit and 16 bit. Having multiple width instructions is desirable in the given type of application in that the 16 bit work well with embedded systems (Flash, USB, SMC, etc.), and 32 bit instructions work efficiently in situations where large streams of data are being passed around, etc. Other variations of instruction bit length could easily be applied under the present invention.

For 32 bit instructions, the system of the present invention preferably pre-loads certain instructions from the Flash memory 41 into the internal RAM of the MP 36. This is because the Flash interface is 16 bit, so to execute a 32 bit instruction takes at least 2 cycles. Also, the Flash memory 41 typically has a delay associated with read operations. In one example, the delay is approximately 90 ns. This delay translates into the requirement for a number of inserted wait states (e.g., 2) in a typical read operation. Conversely, the internal RAM of the MP 36 has much less delay associated with a read operation, and so there are less wait states (e.g., 0). Of course, the internal RAM in this case is 32 bits wide, and so the efficiencies of a 32 bit instruction can be realized.

As is shown above in the example regarding the wait states of Flash memory 41, there are many reasons why it is desirable to try to maximize the use of the internal MP RAM. As can be seen from FIG. 32, this example of the present invention preferably does not include an SDRAM or RDRAM. While these types of memory means are available to include in such a system, and such use would not depart from the spirit and scope of the present invention, in certain portable applications, such as depicted in FIG. 32, the use of relatively unnecessary complexity (e.g., SDRAM controllers & address logic, etc.) is not preferable. The current example of FIG. 32 achieves many of the benefits of the present invention, in a simple design suitable for a portable device.

One example of a trade-off associated with complexity and portability is the use of a widely available WMA audio decoder algorithm from Microsoft. In this example, when operating the ARM MP of FIG. 32 at 32 MHz/3.0V, Microsoft's WMA decoding algorithms can be incorporated to successfully decode and play a WMA-encoded song in stereo at 44 KHz and at a sample rate of 128 Kbps. However, as discussed elsewhere in this specification, a preferable feature that allows the speed of an audio stream song to be adjusted can also be incorporated. In this case, when speeding up the WMA 44 KHz song using the speed control, it is possible that the system of FIG. 32 may encounter an underrun condition. In this specific example, such cases do not occur when the ARM MP 36 is operated at 40 MHz/3.0V. However, when operating the MP 36 at 3.0V, a significant performance hit on battery life can occur. So, because the use of the WMA at 44 KHz in combination with the pitch speed feature seems to be relatively unnecessary, this particular example feature can preferably be sacrificed for the benefit of a longer battery life. Obviously, one could incorporate variations such as: a better battery system, a speed stepped approach that operates at full speed when plugged in and at a slower speed when using batteries, a more efficient WMA algorithm, etc. However, this example illustrates the point that competing needs can preferably be balanced with performance and portability.

In the example of FIG. 32, the MP 36 contains 136 KB of internal RAM. The performance/portability balance described above dictates that one preferably must play certain tricks on the system to maximize the efficiency of the 136 Kb RAM. For example, the memory range can preferably be divided into different regions for buffering, programs, etc., and in real-time modes (e.g., WMA playback), the percentage used for the code can preferably be maximized and the percentage used for buffers preferably minimized.

Another alternative embodiment can be an MP 36 with preferably more internal RAM (for example, 512 KB) which would preferably allow a reduction or elimination of the use of Flash memory 41. Such a system may add to the total cost, but would reduce the complexities associated with using Flash memory 41 discussed above.

Figure 33:
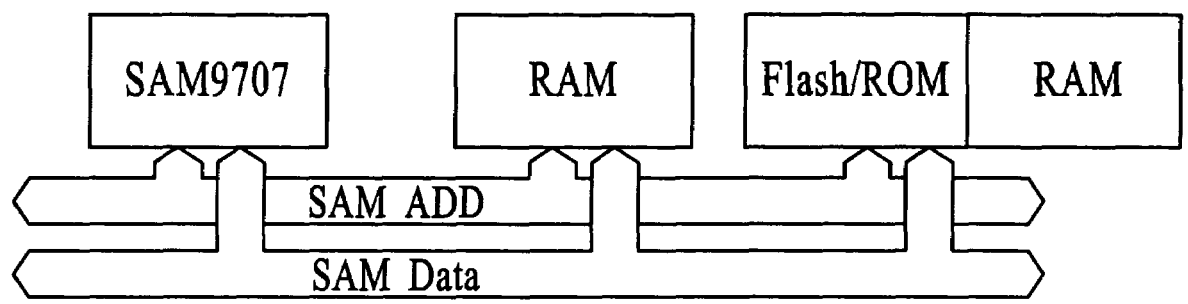

Another variation is the example shown in FIG. 33, which describes the local DSP area of FIG. 32 wherein preferably additional RAM 90 is accessible on the DSP bus. Such additional RAM can be preferably used to temporarily store large MIDI sound loops that can be played quickly and often. RAM 90 can also preferably be used to temporarily store one or more sound streams (e.g., PCM) that can thus be preloaded and played quickly. Without this feature, each sample might need to be managed and sent by the MP to the DSP every time it is used, in real time. While this is not a problem in certain implementations of the present invention, it may be advantageous to use such additional RAM 90 as shown in FIG. 33 when extensive usage of sound streams is desired. In such cases, a typical size of the RAM 90 in FIG. 33 might preferably be 512 KB, and the MP will preferably only need to send an instruction to the DSP to play the locally stored stream.

Figure 35:
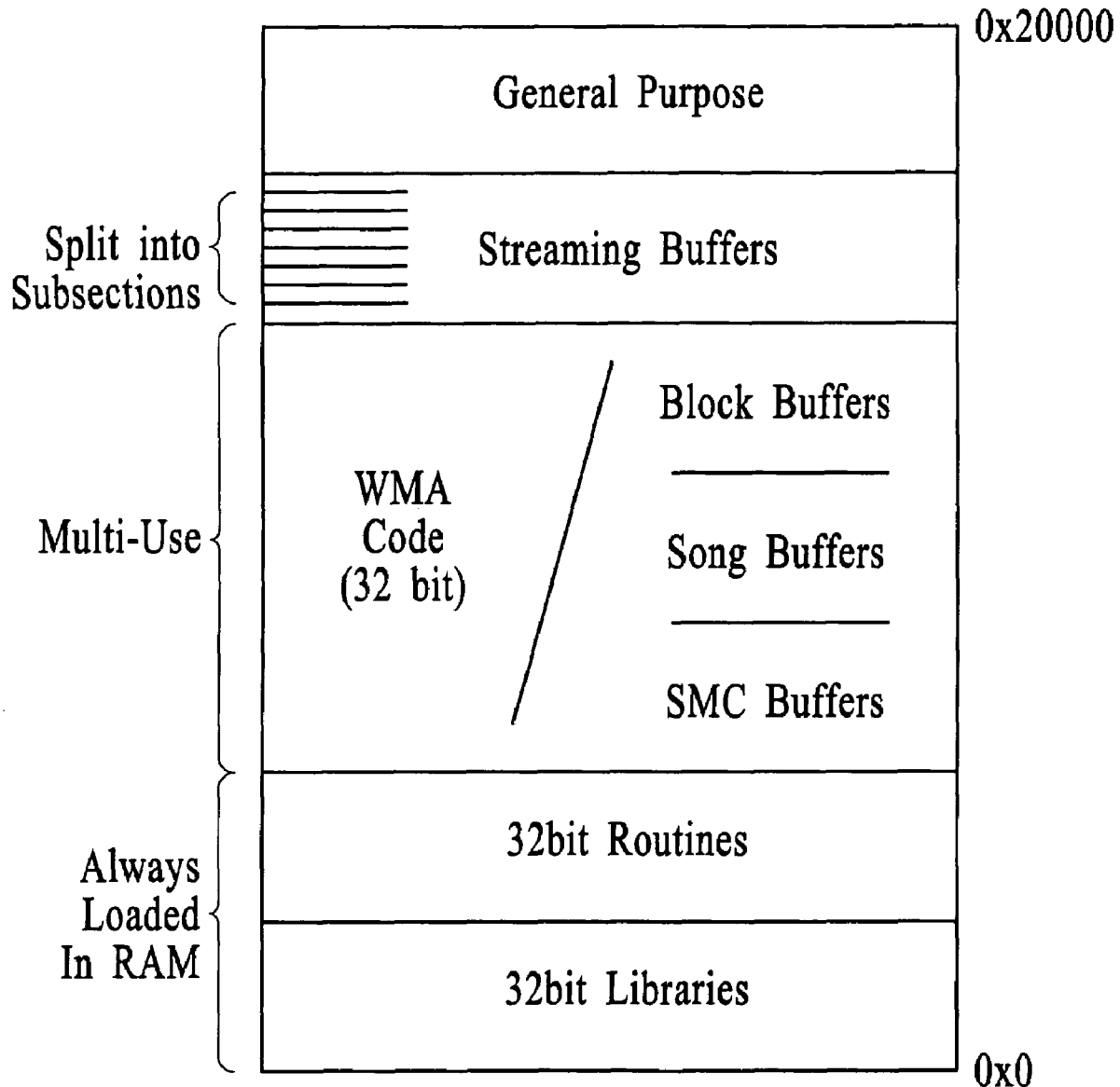
FIG. 35 illustrates an exemplary address map for the microprocessor utilized in accordance with certain preferred embodiments of the present invention.

Continuing the discussion of the architecture shown in FIG. 32, FIG. 35 describes one example for an address map for the internal RAM of the MP. Starting from the bottom of the map, the bottom two sections represent the libraries and routines that are often used, and are always loaded in RAM. The midsection labeled "multi-use" is preferably used for WMA/MP3 related code during the playback of WMA, MP3, and/or other similarly encoded audio stream songs from the SMC. However, during other modes, such as eDJ mode, this midsection is preferably used for Block, Song, and SMC buffers. The next section above this area is preferably used as a buffer for streaming media. This section is preferably divided into a number of subsections, and each subsection is preferably sent to the DSP device at regular intervals (e.g., 5.8 ms @44.1 kHz, 16 bit, 1 Kb blocks). Above this, at the top of FIG. 35, is the general-purpose area of MP RAM preferably used for variables and general buffers.

In this example, when the Player is not operating in a WMA/MP3/etc. mode, the 'multi-use' mid section can preferably be used for at least three types of buffers. Block buffers are preferably used by the eDJ Block creation algorithms (e.g., FIGS. 24 and 25) to store Block data during operation. Song buffers are preferably used by the eDJ algorithms to store Song data (see FIG. 15) after Block creation has occurred. This Song data is preferably fed out to the DSP device shown in FIG. 32. SMC buffers are preferably used for write operations to the SMC.

SMC is a Flash memory technology that doesn't allow the modification of a single bit. To perform a write to the SMC, one must read the entire SMC Block, update the desired portion of the SMC Block, and then write the entire SMC Block back to the SMC. In the interests of efficiency, the currently used SMC Block is preferably maintained in the SMC buffers.

As one can appreciate, the system configuration described above cannot simultaneously playback large WMA/MP3 streams while also writing to the SMC. This is because the two functions preferably alternatively use the same memory region. This is a creative use of limited resources, because it is preferably a relatively unusual condition to be reading WMA/MP3 while writing SMC at the same time. So the code is preferably arranged to swap in and out of the same location. Such an arrangement allows maximized use of the limited resources in a portable environment such as FIG. 32.

However, in a more powerful environment (with additional resources, and/or faster clock speed), this 'multi-use' of a shared region of memory could preferably be eliminated, and simultaneous use of WMA/MP3 and the Record function could easily be implemented. Obviously, these additional enhancements for use in a portable environment do not limit the other aspects of the present invention.

The system discussed above is portable, but preferably has extremely high-quality sound. On a very basic level, this is partly due to the use of a sound chip that typically would be found in a high-end sound card in a PC system. The SAM9707 chip is preferable because of its excellent sound capabilities, but this has required it be adapted somewhat to work in the portable example discussed herein.

One characteristic of the SAM9707 is that it is typically configured to work with SDRAM in a sound card. This SDRAM would typically hold the MIDI sound banks during normal operation. Such sound banks are preferably a critical part of the final sound quality of music that is output from a DSP-enabled system. In fact, another reason why this particular chip is preferable is to allow custom sounds to preferably be designed.

In the example above of a portable system, SDRAM adds significantly to the power requirements, as well as the address logic. Accordingly, it is desirable to use a variation of the configuration, preferably using Flash as local DSP sound bank storage (see FIG. 32). The use of Flash memory as local DSP storage is a bit problematic because, in order to allow a user to upgrade the sound banks of their portable Player system, the local DSP Flash memory preferably needs to be accessible from the MP side of the architecture. Such access could be gained through the use of a dual-port Flash memory, with memory access from both the DSP busses and the ARM MP busses, but such a dual port architecture would add expenses and complexity to the system.

The problem of reaching a proper balance between maintaining the low power/simple architecture on one hand, and providing high quality, upgradeable, music sound banks on the other hand, is preferably solved by adapting a mode of the DSP chip, and preferably customizing the address logic in such a way that the DSP can be "tricked" into providing the access from the MP side to the local DSP Flash memory.

Figure 36:
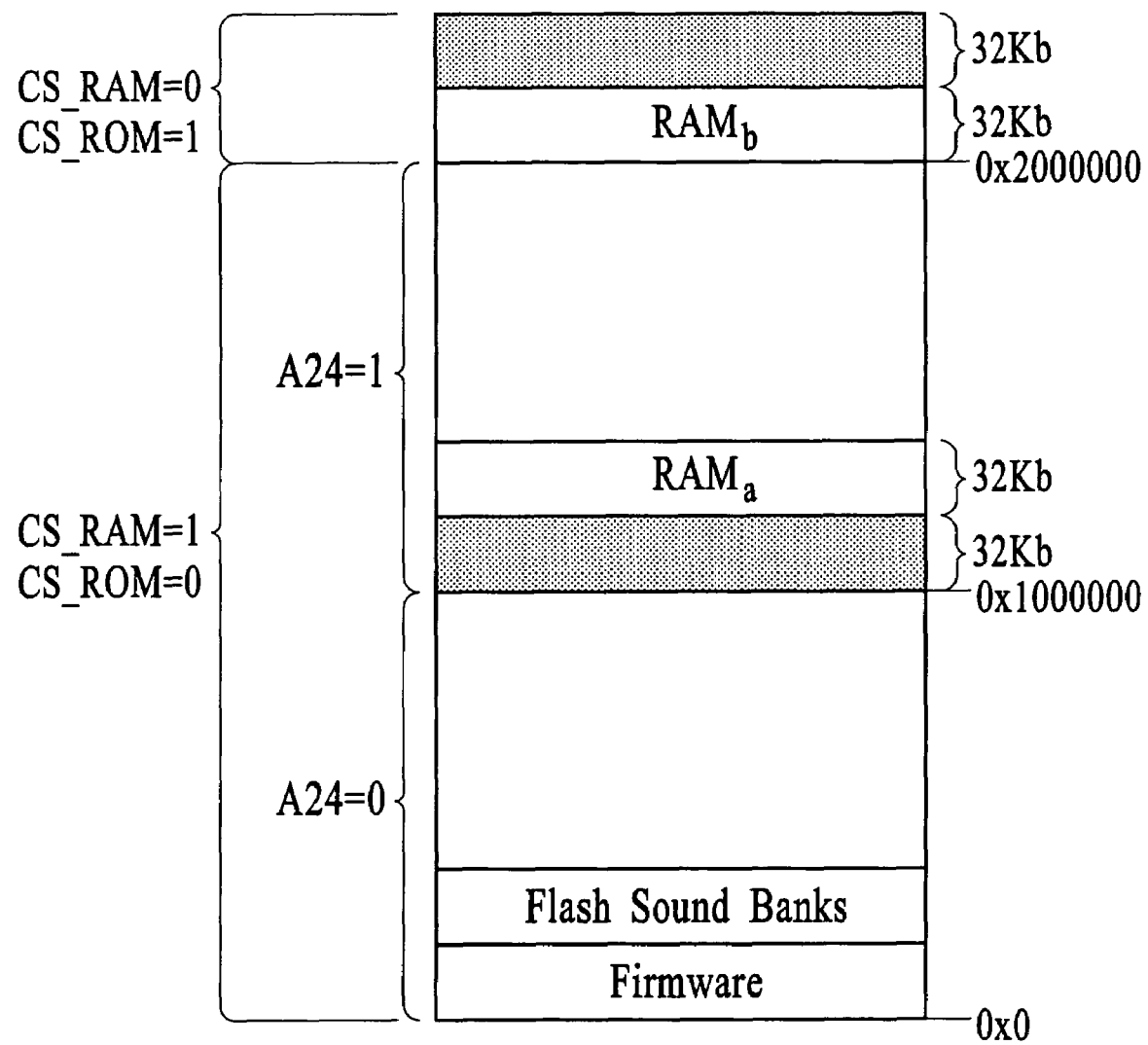
FIG. 36 illustrates an exemplary address map for the synthesizer/DSP utilized in accordance with certain preferred embodiments of the present invention.

FIG. 36 describes an example of an addressing space for the DSP local RAM and Flash storage. Starting from the bottom of the map, the first section is preferably for Firmware, and this is typically addressed to a Flash memory region. The next section is preferably the sound banks, and this is also typically addressed to a Flash region. The third section is preferably addressed to Flash when signal A24 is active (in this case, A24 is active low, or =0). Signal A24 is discussed more below. The fourth section, with starting address 0x1000000, is preferably a 32 Kb block that is not addressed to any memory locations. The fifth section is preferably also 32 Kb and is preferably addressed to the local DSP RAM (labeled $RAM_a$). Note that when addressing this area, signal A24 is preferably high. The seventh section, with starting address 0x2000000, is preferably a 32 Kb section that preferably resolves to RAM (labeled $RAM_b$). The two 32 Kb RAM regions are preferably combined into the 64 Kb local RAM.

So the first variation of the present invention, to the general use of the DSP chip, especially in its intended context of a sound card for a PC, is the address location of the $RAM_a$. This region is selected to allow a very simple address decode logic arrangement (preferably external to the DSP) so that the assertion of A24 will preferably toggle the destination of $RAM_a$ addresses, between DSP-local RAM and DSP-local Flash memories. This variation preferably involves a firmware modification that will allow the specific location of $RAM_a$ to be configured properly preferably by default at startup time. There are other ways to modify this location after initialization, but they are more complicated, and therefore are not as desirable as the present method.

Another variation to the intended context of the DSP chip address map preferably involves a creative implementation of the DSPs BOOT mode to allow the sound banks to be upgraded, even though the sound banks are preferably located in the local Flash memory of the DSP chip; a location not typically accessible for sound bank upgrades.

In this example, the BOOT mode of the DSP causes an internal bootstrap program to execute from internal ROM. This bootstrap program might typically be used while upgrading the DSP firmware. As such, the internal bootstrap expects to receive 256 words from the 16 bit burst transfer port, which it expects to store at address range 0100H-01FFH in the local memory, after which the bootstrap program resumes control at address 0100H. This relatively small burst is fixed, and is not large enough to contain sound banks. Furthermore, it does not allow the complex Flash memory write activities, as discussed above in connection with the SMC. Since our design preferably uses Flash instead of SDRAM, we have found it highly desirable to use this bootstrap burst to load code that preferably 'tricks' the ROM bootstrap to effectuate the transfer of special code from the ARM MP bus to the RAM. This special code is then used to preferably effectuate the transfer of sound bank upgrade data from the ARM MP bus to the Flash memory.

Figure 37:
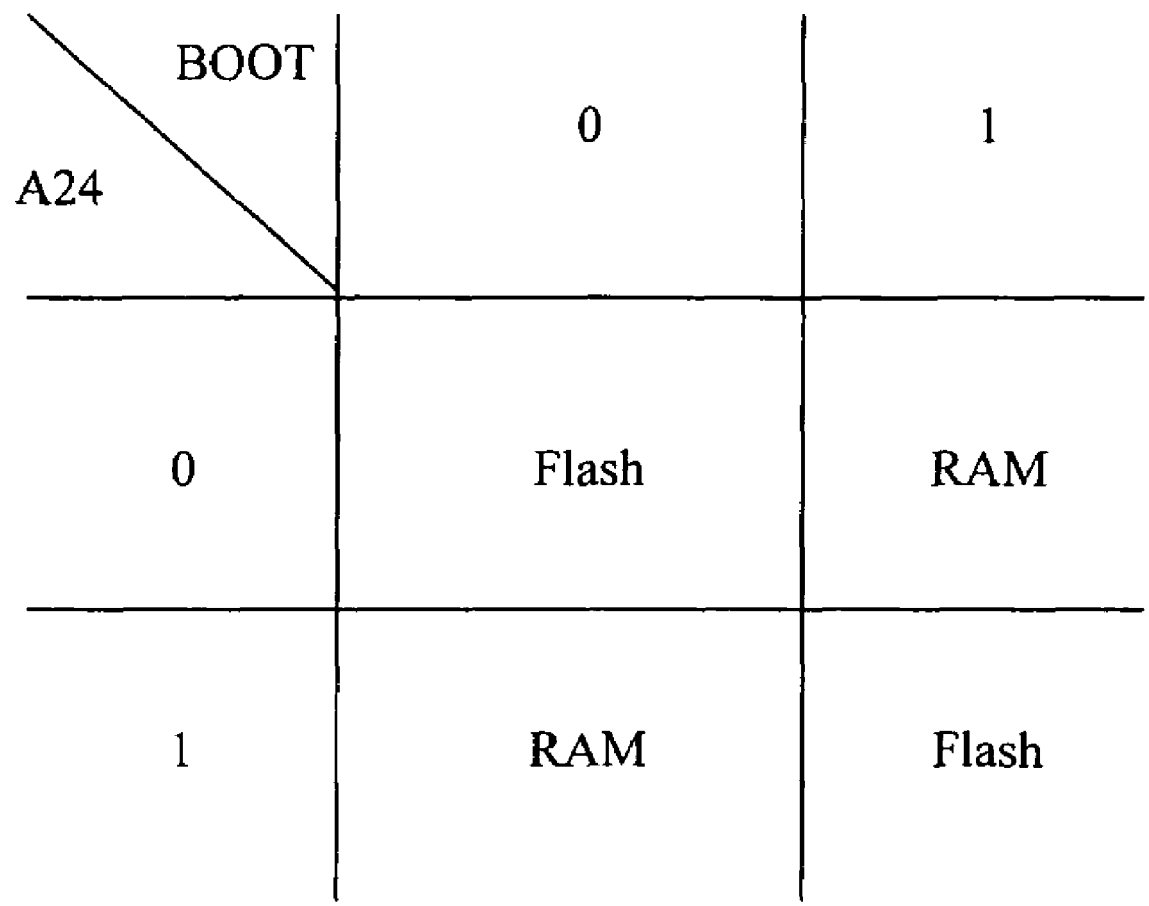

FIG. 37 is a simple truth table that provides additional information on this unusual use of the DSP bootstrap mode addressing scheme. FIG. 38 is a more detailed truth table that highlights the usefulness of our unusual DSP address logic, including the preferable use of the A24 signal controllable by the ARM MP, preferably by use of the BOOT signal.

In the present example, the A24 address line generated by the DSP is preferably altered by the BOOT signal controlled by the MP before being presented to the address decoding logic of the DSP local memory. This arrangement permits the MP to preferably invert the DSP's selection of RAM and Flash in BOOT mode, and thus allows the RAM to preferably be available at address 0x100 to receive the upgrade code.

Additional variations to the hardware arrangement discussed above can be considered. For example, if the power level is increased, and the MP performance increased, the DSP could be substituted with a software DSP. This may result in lower quality sounds, but it could have other benefits that outweigh that, such as lower cost, additional flexibility, etc. The DSP could similarly be replaced with a general-purpose hardware DSP, with the result of lower quality sounds, possibly outweighed by the benefits of increased portability, etc. The MP could be replaced with one having a greater number of integrated interfaces (e.g., USB, SMC, LCD, etc.), and/or more RAM, faster clock speed, etc. With a few changes to some of the disclosed embodiments, one could practice the present invention with only a DSP (no separate MP), or a dual die DSP/MP, or with only an MP and software. Additionally, the SMC memory storage could be substituted with a Secure Digital (SD) memory card with embedded encryption, and/or a hard disk drive, compact flash, writeable CDROM, etc., to store sound output. Also, the LCD could be upgraded to a color, or multi-level gray LCD, and/or a touch-sensitive display that would preferably allow another level of user interface features.

Yet a further variation of the present discussion preferably can be the incorporation of a electromagnetic or capacitive touch pad pointing device, such as a TouchPad available from Synaptics, to provide additional desirable characteristics to the user interface. Both the touch pad and the touch sensitive display mentioned above can be used to provide the user with a way to tap in a rhythm, and/or strum a note/chord. Such a device preferably can be used to enable a closer approximation to the operation of a particular instrument group. For example, the touch pad can be used to detect the speed and rhythm of a user's desired guitar part from the way the user moves a finger or hand across the surface of the touch pad. Similarly, the movement of the users hand through the x and y coordinates of such a pointing device can be detected in connection with the pitch and/or frequency of an instrument, or the characteristics of an effect or sample. In another example, a touch pad pointing device can also be used to trigger and/or control turntable scratching sounds approximating the scratching sounds a conventional DJ can generate with a turntable.

As can be seen in FIG. 32, one example of a DSP that can be used in the context of the present invention is the SAM9707 chip available from the Dream S.A. subsidiary of Atmel Corporation. This particular chip is able to handle incoming MIDI and audio stream information.

When incorporating the DSP into a generative/interactive music system, it is highly desirable to synchronize the MIDI and audio streams. A sample preferably has to play at exactly the right time, every time; when the audio stream components get even slightly out of sync with the MIDI events, the resulting musical output generally is unacceptable. This delicate nature of mixing audio streams and MIDI together in a generative/interactive context is worsened by the nature of the Flash read process, in that SMC technology is slow to respond, and requires complex read machinations. It is difficult to accurately sync MIDI events with playback of audio from a Flash memory location. Because of the delay in decoding and playing a sample (compared to a MIDI event), there is a tradeoff in either performing timing compensation, or preloading relatively large data chunks. Because of these issues, it is preferable to configure a new way to use MIDI and audio streams with the DSP chip. While this aspect of the present invention is discussed in terms of the DSP architecture, it will be obvious to one of ordinary skill in the art of MIDI/audio stream synchronization that the following examples apply to other similar architectures.

Figure 39:
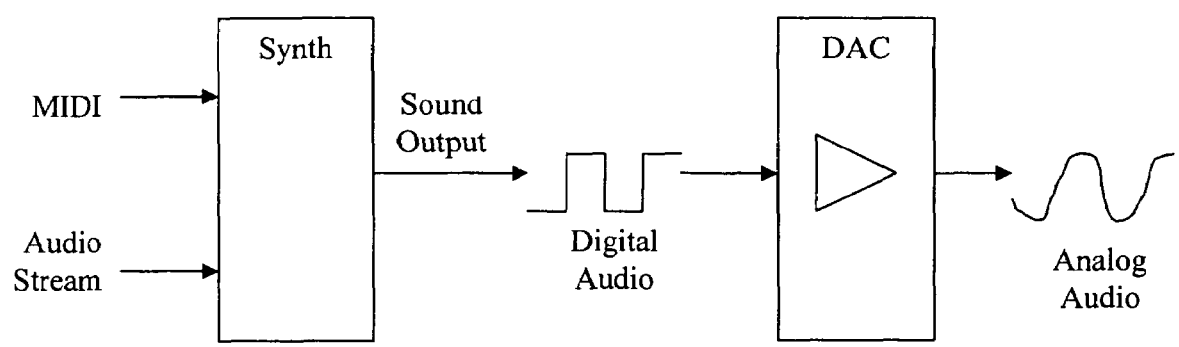
FIG. 39 illustrates a simplified logical arrangement of MIDI and audio streams in the music generation process for purposes of understanding preferred embodiments of the present invention.

FIG. 39 shows a simplified logical arrangement of the MIDI and Audio Streams in the music generation process. The two inputs going to the Synth are preferably merged and turned into a digital audio output signal. This output signal is then preferably fed to a digital to analog converter (DAC), from which is preferably output an analog audio signal suitable for use with headphones, etc. Note that in our example, the Audio stream input to the Synth might typically come from a relatively slow memory means (e.g.; Flash memory), while the MIDI input to the Synth might come from a relatively fast memory means (e.g.; SRAM buffer).

The two inputs to the Synth device preferably may actually share a multiplexed bus; but logically they can be considered as separately distinguishable inputs. In one example, the two inputs share a 16 bit wide bus. In this case, the MIDI input preferably may occupy 8 bits at one time, and the audio stream input preferably may occupy 16 bits at another time. Following this example, one stream preferably may pause while the other takes the bus. Such alternating use of the same bus can mean that relatively small pauses in each stream are constantly occurring. Such pauses are intended to be imperceptible, and so, for our purposes here, the two streams can be thought of as separate.

Figure 40:
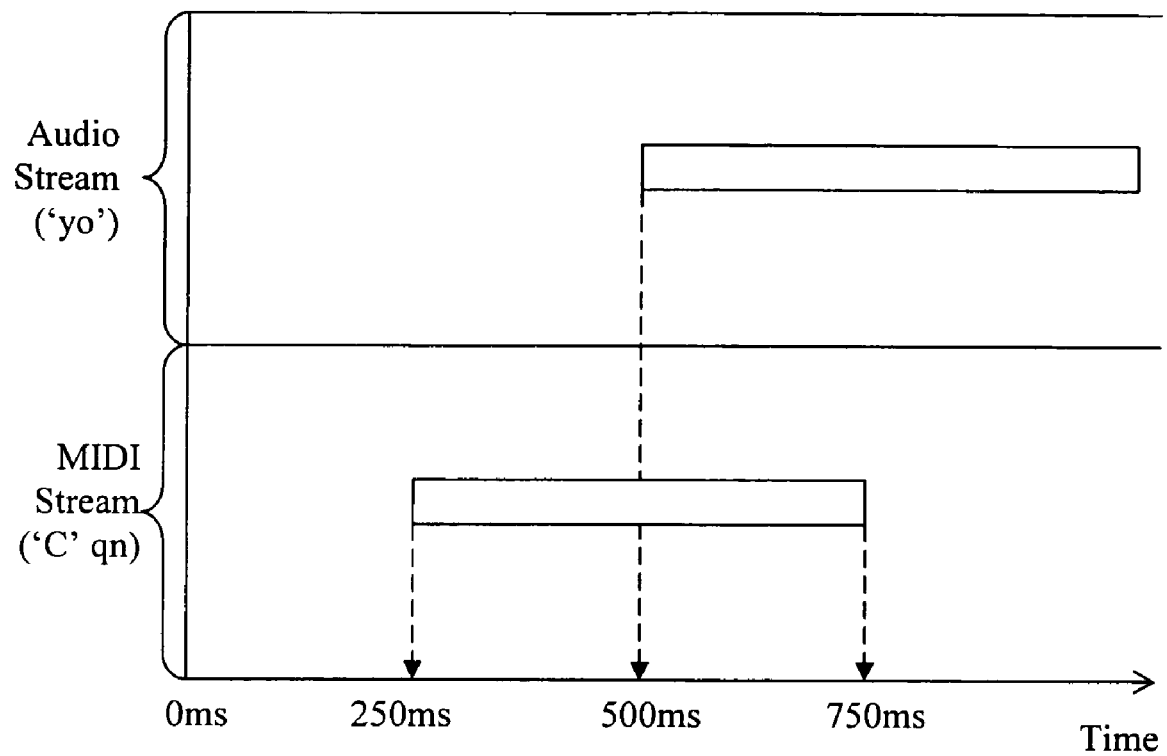
FIG. 40 illustrates a simplified MIDI and audio stream timeline for purposes of understanding preferred embodiments of the present invention.

FIG. 40 shows a simplified MIDI/Audio Stream timeline. Assume that FIG. 40 is the timing for the very beginning of a Block. It follows then, that in this case, the designer wants to play a MIDI note, starting 250 ms after the beginning of the Block, that will last 500 ms. The duration of the note relates to the type of note being played, for example, if it is a quarter note in a 4/4 time, and with a measure duration of 2 seconds, a 500 ms would correspond to a quarter note duration. Also indicated in FIG. 40, that an Audio stream event such as a short voice sample "yo" will preferably be synchronized to occur in the middle of the MIDI event. Bear in mind that this method allows the sample to preferably be quantized to the music, in the sense that it can involve the subtle correction of minor timing errors on the part of the user by synchronizing the sample to the musical context.

In this example, largely because of the constraints of the system architecture example discussed above, this is not a trivial thing to accomplish consistently and accurately using conventional techniques. Keeping in mind that the MIDI event is preferably generated almost instantly by the Synth chip, whereas the Audio Stream event could require one or more of the following assistance from the ARM MP: fetching a sound from SMC, decompressing (PCM, etc.), adding sound effects (reverb, filters, etc.).

In this example, it is highly desirable to create a special MIDI file preferably containing delta time information for each event, and specialized non-registered parameter numbers (NRPNs). This feature is especially advantageous when used with a Sample List (as mentioned above) because the name of a particular sample in a list is preferably implicit, and the NRPNs can preferably be used to trigger different samples in the particular sample list without explicitly calling for a particular sample name or type. This type of optimization reduces the burden of fetching a particular sample by name or type, and can preferably allow the samples used to be preloaded.

FIG. 41 depicts an example of a MIDI NRPN that can be advantageously incorporated into the present invention to allow efficient synchronization of MIDI events with audio samples and effects. The left column depicts the hexadecimal values making up the MIDI NRPN stream. As anyone who works with the MIDI Specification (previously incorporated by reference) will appreciate, the MIDI NRPN is a data structure that enables custom use of portions of a MIDI stream. Accordingly, it can preferably be used to trigger specific custom events for a given architecture.

In FIG. 41, the first hexadecimal value 'B0' preferably indicates' a channel number, as well as that it is a MIDI controller command. This can be used to assist with routing in a multi-channel arrangement. In our example, for purposes of simplicity this is set channel 0. The second value '63' preferably indicates that this particular stream contains NRPN information for a particular controller (e.g., 'A'). In this example, NRPN Controller A can be understood by the firmware/software to indicate an audio sample type. The third row value of '40' preferably is data that corresponds to the controller, and in our example this data can be understood to describe the type of sample. As an example of the usefulness of this arrangement, if the type is set to 'long', then the firmware/software preferably can arrange to load the sample in chunks. The fourth row preferably indicates a delta time, in MIDI clicks, that can preferably be used to precisely time the next event. In our example, this delta time is set to '00' for simplicity. The fifth row preferably indicates that this particular stream contains NRPN information for a 'B' controller. In this example, NRPN Controller B can be understood by firmware/software to indicate an audio effects type. This is because we have found it advantageous to use a MIDI DSP component that includes certain audio effects that can be controlled effectively in a timely manner via MIDI NRPNs. The sixth row preferably indicates the identification of the particular audio effects type called for in this NRPN example. While '00' is shown for simplicity, it should be understood that the value in this part of the MIDI stream can be interpreted by the firmware/software to select a particular effect from the available audio effects for a particular architecture. The seventh row preferably indicates another delta time that can be interpreted as a delay. The eighth row preferably can be used to indicate to the firmware/software the identification of a register to store the NRPN Controller A value shown in row nine. The ninth row uses '03' as an example; this preferably can be interpreted to mean the third audio sample in a list corresponding to a song (see 'Sample List' in FIGS. 29 and 30). Value '00' can be used effectively to instruct the firmware/software to select a sample from the sample list randomly. The tenth row of FIG. 41 is preferably another delta time value (e.g., '00' is zero MIDI clicks). The eleventh row preferably can be used to indicate to the firmware/software the identification of a register to store the NRPN Controller B value shown in row 12. The twelfth row uses '07' as an example; in the present discussion this preferably can be interpreted by the firmware/software to instruct the MIDI DSP to apply a particular audio effect among those available.

Figure 42:
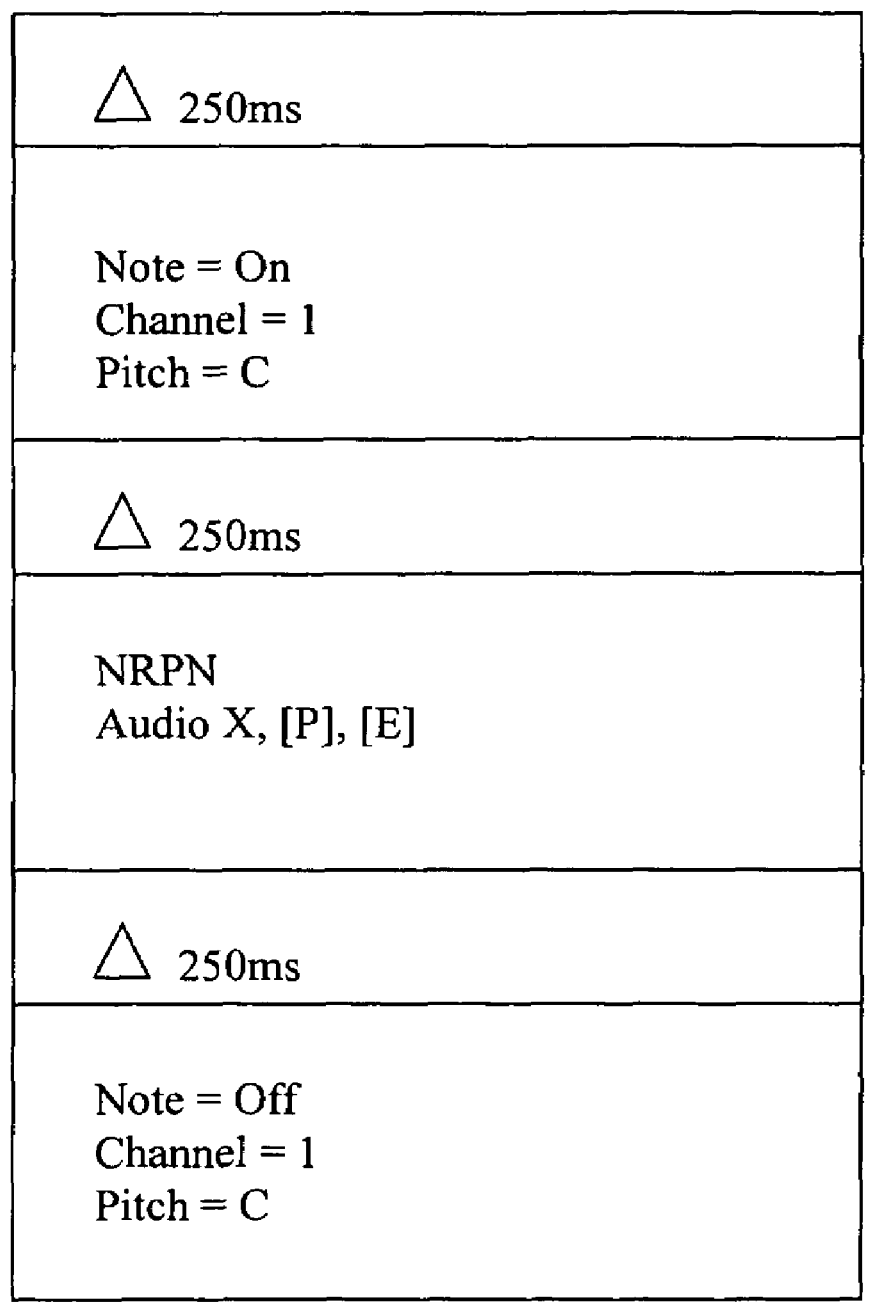

FIG. 42 is a simplified depiction of a special MIDI type file that is an example of the arrangement of the data being sent from the ARM MP to the DSP preferably via the MIDI input stream, along the lines of the example above.

The top of the figure indicates that the first information in this file is a delta time of 250 ms. This corresponds to the 250 ms delay at the beginning of FIG. 40. Next in the file depicted in FIG. 42 is general MIDI information preferably indicating a note on event for channel 1, pitch C. This corresponds to the time in FIG. 40 when 250 ms has passed. Next in FIG. 42, we have another 250 ms delta time. This represents the time between the previous MIDI event, and the next Audio Stream event at time 500 ms in FIG. 40. Next, in FIG. 42 we have an NRPN message that preferably indicates to the Synth chip that it needs to play the audio stream event X, with various parameters P, and various effects E. This corresponds to the audio stream event ('yo') depicted in FIG. 40. Then, in FIG. 42 we have another delta time event of 250 ms, followed by the general MIDI information preferably indicating a note off event for channel 1, pitch C. This final step corresponds to the end of the MIDI event in FIG. 40 (e.g., 'C' quarter note).

In the previous example, the delta time preferably can be different (and often is) each time in the special MIDI type file. In our simplified example, and because we want to make the timing relationship with a quarter note, etc., more clear, we have used the same 250 ms value each time. Obviously, in a more complex file, the delta time will vary.

Additionally, as discussed earlier in connection with the example of the Player function keys in FIG. 2, in certain embodiments it is preferable to detect the speed and/or velocity of a button press. In many of these embodiments, when the button press is, for example, causing a sample event to occur, it is preferable to pass the detected velocity-type information of the button press event into a MIDI-type event that triggers the sample to be played. In these examples, the velocity-type information can be advantageously represented in a MIDI-type event, in the portion of the event designated for velocity, aftertouch, volume, etc. Additionally, a MIDI-type event such as a system exclusive message, or an NRPN message, can alternatively be used.

As previously described, voice and other audio samples may be encoded, stored and processed for playback in accordance with the present invention. In certain preferred embodiments, voice samples are coded in a PCM format, and preferably in the form of an adaptive (predictive), differential PCM (ADPCM) format. While other PCM formats or other sample coding formats may be used in accordance with the present invention, and particular PCM coding formats (and ways of providing effects as will be hereinafter described) are not essential to practice various aspects of the present invention, a description of exemplary ADPCM as well as certain effects functions will be provided for a fuller understanding of certain preferred embodiments of the present invention. In accordance with such embodiments, a type of ADPCM may provide certain advantages in accordance with the present invention.

As will be appreciated by those of skill in the art based on the disclosure herein, the use of ADPCM can enable advantages such as reduced size of the data files to store samples, which are preferably stored in the non-volatile storage (e.g., SMC), thus enabling more samples, song lists and songs to be stored in a given amount of non-volatile storage. Preferably, the coding is done by a packet of the size of the ADPCM frame (e.g., 8 samples). For each packet, preferably a code provides the maximum value; the maximum difference between two samples is coded and integrated in the file. Each code (difference between samples (delta_max) and code of the packet (diff_max)) uses 4 bits. In accordance with this example, the data/sample is therefore (8*4+4)/8=4.5 bits/sample.

As will be appreciated, this type of coding attempts to code only what is really necessary. Over 8 samples, the maximum difference between two samples is in general much less than the possible dynamic range of the signal (+32767/−32768), and it is therefore possible to allow oneself to code only the difference between samples. Preferably, the ADPCM is chosen to be suitable for the voice that is relatively stationary. By predictive filtering, it is possible to reduce the difference between a new sample and its prediction. The better the prediction, the smaller the difference, and the smaller the coding (the quantization) that is chosen, taking into account the average differences encountered. While it will be appreciated that this approach requires additional computation ability for the prediction computation, it is believed that this approach provides significant advantages in reduced storage for samples with acceptable sample coding quality in accordance with the present invention. While more conventional or standardized ADPCM desires to offer a coding time without introducing delays, with the present invention it has been determined that such attributes are not essential.

A simple coding without prediction and taking into account only average values of differences encountered reacts very poorly to a non-stationary state (e.g., each beginning of a word or syllable). For each new word or syllable, a new difference much greater than the average differences previously encountered typically cannot be suitably coded. One therefore tends to hear an impulse noise depending on the level of the signal. Preferably, the solution is therefore to give the maximum value of the difference encountered (one therefore has a delay of 8 samples, a prediction is thus made for the quantizer only) for a fixed number of samples and to code the samples as a function of this maximum difference (in percentage). The coding tends to be more optimal at each instant, and reacts very well to a non-stationary state (each beginning of a word or syllable). Preferably, the coding is logarithmic (the ear is sensitive to the logarithm and not to the linear), and the Signal/Noise ratio is 24 db. In preferred embodiments, this function is put in internal RAM in order to be executed, for example, 3 times more rapidly (one clock cycle for each instruction instead of three in external flash memory).

Preferably certain effects may be included in the ADPCM coding used in certain embodiments of the present invention. For example, a doppler effect may be included in the ADPCM decoding since it requires a variable number of ADPCM samples for a final fixed number of 256 samples. As is known, such a doppler effect typically consists of playing the samples more or less rapidly, which corresponds to a variation of the pitch of the decoded voice accompanied by a variation of the speed together with the variation of pitch. In order to give a natural and linear variation, it is desirable to be able to interpolate new samples between two other samples. The linear interpolation method has been determined to have certain disadvantages in that it tends to add unpleasant high frequency harmonics to the ear.

The method traditionally used consists of over-sampling the signal (for example, in a ratio of 3 or 4) the signal and then filtering the aliasing frequencies. The filtered signal is then interpolated linearly. The disadvantage of this method is that it requires additional computational ability. Preferably, in accordance with certain embodiments, a technique is utilized that consists of interpolating the signal with the four adjacent samples. It preferably corresponds to a second order interpolation that allows a 4.5 dB gain for the harmonics created by a linear interpolation. While 4.5 db seems low, it is important to consider it in high frequencies where the voice signal is weak. The original high frequencies of the voice are masked by the upper harmonics of the low frequencies in the case of the linear method, and this effect disappears with second order interpolation. Moreover, it tends to be three times faster than the over-sampling method. Preferably, this function is put in internal RAM in order to be executed, for example, 3 times more rapidly (one clock cycle for each instruction instead of three in external flash memory).

Also in accordance with preferred embodiments, an electronic metronome function is included, which consists of counting the period number (the pitch) in an analysis window in order to deduce from this the fundamental frequency. Preferably, this function may be utilized to process samples in order to reveal the periods. In general, it is not feasible to count the peaks in the window because the signal tends to vary with time (for example, the beating of 1 to 3 piano strings that are not necessarily perfectly in tune); moreover, in the same period, there can be more than one peak. In accordance with such embodiments, the distance between a reference considered at the beginning of the analysis window and each of the panes shifted by one sample. For a window of 2*WINDOW_SIZE samples and a reference window of WINDOW_SIZE samples, one therefore may therefore carry out WINDOW_SIZE computations of distance on WINDOW_SIZE samples. Preferably, the computation of distance is done by a sum of the absolute value of the differences between reference samples and analysis samples. This function preferably is put in internal RAM in order to be executed, for example, 3 times more rapidly (one clock cycle for each instruction instead of three in external flash memory).

Also in accordance with such embodiments, special effects such as wobbler, flange, echo and reverb may be provided with the ADPCM encoding. Such special effects preferably are produced over 256 samples coming from the ADPCM decoder and from the doppler effect. Preferably, this function is put in internal RAM in order to be executed, for example, 3 times more rapidly (one clock cycle for each instruction instead of three in external flash memory). Preferably, the average value of the sample is computed, and it is subtracted from the sample (which can be present over the samples) in order to avoid executing the wobbler function on it, which would add the modulation frequency in the signal (and tend to produce an unpleasant hiss). Preferably, the method for the wobbler effect is a frequency modulation based on sample=sample multiplied by a sine function (based on suitable wobbler frequencies, as will be understood by those of skill in the art).

Also in accordance with the preferred embodiments, the purpose of the flange effect is to simulate the impression that more than one person is speaking or singing with a single source voice. In order to limit the computation power, two voices preferably are simulated. In order to provide this impression, preferably the pitch of the source voice is changed and added to the original source voice. The most accurate method would be to analyze the voice using a vocoder and then to change the pitch without changing the speed. In each case, one could have the impression that a man and a woman are singing together, although such a method typically would require DSP resources. A method that changes the pitch without changing the speed (important if one wants the voices to remain synchronous) consists of simulating the second voice by alternately accelerating and decelerating the samples. One then produces the doppler effect explained in the preceding, but with a doppler that varies alternately around zero in such a way as to have a slightly different pitch and the voices synchronous. With such embodiments, one may simulate, for example, a person placed on a circle approximately 4 meters in diameter regularly turning around its axis and placed beside another stationary person.

Also in accordance with such embodiments, the echo effect is the sum of a source sample and of a delayed sample, and the reverb effect is the sum of a source sample and a delayed sample affected by a gain factor. The delayed samples preferably may be put in a circular buffer and are those resulting from the sum. The formula of the reverb effect may therefore be:

Sample(0)=sample(0)+sample(−n)*gain+sample(−2*n)*gain^2+sample (−3*n)*gain^+ . . . +sample(−i*n)*gain^i.
Preferably, the gain is chosen to be less than 1 in order to avoid a divergence. In accordance with preferred embodiments, for reasons of size of the buffer, which can be considerable, the echo effect preferably uses the same buffer as that of the reverb effect. In order to have a true echo, it is necessary to give reverb a gain effect that is zero or low. The two effects can function at the same time. The delay between a new sample and an old one is produced by reading the oldest sample put in the memory buffer. In order to avoid shifting the buffer for each new sample, the reading pointer of the buffer is incremented by limiting this pointer between the boundaries of the buffer. The size of the memory buffer therefore depends on the time between samples.

Also in accordance with such embodiments, an electronic tuner function may be provided, the aim of which is to find the fundamental of the sample signal coming from the microphone in order to give the note played by a musical instrument. Similar to what has been described previously, a preferred method will consist of computing the number of periods for a given time that is a multiple of the period in order to increase the accuracy of computation of the period. In effect, a single period will give little accuracy if the value of this period is poor because of the sampling. In order to detect the periods, preferably one uses a routine which computes the distance between a reference taken at the beginning of the signal and the signal. As will be understood, the period will be the position of the last period divided by the total number of periods between the first and the last period. The effective position of the last period is computed by an interpolation of the true maximum between two distance samples. The period thus computed will give by inversion (using a division of 64 bits/32 bits) the fundamental frequency with great precision (better than 1/4000 for a signal without noise, which is often the case).

Also in accordance with such embodiments, a low pass filter (or other filter) function may be provided as part of the effects provided with the ADPCM sample coding. Such a function may eliminate with a low-pass filter the high frequencies of the samples used for computation of the distance such for the routines previously described. These high frequencies tend to disturb the computations if they are too elevated. Filtering is done by looking for the highest value in order to normalize the buffer used for computation of the distance.

Also in accordance with the present invention, there are numerous additional implementations and variations that preferably can be used with many desirable aspects of the present invention. Exemplary ways to use the present invention to great effect include a software-based approach, as well as general integration with other products. Additionally, several valuable variations to the present invention can be used with great success, especially with regard to media content management, integration with video, and other miscellaneous variations.

Many aspects of the present invention can advantageously be employed in connection with a digital/video light show. As described in more detail in U.S. Pat. No. 4,241,295, entitled "Digital Lighting Control System," and U.S. Pat. No. 4,797,795, entitled "Control System for Variable Parameter Lighting Fixtures," hereby incorporated by reference in their entirety, the control of video and/or stage-type lighting systems can be performed using digital commands such as MIDI-type descriptor events. Accordingly, in certain of the presently described embodiments, it is preferable to integrate aspects of the music generation with such types of video/light control systems. As an example, the musical and visual events can be synchronized, temporally quantized, and/or otherwise coordinated using parameters such as the delta time, velocity, NRPN, system exclusive, etc. Such coordination may be advantageous, as significant changes in the music (e.g., going from Intro to Chorus) may be arranged coincide with the timing and/or intensity, color, patterns, etc., of the visuals. In such embodiments, the experience for someone listening and viewing the audio/visual output will desirably be improved.

Many aspects of the present invention can be incorporated with success into a software-based approach. For example, the hardware DSP of the above discussion can be substituted with a software synthesizer to perform signal processing functions (the use of a hardware-based synthesizer is not a requirement of the present invention). Such an approach preferably will take advantage of the excess processing power of, for example, a contemporary personal computer, and preferably will provide the quality of the music produced in a hardware-based device, while also providing greater compatibility across multiple platforms (e.g., it is easier to share a song that can be played on any PC). Configuring certain embodiments of the present invention into a software-based approach enables additional variations, such as a self-contained application geared toward a professional music creator, or alternatively geared towards an armchair music enthusiast. Additionally, it is preferable to configure a software-based embodiment of the present invention for use in a website (e.g., a java language applet), with user preferences and/or customizations to be stored in local files on the user's computer (e.g., cookies). Such an approach preferably enables a user to indicate a music accompaniment style preference that will 'stick' and remain on subsequent visits to the site. Variations of a software-based approach preferably involve a 'software plug-in' approach to an existing content generation software application (such as Macromedia Flash, Adobe Acrobat, Macromedia Authorware, Microsoft PowerPoint, and/or Adobe AfterEffects). It is useful to note that such a plug-in can benefit from the potentially royalty free music, and that in certain embodiments, it may be preferable to export an interactively generated musical piece into a streaming media format (e.g., ASF) for inclusion in a Flash presentation, a PDF file, an Authorware presentation, an AfterEffects movie, etc. Certain embodiments of the present invention can be involved in a Internet-based arrangement that enables a plurality of users to interactively generate music together in a cooperative sense, preferably in real time. Aspects of the present invention involving customized music can be incorporated as part of music games (and/or music learning aids), news sources (e.g., internet news sites), language games (and/or language learning aids), etc. Additionally, a software/hardware hybrid approach incorporating many features and benefits of the present invention can involve a hybrid "DSP" module that plugs into a high speed bus (e.g., IEEE 1394, or USB, etc.) of a personal computing system. In such an approach, the functionality of MP 36 can be performed by a personal computing system, while the functionality of DSP 42 can be performed by a DSP located on a hardware module attached to a peripheral bus such as USB. Following this example, a small USB module about the size of a automobile key can be plugged into the USB port of a PC system, and can be used to perform the hardware DSP functions associated with the interactive auto-generation of algorithmic music.

As will be appreciated, many advantageous aspects of the present invention can be realized in a portable communications device such as a cellular telephone, PDA, etc. As an example, in the case of a portable communications device incorporating a digital camera (e.g., similar in certain respects to the Nokia 3650 cellular telephone with a built-in image capture device, expected to be available from Nokia Group sometime in 2003), certain preferred embodiments involve the use of the algorithmic music generation/auto-composition functions in the portable communications device. Following this example, the use of a digital image capture device as part of such embodiments can allow a user to take one or more pictures (moving or still) and set them to music, preferably as a slideshow. Such augmented images can be exchanged between systems, as the data structure required to store music (e.g., SDS and CDS structures and features illustrated in FIGS. 28-31 and discussed herein) preferably is relatively efficient, and accordingly lends itself to such a slideshow distribution, as the bandwidth available to such a portable communications device is relatively limited.

As will be appreciated, aspects of the present invention may be incorporated into a variety of systems and applications, an example of which may be a PBX or other telephone type system. An exemplary system is disclosed in, for example, U.S. Pat. No. 6,289,025 to Pang et al., which is hereby incorporated by reference (other exemplary systems include PBX systems from companies such as Alcatel, Ericsson, Nortel, Avaya and the like). As will be appreciated from such an exemplary system, a plurality of telephones and telephony interfaces may be provided with the system, and users at the facility in which the system is located, or users who access the system externally (such as via a POTS telephone line or other telephone line), may have calls that are received by the system. Such calls may be directed by the system to particular users, or alternatively the calls may be placed on hold (such aspects of such an exemplary system are conventional and will not be described in greater detail herein). Typically, on-hold music is provided to callers placed on hold, with the on-hold music consisting of a radio station or taped or other recorded music coupled through an audio input, typically processed with a coder and provided as an audio stream (such as PCM) and coupled to the telephone of the caller on hold.

In accordance with embodiments of the present invention, however, one or more modules are provided in the exemplary system to provide on-hold music to the caller on hold. Such a module, for example, could include the required constituent hardware/software components of a Player as described elsewhere herein (see, e.g., FIG. 32 and related description) (for purposes of this discussion such constituent hardware/software components are referred to as an "auto-composition engine"), but with the user interface adapted for the PBX-type of environment. In one such exemplary embodiment, one or more auto-composition engines are provided, which serve to provide the on-hold music to one or more callers on hold. In one example, a single auto-composition engine is provided, and the first caller on hold may initially be presented with auto-composed music of a particular style as determined by the auto-composition engine (or processor controlling the exemplary system) (this may also be a default on hold music style selected by a configuration parameter of the exemplary system). Preferably, via an audio prompt provided by the resources of the exemplary system, the caller on hold is provided with audio information indicating that the caller on hold may change the style of on-hold music being provided (such audio prompt generation is considered conventional in the context of such exemplary systems and will not be described in greater detail herein). Preferably, the user may indicate such desire by pressing a predetermined digit (which preferably is identified in the audio prompt) on the telephone key pad, which may be detected by the resources of the exemplary system (such digit detection capability is considered conventional in the context of such exemplary systems and will not be described in greater detail herein), and thereafter may be provided with preferably a plurality of music styles from which to select the style of on-hold music (such as with audio prompts providing available styles of music followed by one or more digits to be entered to select the desired style of music). Thereafter, the user may depress the appropriate digit(s) on the telephone keypad, which are detected by the resources of the exemplary system, which preferably decodes the digits and sends control information to one of the auto-composition engines, in response to which the auto-composition engine thereafter begins to auto-compose music of the selected style, which is directed to the caller on hold as on hold music.

What is important is that, in accordance with such embodiments, one or more auto-composition engines are adapted for the exemplary system, with the command/control interface of the auto-composition engine being changes from buttons and the like to commands from the resources of the exemplary system (which are generated in response to calls being placed on hold, digit detection and the like). In accordance with variations of such embodiments, a plurality of auto-composition engines are provided, and the resources of the system selectively provide on-hold music to on hold callers of a style selected by the caller on hold (such as described above). In one variation, there may potentially be more callers on hold than there are auto-composition engines; in such embodiments, the callers on hold are selectively coupled to one of the output audio streams of the auto-composition engines provided that there is at least one auto-composition engine that is not being utilized. If a caller is place on hold at a time when all of the auto-composition engines are being utilized, the caller placed on hold is either coupled to one of the audio streams being output by one of the auto-composition engines (without being given a choice), or alternatively is provided with an audio prompt informing the user of the styles of on-hold music that are currently being offered by the auto-composition engines (in response thereto, this caller on hold may select one of the styles being offered by depressed one or more digits on the telephone keypad and be coupled to an audio stream that is providing auto-composed music of the selected style).

Other variations of such embodiments include: (1) the resources of the exemplary system detect, such as via caller ID information or incoming trunk group of the incoming call, information regarding the calling party (such as geographic location), and thereafter directs that the on hold music for the particular on hold be a predetermined style corresponding to the caller ID information or trunk group information, etc.; (2) the resources of the exemplary system selectively determines the style of the on-hold music based on the identity of the called party (particular called parties may, for example, set a configuration parameter that directs that their on hold music be of a particular style); (3) the resources of the exemplary system may selectively determine the style of on-hold music by season of the year, time of day or week, etc.; (4) the exemplary system includes an auto-composition engine for each of the styles being offered, thereby ensuring that all callers on-hold can select one of the styles that are offered; (5) default or initial music styles (such as determined by the resources of the exemplary system or called party, etc., as described above) are followed by audio prompts that enable the caller on hold to change the music style; and (6) the resources of the exemplary system further provide audio prompts that enable a user to select particular music styles and also parameters that may be changed for the music being auto-composed in the particular music style (in essence, audio prompt generation and digit detection is provided by the resources of the exemplary system to enable the caller on hold to alter parameters of the music being auto-composed, such as described elsewhere herein.

Other examples of novel ways to generally integrate aspects of the present invention with other products include: video camera (e.g., preferably to enable a user to easily create home movies with a royalty free, configurable soundtrack), conventional stereo equipment, exercise equipment (speed/intensity/style programmable, preferably similar to workout-intensity-programmable capabilities of the workout device, such as a StairMaster series of hills), configurable audio accompaniment to a computer screensaver program, and configurable audio accompaniment to an information kiosk system.

Aspects of the present invention can advantageously be employed in combination with audio watermarking techniques that can embed (and/or detect) an audio 'fingerprint' on the musical output to facilitate media content rights management, etc. The preferable incorporation of audio watermarking techniques, such as those described by Verance or Digimarc (e.g., the audio watermarking concepts described by Digimarc in U.S. Pat. Nos. 6,289,108 and 6,122,392, incorporated herein by reference), can enable a user with the ability to monitor the subsequent usage of their generated music.

In another example, certain embodiments of the present invention can be incorporated as part of the software of video game (such as a PlayStation 2 video game) to provide music that preferably virtually never repeats, as well as different styles preferably selectable by the user and/or selectable by the video game software depending on action and/or plot development of the game itself.

Certain embodiments involve the use of the algorithmic music generation described herein to provide music to a video game player. In one embodiment, referring to selected portions of FIG. 32, a module (e.g., suitable for use with a video game system such as the Xbox from Microsoft Corporation) incorporating DSP 42 (and preferably one or more of the following: Flash 49, RAM 48, DSP data bus 47, and DSP address bus 46) is operably connected to a video game console (e.g., such as a personal computer system, the aforementioned MS Xbox, and/or PS2 from Sony Computer Entertainment of America). Such a module permits the high quality musical sounds to be generated, e.g., via the high quality afforded by the DSP resource. Preferably, much of the algorithmic processing of the musical rules, etc., is performed by the processing resources of the video game console itself. Of course, as described elsewhere herein, certain embodiments use a software-based DSP to provide the computing resources afforded by the DSP 42 (and related subsystems). In such alternative embodiments, the DSP processing is performed by the video game console as well.

In certain video game embodiments, the music being generated is updated in response to events in the game. For example, in the case of a game where a user encounters various characters during the game, one or more characters preferably have a style of music associated with them. In these embodiments, although the music may not repeat, the style of music preferably will indicate to the user that a particular character is in the vicinity.

In certain video game embodiments, a particular component of the music (e.g., the lead instrument, or the drums) is associated with a character, and as the particular character moves in closer proximity to the video game user, the corresponding component of the music preferably is adjusted accordingly. For example, as a video game user moves closer to a particular villain, the music component that corresponds to that villain (e.g., the lead instrument) is adjusted (e.g., raises in relative volume, and/or exhibits other changes such as increased relative mobility of note pitch as illustrated in FIG. 23, and/or increased relative rhythmic density as illustrated in FIG. 18, etc.).

In certain video game embodiments, information relating to the musical piece (e.g., information such as the parameters illustrated in FIGS. 28, 30, and 59) preferably is saved to a removable memory location, e.g., as discussed elsewhere herein. In certain examples, e.g., such as the Sony Playstation 2, it is preferable to save the information to a modular Flash memory card provided for saving other video game data. In these examples, the relatively small size of the musical information required to recreate a musical piece is particularly advantageous, given the relatively limited size (and high expense) of the removable flash memory cartridges used by the video game console to save video game data.

Additionally, there are certain novel variations to the present invention that incorporate many advantages of the present invention to great effect. For example, in the portable hardware device 35 in FIG. 32, the incoming data on MIC input 51 (e.g., a vocal melody of the user) can pass through hardware codec 52 to MP 36, where it can be analyzed by the MP 36 and processed/adjusted by DSP 42 (under control of MP 36) to subtly 'improve' pitch and/or rhythm characteristics. This example illustrates a preferable arrangement that allows a user's vocal input to be adjusted to conform to the key and/or rhythmic characteristics of the accompanying music. Continuing this example, the pitch of a user's input to MIC input 51 preferably can be analyzed by the portable hardware device 35 and bumped up or down in pitch to more closely match a pitch that fits the current key and/or mode of the music. Such a variation provides a novice user with a easy way to generate songs that are musically compelling, yet preferably are also noticeably derivative of the user's input (e.g., vocal). In another example variation, the circuitry mentioned here preferably can be available to analyze the user's input (e.g., vocal) and infer some type of timing and/or melody information, which information preferably can then be used in the interactive music autogeneration to help define the pitch values and/or the rhythmic data comprised in the RP. This example presents a way for a user to demonstrably interact with, and influence, the musical output, all the while without needing to fully understand the complexities of musical composition.

In certain embodiments it is preferable to enable a vocal chord mode that analyzes the vocal microphone input in real time and, as part of the music composition being generated, mimics the input vocal characteristics in a realtime manner. As one example, this feature can provide a vocal chord effect that combines the user's vocal input events with one or more artificially generated vocal events. In this fashion, preferably a user can sing a part and hear a chord based on their voice. This feature may advantageously be used with a pitch-correcting feature discussed elsewhere in the present disclosure.

In certain embodiments it is preferable to provide a reference note to the user in real time. Such a reference note preferably will provide a tonic context for the user, e.g., so that they are more likely to sing in tune. Further, in certain embodiments, such a reference note may serve as a reference melody, and provide the user with an accurate melody/rhythm line to sing along with. These features may be particularly advantageous in a karaoke context. In many of these embodiments, it is desirable to limit the reference note to the user's ear piece (e.g., allowing the user to bar the reference note information from any recording and/or performance audio output).

Certain embodiments directed to additional inventive concepts associated with the generation of a singing part will now be further described in greater detail. This discussion may also provide further context for certain vocal-related features discussed herein.

On one level, vocal communication can be considered to be various combinations of a limited number of individual sounds. For example, linguists have calculated a set of approximately 42 unique sounds that are used for all English language vocal communication. Known as 'phonemes', this set is of the smallest segments of sound that can be distinguished by their contrast within words. For example, a long 'E' sound is used in various spellings such as 'me', 'feet', 'leap', and 'baby'. Also, a 'sh' sound is used in various spellings such as 'ship', 'nation', and 'special'. As further examples, a list of English language phonemes is available from the Auburn University website at http://www.auburn.

edu/~murraba/spellings.html. Phonemes are typically associated with spoken language, and are but one way of categorizing and subdividing spoken sounds. Also, the discussion herein references only English language examples. Clearly, using the set of English phonemes as an example, one can assemble a set of sounds for any language by listening and preparing a phonetic transcription. Similarly, while the above discussion references only spoken examples, the same technique can be applied to sung examples to assemble a set of phonetic sounds that represent sung communication. While the list of assembled sound segments preferably will be longer than the set of English phonemes, this method can be used to identify a library of sung sound segments.

The Musical Instrument Digital Interface standard (MIDI) was developed to enable a communication protocol for digital-based musical products. It has since become the defacto standard for all digital-based music-related products that are designed to interact with each other. MIDI incorporates the capability to assign a bank of sounds to a particular 'soundbank' such that, for example, a set of grand piano sounds can be selected by sending a soundbank MIDI command identifying the sound bank. Thereafter, it is possible to sound individual notes of the soundbank using, for example, a 'note-on' command. Additionally, certain characteristics indicating how the individual note should sound are available (e.g., such as 'velocity' to indicate the speed at which the note is initiated). More information on MIDI can be received from the MIDI Manufacturer's Association in California.

In accordance with embodiments of the present invention, MIDI can be advantageously incorporated into a larger system for generating music including a singing part. Given the context of a music generation environment such as previously referenced, a vocal track can be added to the system, preferably with a library of sounds (e.g., phonemes), and preferably through the use of a control protocol (e.g., MIDI). Following this example, a library of phonemes can be associated with a MIDI soundbank (e.g., preferably via a particular channel that is set aside for voice). Preferably, individual phonemes in the library can be identified by the 'program' value for a given MIDI event. The amplitude of a given piece of sound (e.g., phoneme) preferably can be indicated by the velocity information associated with a given MIDI event. The pitch of each piece of sound preferably can similarly be identified using the 'note' value associated with a given MIDI event. In addition, the desired duration for each piece of sound can preferably be indicated in MIDI using the sequence of a note-on event associated with a certain time, followed by a note-off event associated with a delta time (e.g., a certain number of MIDI clocks after the note-on event was executed). Of course, the alternative usage of another note-on command with a velocity of zero can also used to indicate the end of a note, as is well known in the MIDI field.

Previously disclosed embodiments for the autogeneration of music have been mentioned herein. The various features and implementations of these previous disclosures include the use of musical rules (e.g., computer algorithms) to generate a complete musical piece. These musical rules can include ways of automatically generating a series of musical events for multiple simultaneous parts (e.g., drums, bass, etc.) of a musical piece. Further, preferably a music rule that can effectively quantize the individual parts such that they are preferably harmony-corrected to be compatible with a musical mode (e.g., descending Lydian). In addition, these musical rules can preferably incorporate rhythmic components as well, to quantize generated events of each part such that they preferably are time-corrected in keeping with a particular groove, or style of music (e.g., swing, reggae, waltz, etc.).

Finally, the previously referenced disclosures also provide certain embodiments for enabling user-interaction with an auto-generated musical composition.

Using the music autogeneration concepts previously discussed, vocal processing functions can similarly be used that, for example, generate a string of MIDI events incorporating auto-generated pitch, amplitude, and/or duration characteristics, to sound a series of vocal sounds from a library of fundamental vocal sounds. As an example, the series of pitches generated preferably can be harmony-corrected according to a particular musical mode, and the rhythmic duration and/or relative loudness preferably can be rhythm-corrected according to a particular desired groove, time-signature, style, etc. Furthermore, in certain embodiments it is preferable to impose additional rules relating more specifically to text. As an example, human voice communication can be observed to only change pitch during certain phonemes (e.g., vowel sounds). Accordingly, in certain embodiments it is desirable to check the phoneme type during the autogeneration process before allowing a pitch value to be changed. In another example, in certain embodiments it is preferable to only allow pitch change to occur to an accented syllable, or a 'long' syllable (e.g., the "o" sound as opposed to the "range" sound in "orange"). In these embodiments it is desirable to confirm that a particular sound is compatible with a pitch change during the autogeneration process. Such screening activity can be performed in a variety of ways; as an example, the vocal library can be arranged as a sound bank, with the 'pitch-change-compatible' sounds arranged to be together in one region of the addressable range associated with the soundbank. Following this example, when the music rules are being performed, and a sounding vocal note is being given a note change event, it is preferable to check the MIDI address of the current sound to determine if it is in the 'acceptable' range associated with a pitch change event. As will be clear to one of ordinary skill in the art, this is but one implementation example.

The discussion thus far has addressed how to generate and play a series of nonsensical sounds in a musical generation system, preferably in order to approximate the sound of a vocal track in a musical composition. The next section adds to the mixture the ideas of text-to-speech algorithms, in order to enable a sensical string of vocal sounds.

Figure 44:
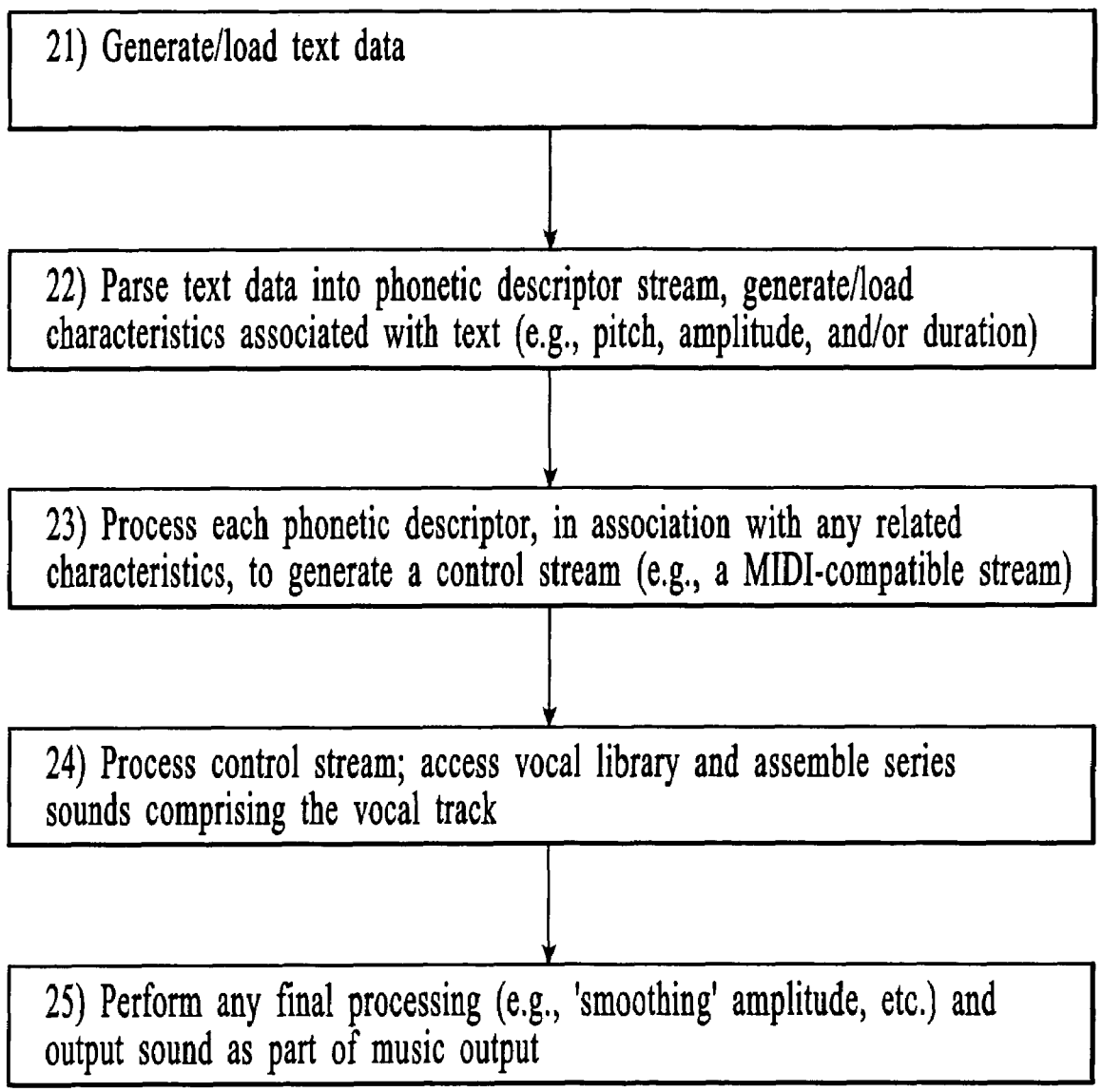
FIG. 44 illustrates another exemplary preferred process flow utilized in accordance with certain embodiments of the present invention involving automatic vocal features.

Text information preferably can readily be analyzed to identify individual phonetic components. For example, language analysis routines can be employed to identify context for each word, correct misspelling for commonly misspelled words, and identify commonly used abbreviations. Many text-to-phoneme schemes exist in the prior art; one example is the 1976 article authored by Honey S. Elovitz, Rodney Johnson, Astrid McHugh, and John E. Shore entitled "Letter-to-sound rules for automatic translation of English text to phonetics" (IEEE Transactions on Acoustics, Speech and Signal Processing). As illustrated in FIG. 44 of the present disclosure, text information (e.g., ASCII text) is generated or loaded (step 21), and preferably is parsed into a stream of phonetic descriptors (step 22). Preferably, this parsing process is associated with a generation and/or loading of characteristic information (e.g., pitch, amplitude, and duration) associated with each phonetic descriptor. Once a phonetic descriptor stream is assembled, preferably including characteristic information, it is processed and assembled into a control stream (e.g., MIDI-compliant data) preferably containing sound library identification information, pitch information, amplitude information, and/or duration/timing information (step 23). Preferably such a control stream is then processed by accessing a vocal library and assembling a series of sounds that together comprise a vocal track (step 24). Before the sound is output, it is preferable to perform processing operation such as a 'smoothing' operation to make simple adjustments to pitch, amplitude, and/or duration, etc., such that the output sound sounds more realistically as a flowing vocal line (step 25).

While the text can be user-definable/loadable, it also can be nonsensical. Certain examples in the music world incorporate nonsense singing syllables, such as 'scat' in jazz music, and ambient music from 'The Cocteau Twins', such as the "Heaven or Las Vegas" album. In certain embodiments where a more simple effect or architecture is desirable, it is preferable to have a reduced number of available phonemes in a sound library.

One variation of preferred embodiments of the present invention can be practiced by enabling an end user to enter or load text, for example, via a user input interface such as a keyboard, via a removable memory location, and/or via an interface to a personal computer (i.e., such as disclosed in the referenced and incorporated patent applications), and enable the inputted text to be used as a basis for an auto-generated vocal part, musically compatible with a musical composition. As an example in the context of the previously referenced and incorporated patent applications, FIG. 45 of the present disclosure depicts portable musical generation device 30, including visual output interface 32 (e.g., an LCD display), and audio output interface 34 (e.g., a stereo headphone output jack). As shown in the simplified example of FIG. 45, text input interface 36 allows an end user to enter text. In this example, text input interface 36 preferably is a miniature QWERTY keyboard, and preferably the user will see the entered text displayed on visual output interface 32. As portable musical generation device 30 preferably generates music according to music rules and algorithms, the text input by the end user via text input interface 36 preferably is parsed into a phonetic descriptor stream, combined with generated characteristics data (e.g., pitch, amplitude, duration, etc.), and processed to generate a control stream such as a MIDI-compatible stream. Preferably, as discussed herein in connection with the example of FIG. 44, the control stream preferably is then processed by accessing a vocal library and preferably assembling a series of sounds comprising the vocal track. At this point, the assembled vocal track preferably is subjected to any final processing (e.g., 'smoothing', etc.). Finally, the vocal sounds are preferably output along with any other musical parts via audio output interface 34 to the user. Preferably, the finished output is recognizable by the end user as bearing some connection with the text input by the end user via text input interface 36.

In other variations, in addition to, or in lieu of, the use of a text input interface, it is desirable to enable the use of prefabricated text, e.g., through an interface to another computer/the Internet (e.g., Data I/O interface 38 in FIG. 3). In other variations, a storage location such as storage memory 39 can be used to store and load text for use in a vocal track. Storage memory 39 preferably is a re-writeable, non-volatile memory such as flash, hard drive, etc.

In certain embodiments it is preferable to support the use of MIDI Lyric commands in carrying out the text-to-vocal processing. As an example, the text information can be provided in the form of a series of one or more MIDI Lyric commands (e.g., one command for one or more text syllables). Each MIDI Lyric command in this series is then preferably analyzed by the algorithm to create/derive one or more MIDI Program Change messages associated with the syllable. Following this example, in certain embodiments it is preferable to support a MIDI Karaoke file incorporating a series of MIDI Lyric commands associated with a song. Additionally, in certain cases it is preferable to parse the MIDI Lyric commands in a particular Karaoke file to subdivide the descriptors further, affording greater rhythmic control, as each Lyric command includes one delta time parameter associated with it. Accordingly, greater rhythmic control is provided as a finer degree of delta time control is possible.

In yet another embodiment, visual output interface 32 has a touchscreen overlay, and a keyboard may be simulated on visual output interface 32, with the keys of the simulated keyboard activated by touching of the touchscreen at locations corresponding to images of the keys displayed on visual output interface 32. With such embodiments, the use of the touchscreen may also obviate the need for most, if not all, of the physical buttons that are described in connection with the embodiments described in the referenced and incorporated patent applications.

In yet another alternative embodiment, the use of such key entry enables the user to input a name (e.g., his/her name or that of a loved one, or some other word) into the automatic music generation system. In an exemplary alternative embodiment, the typed name is used to initial the autocomposition process in a deterministic manner, such that a unique song determined by the key entry, is automatically composed based on the key entry of the name. In accordance with certain disclosed embodiments in the referenced and incorporated patent applications, for example, the characters of the name are used in an algorithm to produce initial seeds, musical data or entry into a pseudo random number generation process (PRNG) or the like, etc., whereby initial data to initiate the autocomposition process are determined based on the entry of the name. As one example, add the ASCII representation of each entered character, perhaps apply some math to the number, and use the resulting number as an entry into a PRNG process, etc. As another example, each letter could have a numeric value as used on a typical numeric keypad (e.g., the letters 'abc' corresponds to the number '2', 'def' to 3, etc.,) and the numbers could be processed mathematically to result in an appropriate entry to a PRNG process. This latter example may be particularly advantageous in situations where certain of the presently disclosed embodiments are incorporated into a portable telephone, or similar portable product (such as a personal digital assistant or a pager) where a keypad interface is supported.

As the process preferably is deterministic, every entry of the name would produce the same unique or "signature" song for the particular person, at least for the same release or version of the music generation system. While the autocomposition process in alternative embodiments could be based in part on the time or timing of entry of the letters of the name, and thus injecting user time-randomness into the name entry process (such human interaction randomness also is discussed in the referenced and incorporated patent documents) and in essence a unique song generation for each name entry, in preferred alternate embodiments the deterministic, non-random method is used, as it is believed that a substantial number of users prefer having a specific song as "their song" based on their name or some other word that has significance to them (a user may enter his/her name/word in a different form, such as backwards, no capital letters, use nick names, etc. to provide a plurality of songs that may be associated with that user's name in some form, or use the numbers corresponding to a series of letters as discussed herein in connection with a numeric keypad interface). As will be appreciated by those of skill in the art, this concept also is applicable to style selection of music to be autocomposed (as described in the referenced and incorporated patent documents; the style could be part of the random selection process based on the user entry, or the style could be selected, etc.). For example, for each style or substyle of music supported by the particular music generation system, a unique song for each style or substyle could be created based on entry of the user's name (or other word), either deterministically or based, for example, on timing or other randomness of user entry of the characters or the like, with the user selecting the style, etc.

As will be appreciated, the concept of name entry to initiate the autocomposition process is not limited to names, could be extended to other alphanumeric, graphic or other data input (a birthdate, words, random typed characters, etc.). With respect to embodiments using a touchscreen, for example, other input, such as drawn lines, figures, random lines, graphic, dots, etc., could be used to initiate the autocomposition process, either deterministically or based on timing of user entry or the like. What is important is that user entry such as keyboard entry of alphanumeric characteristics or other data entry such as drawings lines via the touchscreen (i.e., e.g., data entry that is generally not musical in nature), can be used to initiate the composition of music uniquely associated with the data entry events. Thus, unique music compositions may be created based on non-musical data entry, enabling a non-musically inclined person to create unique music based on non-musical data entry. Based on such non-musical data input, the music generation process picks seeds or other music generation initiation data and begins the autocomposition process. As will be appreciated, particularly with respect to entered alphanumeric data entry, such characters also could be stored (either alone or with music generation initiation data associated with the data entry), could be transmitted to another music generation system, whereby the transmission of the non-musical data is used to, in effect, transmit a unique song to another user/system, with the transmission constituting only a small number of bytes of data to transmit information determining the song to be created by the music generation system.

In yet other embodiments, the music generation system assists in the creation of lyrics. In one exemplary embodiment, the user selects a style or substyle of music, and preferably selects a category of lyric such as ballad/story, rap, gangsta rap, rhymes, emotional, etc. Based on the style/substyle of music and the lyric category, in response to entry of a word or phrase, the system attempts to create lyrics consistent with the user selections, such as via the use of cognates, rhymes, synonyms, etc. Words or phrases preferred are characterized by the lyric category (e.g., story, emotion, nonsensical, etc.), which enables words or phrases to be selected in a manner more consistent with the user selections. In accordance with such embodiments, lyrics and phrases could be generated by the music generation system, preferably in time with the music being generated, and the user could selectively accept (e.g., store) or reject (e.g., not-stored) the system generated lyrics.

Figure 43:
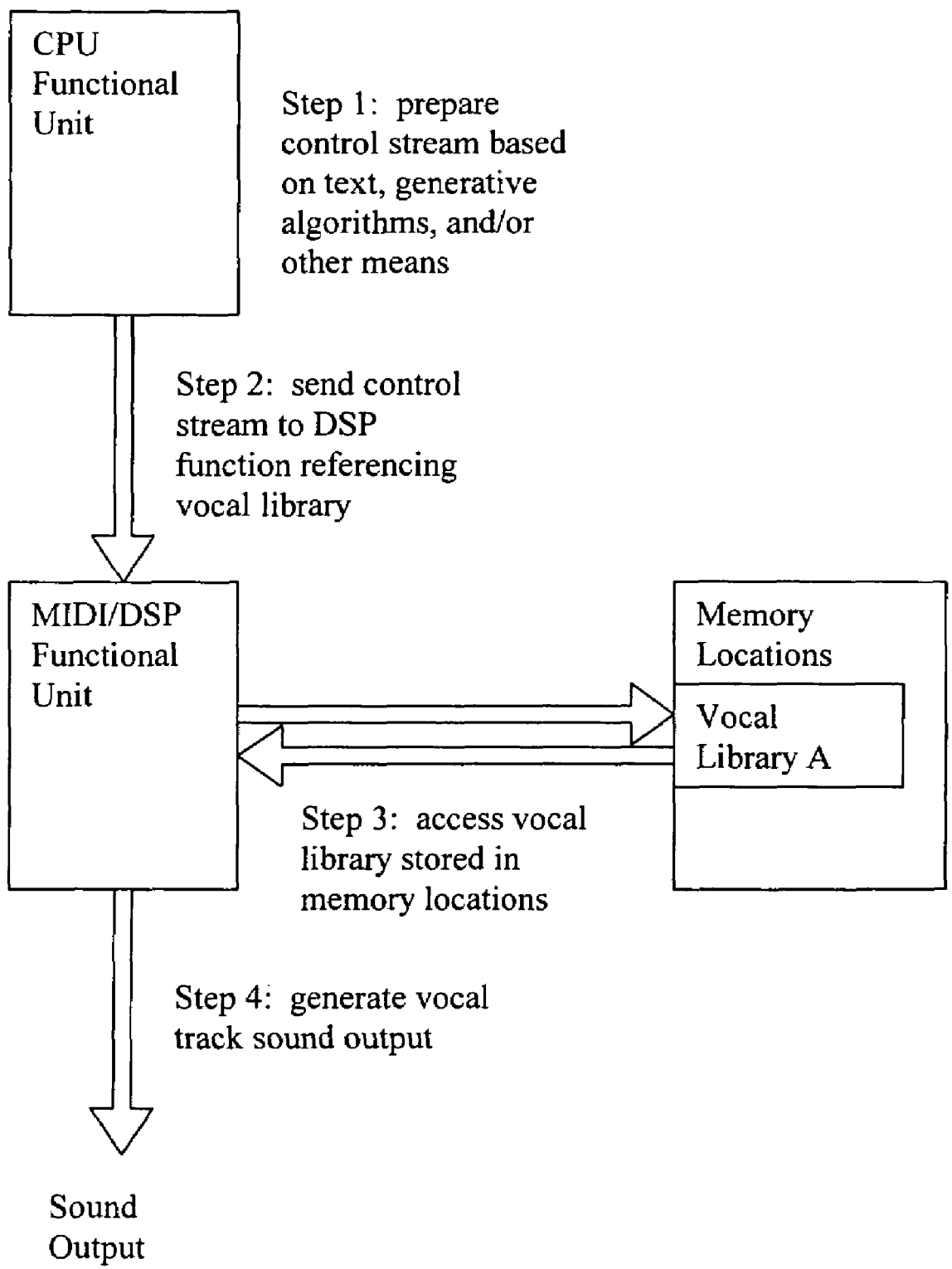
FIG. 43 illustrates an exemplary preferred process flow utilized in accordance with certain embodiments of the present invention involving automatic vocal features.
Figure 45:
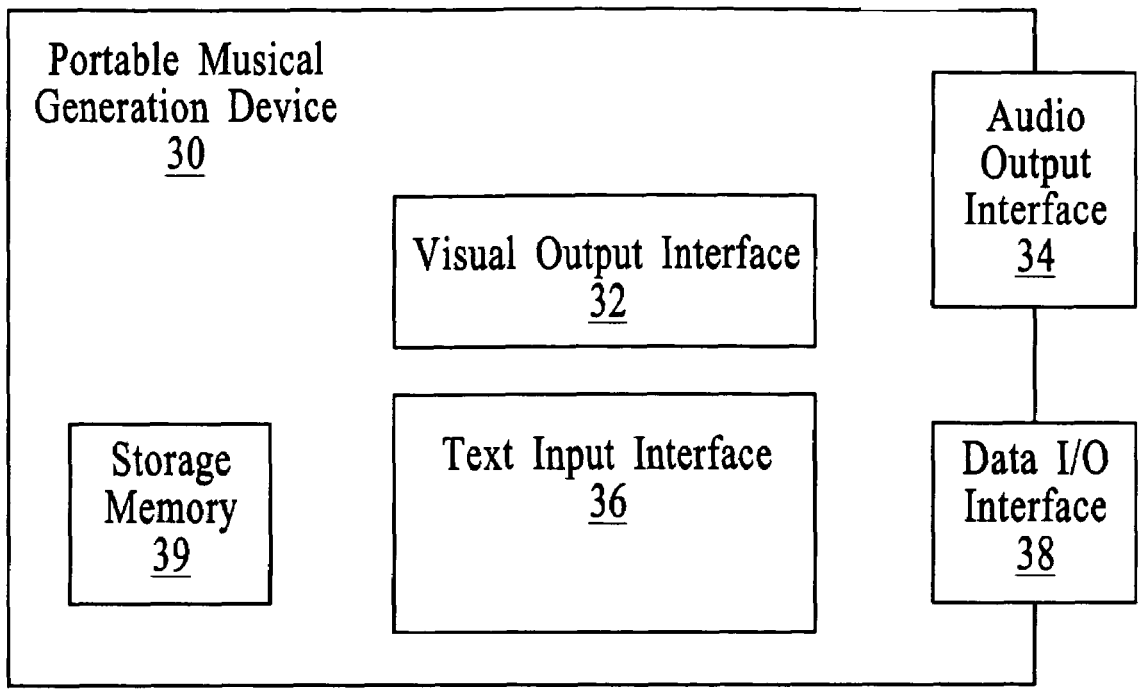
FIG. 45 illustrates an exemplary preferred portable music generation device, externally viewed, utilized in accordance with certain embodiments of the present invention involving automatic vocal features.

In addition to the use of pre-fabricated text, and user input text as discussed above, in certain embodiments it is preferable to generate the text itself. As an example, through the use of a commonly available algorithmic approach to generating strings of sensical text such as the A.L.I.C.E AI Foundation's "Artificial Intelligence Markup Language (AIML) version 1.0.1 working draft dated Oct. 25, 2001 (available to the public on the internet at: http://alice.sunlitsurf.com/), hereby incorporated by reference in its entirety. AIML is one example of a draft standard for creating a simple automatic text creation algorithm. It is useful in the present invention as a means to algorithmically support the auto-generation of text, and consequently, the auto-generation of phoneme streams as a vocal track. In the context of FIG. 43, the use of an algorithm to create the text itself is shown in step 1. Similarly, step 21 of FIG. 44 also preferably is where the use of an algorithmic text creation such as AIML can be used. Even a simple implementation of AIML, with a relatively limited number of phrases can be used with great effect. In certain cases, such as a portable music device as depicted in FIG. 45, where power/processing resources may be limited, it is particularly effective to limit the complexity of the AIML algorithm for efficiency.

In combination with many of the various embodiments and features discussed herein, in certain embodiments it is preferable to create a vocal library (e.g., vocal library A in FIG. 43) by recording a set of phonemes with a human voice. In this example, the end user may be given the option of recording themselves singing each of a set of phonemes. In this particular case, the resulting vocal library can be used during the autogeneration of the vocal track to achieve musical output with a sound that preferably very much resembles the end user's voice. Additionally, celebrity phenomes can preferably be recorded to generate a vocal library corresponding to the celebrity. In this manner, a vocal track can be generated that preferably closely resembles the voice of the celebrity. Following this example, there may be a vocal library corresponding to David Bowie (e.g., either his actual voice recorded for each phoneme, or that of an impersonator), Jimi Hendrix, etc. In this manner, the end user can have the 'voice' of David Bowie and/or Jimi Hendrix at their disposal. In certain embodiments it may be considered advantageous to allow multiple vocal libraries to be accessed and blended.

Figure 46:
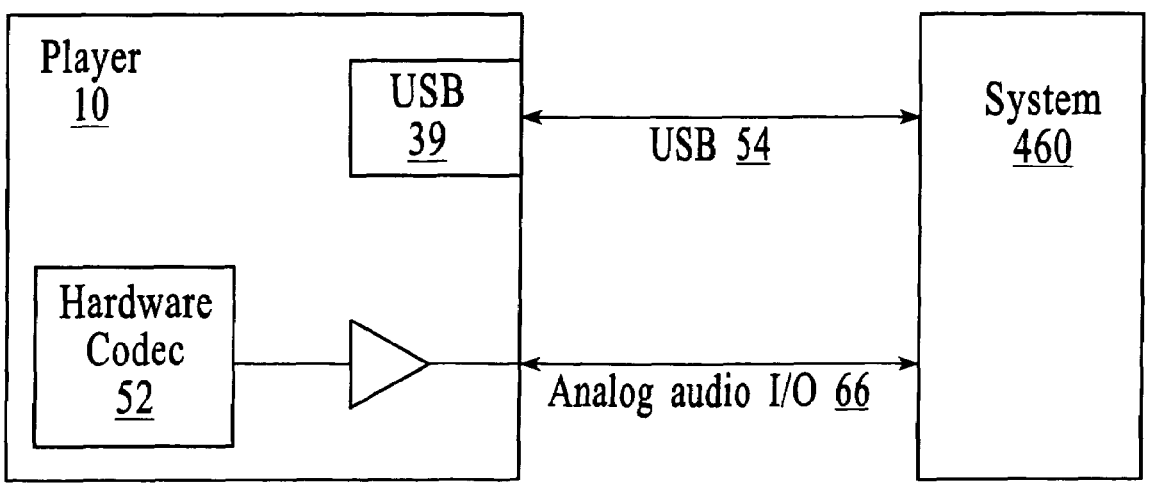
FIG. 46 illustrates exemplary preferred embodiments of interconnection arrangements between a player device and an external system.

Certain additional embodiments associated with the routing of audio information will now be discussed. FIG. 46 illustrates certain additional embodiments of the present invention. As shown, player 10 incorporates, as examples (see, e.g., FIG. 32), DSP 42, microprocessor 36, audio coder/decoder 52, audio input/output jack 66, microprocessor busses 37 and 38, bus interface 39 (alternatively Serial I/O 57), microprocessor RAM (i.e., RAM internal to, or otherwise under the control of, MP 36), and bus port connector 53. Further, in this set of examples, the signal(s) going between DSP 42 and hardware codec 52 (digital signal 62) preferably is a digital signal, and hardware codec 52 is sending/receiving digitized data to/from DSP 42. The signal(s) going between hardware codec 52 and analog audio I/O 66 are analog signals.

The present example is an audio device that can preferably generate audio information (e.g., music) using DSP 42. In certain embodiments the audio information may be encoded in a proprietary format (i.e., an efficient format that leverages the hardware details of the portable music device). In certain other embodiments (for example, when the audio device is capable of storing data and/or connecting to other systems), it may be desirable to generate a non-proprietary format of the audio information (for example, in addition to a proprietary format) such that the audio information can be more easily shared (e.g., with other different systems) and/or converted to a variety of other formats (e.g., CDROM, etc.). As an example, one preferable format for the audio information is the MP3 (MPEG Audio Layer 3). As will be obvious, other formats such as WAV, ASF, MPEG, etc., can also be used.

FIG. 46 illustrates an example of how such an audio device preferably may be connected to a system to facilitate the sharing of audio information in a streaming format. As shown, player 10 is connected to system 460 via connector 53 and analog audio I/O 66. As will be evident to one of ordinary skill in the art, either connection can be used alone or in combination with the other. In one embodiment, system 460 is a personal computer with an audio input plug (and associated audio processing circuitry and software) and a USB port (in certain embodiments USB 39 can be alternatively be a PCMCIA, cardbus, serial, parallel, IrDA, wireless LAN, etc., interface) In certain embodiments, system 460 preferably can be a tape recorder, a CD recorder, an MP3 player, etc. System 460 can be any audio capable device (e.g., with an audio I/O connection and associated capabilities), and optionally may also include a bus port for connecting to connector 53 of player 10.

Continuing the discussion above in connection with FIGS. 32 and 46, in certain embodiments, the digital signal 62 output from DSP 42 during an audio generation operation of player 10 preferably can be in the I2S format, and preferably can be routed via additional signal line(s) to USB I/F 39 (alternatively Serial I/O 57). In this example, USB I/F 39 (alternatively Serial I/O 57) preferably is a bus master that is preferably capable of directly accepting an input signal from DSP 42 (such as an I2S format signal) and conforming it into an output data stream on connector 53. In this example, an exemplary device that may advantageously be used as USB I/F 39 (alternatively Serial I/O 57) is the SL11R USB controller available from ScanLogic Corporation in Burlington, Mass.

In certain embodiments, digital signal 62 output from DSP 42 during an audio generation operation of player 10 can preferably be routed via additional signal line(s) to MP address bus 37 and MP data bus 38. In this example USB I/F 39 (alternatively Serial I/O 57) can advantageously be a slave USB device such as the SL811S USB Dual Speed Slave Controller also available from ScanLogic Corporation. In this example, while certain cost savings can be realized with the use of a simpler USB I/F 39 (as opposed to a master USB device such as the SL811R mentioned above), a trade-off is that MP 36 will need to be capable of controlling the flow of digital signal 62. This is primarily because in this example MP 36 is the master of MP address bus 37 and MP data bus 38, and will need to perform the transfer operations involving this bus. In certain cases where MP 36 already has sufficient capabilities to perform these added functions, this embodiment may be preferable. As mentioned above in the previous embodiment, in other cases where price/performance is at a premium the use of a more capable USB I/F 39 (alternatively Serial I/O 57) part can be used with little detrimental effect to the available resources on MP address bus 37 and MP data bus 38.

In the examples described above, the audio information output from DSP 42, in the form of digital data, is sent over the connector 53 for reception by system 460. System 460 must be capable of receiving such digital data via a corresponding bus port (e.g., a USB port, or alternatively, another port such as, for example, a port compatible with at least one of the following standards: PCMCIA, cardbus, serial, parallel, IrDA, wireless LAN (e.g., 802.11), etc.

Such an arrangement will preferably involve the use of a control mechanism (e.g., synchronization between the audio playing and capturing) to allow a more user-friendly experience for the user, while the user is viewing/participating in operations such as generation/composition of music on player 10, routing of digital audio information from digital signal 62 to connector 53, receiving and processing of audio information on system 460, and recording the audio information on system 460. One example of such a control mechanism is a software/firmware application running on system 460 that responds to user input and initiates the process with player 10 using via connector 53 using control signals that direct MP 36 to begin the audio generation process. Alternatively, the user input that initiates the procedure can be first received on player 10 as long as the control mechanism and/or system 460 are in a prepared state to participate in the procedure and receive the digital audio information.

In the forgoing discussion, control information preferably flows between player 10 and system 460 over connector 53 (e.g., in addition to digital audio information). Such control information may not be necessary in order to practice certain aspects of the present invention, but if used, will provide the end user with a more intuitive experience. For example, in certain embodiments such an arrangement which incorporates a controllable data link preferably will not require a connection on analog audio I/O 66 (e.g., an analog audio link using, for example, an eighth inch stereo phono plug), as digital audio data can be controllably be directed over connector 53 (e.g., in lieu of analog audio information passing over analog audio I/O 66).

In certain alternative embodiments, e.g., with more processing resources, digital signal 62 output from DSP 42 during an audio generation operation of player 10 can preferably be routed to a local memory location on the player 10 (e.g., a removable memory such as via SMC 40, or a microdrive, RAM, other Flash, etc.). In this fashion, a digital audio stream can be saved without the use of an external system such as system 460. Possible digital formats that can be used in such an operation preferably include MP3, WAV, and/or CD audio.

In other embodiments, routing audio information to system 460 (e.g., to enable sharing, etc.) can be achieved by routing analog signal 64 through analog audio I/O 66 to a corresponding analog audio input (e.g., eighth inch stereo phono input plug) on system 460 (e.g., by use of an existing sound card, etc.). In this case, the alternative signaling embodiments discussed herein preferably may not required, in that the digital audio information output from DSP 42 does not need to be routed to connector 53. Such an embodiment may be advantageous in certain applications, as it may not require either a more capable MP 36, or a mastering type of USB I/F 39, and accordingly may provide a more cost-effective solution. Consequently, the present embodiment can easily and efficiently be incorporated into player 10. In spite of such ease and efficiency, the present approach may be less desirable in certain respects than the previous embodiments, as the format of the audio information being passed to system 460 is analog, and thus more susceptible to signal loss and/or signal interference (e.g., electromagnetic). In any event, this arrangement can additionally preferably involve control information passing between system 460 and player 10 via connector 53. Such an arrangement can provide the end user with a more intuitive experience (in the various ways referred to herein) in that the user can initiate the process, and the synchronization of the process can be achieved transparently to the user via control information passing between the devices through connector 53.

At this time, we address certain novel embodiments of a file format that is particularly useful to use in the present embodiment. However, it should be understood by one of ordinary skill in the field of file formats that the portions of the present disclosure concerning file formats can be easily utilized in a variety of other contexts than a portable music device. Accordingly, while at times examples are referenced that may be associated with a music device, it should be clear that other very similar examples can be readily envisioned that involve other contexts, such as files used in general computing systems, music files such as compact disks, files used in other types of portable devices, etc.

The presently described "Slotted" file format involves a collection of independent units called "slots". This typically provides some flexibility in the organization of data within a file, because slots preferably can be added or removed without affecting the other slots, slots of a given type preferably can be enlarged or shrunk without affecting the other slots, and the slots that have an unknown type within a given firmware/operating system (OS) release, or within the current context, preferably are ignored, which typically helps solve backward compatibility issues.

Having the same generic file format for all proprietary files typically permits the use of the same code for verifying the checksum and the consistency of the file data, as well as the first level parsing (e.g., to access each individual slot).

Referring now to FIG. 47, a Slotted Structure (SLS) preferably is made of a Slotted Structure Header followed by N Slots, where each Slot preferably contains an item.

FIG. 48 illustrates an exemplary SLS Header structure. The "Header Length" field contains the length of the Header, and it preferably is used to allow future expansion of the Header without creating an incompatibility. The "Checksum" field contains the checksum of the Slotted File. The "SLS Shade" field preferably contains information that allows the exact File Type of the Slotted File to be determined, e.g., when the file is imported and/or accessed. The "SLS Type" field preferably indicates what kind of Slotted File this is, e.g., whether the file is a Song, a Playlist, a Sample Set, etc. The "SLS Version field" preferably is used to maintain compatibility, e.g., if the event that in the future the format of a particular kind of Slotted File changes.

The "Data Length" field preferably contains the number of bytes that the Data Length field of each slot contains. In certain embodiments, this field is used to optimize the size of the Slotted Files, because certain types of Slotted Files may use a very small Data field or no Data field at all (e.g., Lists), whereas other types of Slotted Files use a very big Data field (e.g., Samples).

The "Num Slots" field preferably holds the number of Slots (N) in the Slotted Structure. Decoding the file is easier if the number of slots is readily available. In certain embodiments, this redundant information is used to verify the consistency of the Slotted Structure.

The purpose of the checksum is to protect the Slotted Files against read/write errors. In many embodiments, it is expected that the best protection would be given by a CRC calculation, but this typically would be slow and complex, and likely is not really required anyway, because, since read/write errors are very rare, we do not need a protection against multiple errors. Accordingly, it is expected that a simple checksum calculation is sufficient for this purpose.

In certain embodiments, e.g., involving a 32-bit processor, the fastest and most efficient checksum computation typically is to add all the data of a file, dword by dword. Unfortunately dword by dword computation, as well as word by word computation, can create alignment problems. In such embodiments, the case where the number of bytes in a file may not be a multiple of dwords or words preferably can be fixed by adding null padding bytes at the end of the file for the checksum computation. However, in such embodiments, a more complex checksum situation is when the file is written in several chunks, unless the size of each chunk is typically constrained to be a multiple of dwords or words.

An alternative embodiment involves a compromise solution to this issue by forcing all the fields of Slotted Files to be word aligned. In these alternative embodiments, all the Slots preferably have an even size, e.g., an integral number of words. In this manner it becomes relatively easy to compute the checksum word by word. This may not be as fast as dword by dword computation, but it is nevertheless typically faster than byte by byte computation. In certain embodiments where the file is located on a relatively slow medium, such as a flash memory card, the impact of this issue is not enormous, because by far the biggest contribution to the checksum computation delay may be the time it takes to read the data.

We refer now to the exemplary Slot Format embodiment illustrated in FIG. 49. The "Slot Type" field preferably indicates the nature of the contents of the Slot, in the case that different kinds of slots are used in a given Slotted File. The "Name Length" field preferably holds the length of the "Name" field in bytes. In certain embodiments, if no "Name" field is present, Name Length preferably is 0. The "Name" field preferably can hold any character string up to 65535 characters (e.g., since in this example the "Name Length" field is 2 bytes). The "Data Length" field preferably holds the length of "Data" field in bytes (again, if no "Data" field is present, Data Length preferably is 0). The "Data" field preferably holds information whose meaning depends on the type of Slotted Structure, and/or on the type of slot within a given type of Slotted Structure.

In certain embodiments, a special type of slot may hold a reference to a file. In such a "File" slot, the Slot Type preferably is associated with the File Type of the file referenced by the slot, and the "Name" field preferably contains the name of the file. Thus a File slot may reference a file independently of the type given by the SLS Type.

Certain types of Slotted Files may contain slots that reference a file in a specific way. In this case, the Slot Type preferably has a fixed value, which is valid for this type of Slotted File only. The "Name" field of such a slot preferably contains the name of the file, and the File Type preferably is given by the context. Continuing this example, the "Data" field of File slots may advantageously be used to store the File Settings in the File Settings File.

In the present discussion, "Alien slots" (in a given type of Slotted File) are slots whose type is not recognized by the current firmware and/or operating system release. As an example, Alien slots may exist if we read a file on Release A that was originally written in Release B (where Release B is typically more recent than Release A). In certain cases, a Slotted File created or modified on a computer may add its own types of slots, which the portable system might regard as alien slots. Typically, it is advantageous for all the Slotted Files to be able to accept alien slots, no matter where they are placed in the Slotted Structure, without creating an incompatibility. This arrangement incurs two constraints in the Slotted File management: alien slots preferably are ignored (e.g., they must have no effect in the current firmware release), and alien slots preferably are preserved (e.g., not deleted) when the Slotted File is modified. This arrangement preferably permits complementary information to be added to any Slotted File in future firmware/OS releases without creating an incompatibility. Preferably, older releases will be able to read the Slotted Files created in the new release, and if an older release modifies such a Slotted File, the information relevant to the new release preferably will be preserved.

In certain Slotted Files, it is desirable for all the slots to have distinct Slot Type values. In these cases, the order in which the slots are placed in the Slotted Structure preferably should not matter because the firmware will scan/load the entire file to find the slots that it is looking for. In some other types of Slotted Files, the order in which the slots are placed should matter, as the order preferably can be used to determine how the file operates. As examples, such an arrangement is desirable in the case with lists, since the items (e.g., Songs or Samples) can be played/executed/accessed/etc., in the order in which they are located in the Slotted Structure.

Accordingly, in a given implementation, the slot ordering may matter for a class of slots (for instance the File slots), and may not matter for other classes of slots.

In certain embodiments, for a Slotted Structure of a given type (e.g., as defined by the SLS Type), certain slots (e.g., as defined by a Slot Type value or a range of Slot Type values) preferably contain a complete Slotted Structure (e.g., placed in the "Data" field of the slot). This arrangement is advantageous because it permits nested slot structures.

When reading any Slotted File, it may be advantageous to perform verification at one or more of the following three points: the type of Slotted Structure must be a known type in the current Release, the SLS Version must be supported in the current Release, and/or the Slotted File data must be consistent. The data consistency check preferably consists in verifying that the size of the file matches the sum of the sizes of the N slots, where N is the number of slots read in the SLS Header. So as an example, the data consistency check will detect an error in the number of slots specified in the SLS. In certain embodiments, these verifications are performed after the file checksum. This verification preferably is not redundant with file checksum verification, because the latter typically will detect errors in writing or reading the file, whereas the verification of Slotted Structure consistency typically will detect things like a change in the format of the Slotted Structure (e.g., an older format which is not supported in the current firmware/OS release). In certain cases, checksum verification preferably may be skipped, e.g., if it takes too long for real-time operation. This might be desirable in the case of relatively large files such as samples, which can be accessed for real-time playback.

In certain embodiments a Song file preferably may have one or more of the following four slots: a Song Data Slot, an Instrument Slot (e.g., holding the instrument indexes that may be stored separately), a Sample Set Slot (e.g., holding any associated Sample file), and a Settings Slot (e.g., holding and the Song Settings (Volume, Speed and Pitch). In the case where Samples are stored in a Slotted File, any applicable Sample Settings (e.g., Sample Descriptor, Normalization factor, Effect index and Effect type) preferably can be stored in the same file as the Sample data. This feature typically affords great flexibility for future evolutions.

The "Sample data" preferably designates the data (e.g., PCM data) involved in playing the Sample. In certain embodiments, all of the Sample data may be stored in the "Data" field of one slot. In other implementations, Sample files preferably involve additional complementary information such as, for example, the definition of a custom effect that may not fit in the Sample Settings slot. This complementary information preferably is stored in a different slot, e.g., with an associated Slot Type. Another variation (not necessarily mutually exclusive with the previous one) involves splitting the Sample into smaller chunks that preferably can be played individually. As one example, such an implementation permits playing the Sample with a time interval between the chunks (e.g., rather than continuously).

In certain embodiments, Sample files preferably have two slots: a Sample Data slot, which preferably may hold the Sample data (e.g., PCM data), and a Sample Settings slot, which preferably holds the Sample Settings (e.g., Sample Descriptor, Normalization factor, Effect, etc.). It is further desirable to allow alien slots to be accepted in a sample file (e.g., ignored if not recognized by the firmware/OS). As an example, this could be used to contain comments or other data associated with the sample file data.

Ideally, the order in which the slots are placed in the Sample file should not matter. However, Sample files have special constraints because they are big, as explained in "Sample File evolution" above. If we place the Sample Settings slot after the Sample Data slot, then in certain situations (such as, for example, a heavily fragmented cluster allocation) the time to load the sample settings information may be undesirably long. For example, in the case of fragmentation, typically it is not easy to calculate the address of the end of the sample file where the settings may be stored (i.e. the "Data" field of the Sample Settings slot). To address this issue, in certain embodiments the area to be modified is always located in the primary VSB (Variable Size Block in dynamic memory allocation) of the Sample file. This may be achieved by making the Sample Settings slot the first slot in the Sample file, based on the fact that the length of this slot is small enough in comparison with the size of a cluster.

In certain embodiments that involve a List File, (e.g., in cases where each slot may identify an item or action, and the order of the slots affects the order of play and/or execution), it is advantageous for the last slot to be a "Terminating Instruction slot", which tells what happens after executing the last item. As examples, such a slot might indicate "stop playing" or "loop to beginning" to keep on playing until there is a manual intervention. In certain of these embodiments, the order in which the File slots are placed in the List File preferably determines the order in which items of the List (e.g. Samples or Songs) are executed and/or played (e.g., even if a terminating instruction slot is not incorporated). On the other hand, if used, the Terminating Instruction slot typically can be placed anywhere in the S List File.

Following the above examples, a List File may hold references to one or more files that are no longer available. Each reference (e.g., held by a File slot) to a File that does not longer exist can be considered a "lost item". When a List File is modified, lost item slots, unlike alien slots, preferably are deleted.

In certain embodiments that involve a list of items such as radio station presets, the presets of the radio stations preferably are stored in a dedicated List File. As an example, each slot of such a Radio List File preferably holds the name and frequency of a preset. In this example it preferably is possible to add more fields, e.g., within the "Data" field, without creating an incompatibility.

In certain embodiments that involve graphic files, it is desirable for graphics to be stored in a Graphics file. The Slotted File format presently discussed preferably permits several images/graphics to be stored, e.g., each with different attributes. This arrangement permits various still images (e.g., for multiple GUI display screens on a portable device) to be located in one file. In certain cases this arrangement can also be used to store animations, e.g., data associated with successive frames of the animation preferably can be located in individual slots, and the ordering of the slots preferably can be used to determine the ordering of successive frames of the animation.

Musical generation systems that generate music according to musical rules are typically fully aware of a specific musical mode, as well as a set time signature. The musical rules/algorithms that generate audio information typically are organized to operate around particular musical modes and time signatures so that the resulting output is musically compelling. As such, at any point in time during the generation or playback of a generatively created musical piece, there are defined variables that track the mode (e.g., a set of pitches that are compatible at any point in time) as well as the time signature (e.g., the beat and/or groove of the music, including the appropriate locations for accents, drum fills, etc.).

In addition, a final musical output is often favorably augmented with the use of selected samples that are played back in response to user-input or as part of the musical rules. As an example, a short sample of a female voice singing a simple melody may be favorably added to a particular hip-hop style song at certain key moments. Such an example illustrates how pre-recorded sounds can be utilized by a musical generator/playback system or algorithm to enhance the musical output.

The use of a sample format that is non-proprietary is also very desirable, as it enables an end user to easily share and/or generate samples of other sounds, possibly using other means, and include them in a generatively created musical piece. Such an arrangement allows a high degree of creativity and musical involvement on the part of the end user; even in cases where the end user has no musical background or experience. In fact, it is one of the aims of the present disclosure to effectively provide such a novice end user with a compelling experience in musical creativity.

Additionally, certain preferable embodiments of a musical system enable the use of signal processing on the samples used. This approach allows, for example, the user to easily adjust the pitch or speed of a sample with the use of certain DSP functionality in a preferred type of system. As one example, the Dream DSP chip available from Atmel Corporation, data sheets and application/user manuals for which are hereby incorporated by reference, allows samples to be adjusted along various lines, including pitch, speed, etc., as well as the application of various preferred sound effects, such as doppler, warbler, echo, etc. These aspects and features are described in greater detail herein.

One problematic aspect in the generative creation of audio content is that the playback of the sample during a section of music can sometimes sound out of sync with the music in terms of pitch or rhythm. This generally is a result of the lack of a default synchronization between the sample and the music at a particular point in time. One way around this is to use samples that do not have a clear pitch or melody, e.g., a talking voice, or a sound effect. However, as the use of melodic samples, especially at higher registers, is desirable in many styles of music, it is desirable in certain cases to have the capability for associating pitch and/or periodicity information (embedded or otherwise) into a sample. Such information can then be interpreted by the musical rules and/or algorithm of the music device to enable a synchronization of the sample to the particular pitch, melody, and/or periodic characteristics of the musical piece. A particular example of such an arrangement in accordance with certain preferred embodiments will now be described.

Figure 50:
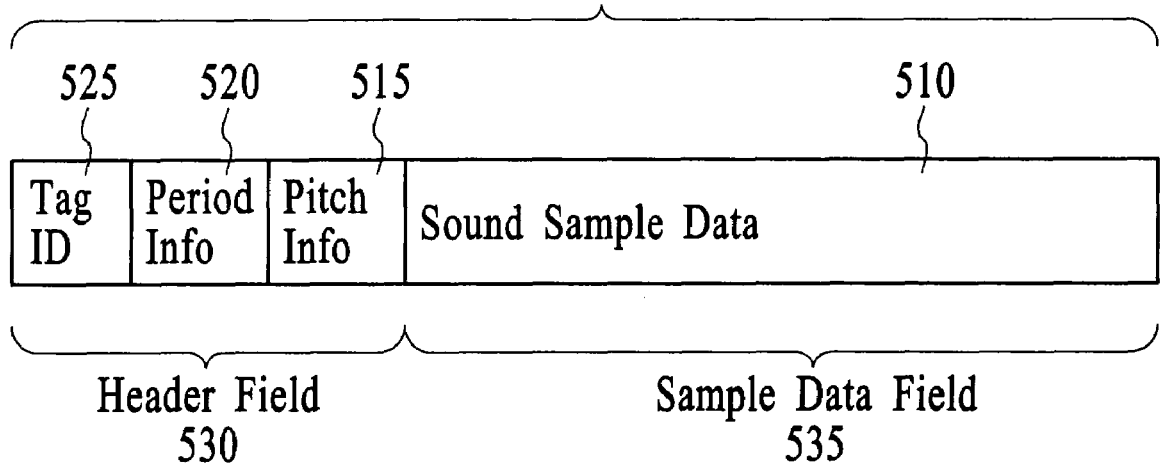
FIG. 50 illustrates exemplary preferred embodiments of a sound sample data file incorporating an optional header portion, utilized in accordance with certain embodiments of the present invention.

FIG. 50 depicts an example of sample data structure 540 utilized in accordance with one preferred embodiment of the present invention. As illustrated, sample data structure 540 includes sample data field 535 and optional header field 530. In the illustration of FIG. 50, sample data field 535 contains sound sample data 510, and header field 530 contains tag ID 525, period information 520 and pitch information 515.

Preferably, tag ID 525 is used to identify optional header 530 to a compatible system, and may be used to provide backwards compatibility in a non-compatible system. The backward compatibility is achieved, for example, by providing a pointer to the start of sound sample data 510, in such a way so that a legacy system reading the sample will read sound sample data 510 and disregard period info 520 or pitch info 515 (as examples). In certain embodiments, this preferably may be achieved via the slotted file format described herein. In certain additional embodiments, this preferably is achieved in a manner similar to the way in which mixed mode CDROMs are encoded to work on both native-Apple and native-IBM-compatible personal computer CDROM drives, in effect by providing a pointer at the beginning of the volume that transparently causes each system to skip to the correct portion of the volume. Such a technique fools the legacy system into believing that the volume (or file) is actually a legacy-formatted volume. So, while benefits of the present invention may be utilized when the sample data file is provided with period info 520 and/or pitch info 515 in header field 530 in a system that can benefit from the additional data in header field 530, the same sample data file can also be used provide sample data in systems that cannot benefit from the additional data in the header field. Preferably, in the latter case the file will appear to the system as providing only sound sample data 510.

Pitch information 515 preferably contains parameter data indicating a pitch associated with the sample, preferably given a native periodic rate. This parameter data could indicate for example, that if the sample is played at a normal, unadjusted rate, a pitch value is associated with it corresponding to C#. This preferably would indicate to the music rules and/or algorithms involved in the music generation process that the associated sound sample data should be treated as a C# note. In other words, if a C# note is deemed compatible, the sound sample preferably may be played without any pitch adjustment. One benefit to this arrangement is that in the event that C# is not deemed compatible, the sound sample data preferably can be pitch-transposed up or down to an appropriate pitch value. Since the algorithm/music rules will know the pitch info for a native playback speed, they can calculate an adjustment to pitch, and preferably use DSP resources and functionality (such as discussed herein with respect to the Dream chip) to adjust the perceived pitch of the sample during playback. Thus, sample pitch preferably will generally conform to an appropriate pitch, given the current mode (as one example).

Period information 520 preferably contains period-related parameter data. This data preferably identifies a timing characteristic of associated sound sample data. For example, if to the sound sample has a rhythmic emphasis point 75 milliseconds from the start, this parameter preferably might indicate this. In this example, the period portion of the header will inform the music rules/algorithm generating a musical piece that this particular sound sample has a rhythmic emphasis point 75 milliseconds into it, when played at native speed. Accordingly, the music rule/algorithm preferably will know the rhythmic emphasis point of the sample when it is loaded into memory, and when the end user plays the sample during a song, the music rules/algorithm preferably can time-adjust the sample such that the rhythmic emphasis point occurs at a suitable point in the music (e.g., a downbeat). This time-adjustment preferably can be made using, as an example, DSP resources and functionality as discussed herein.

As can be appreciated, such embodiments of the present invention can provide the music playing system with a way to improve the musical experience of the end user. Such an arrangement can preferably be employed in a hardware system, e.g., a handheld portable device, or a software system, e.g., a software musical system running on a personal computer. Samples preferably can thus be played during a song by an end user, with relatively little ill effects due to pitch or time incompatibilities.

Figure 51:
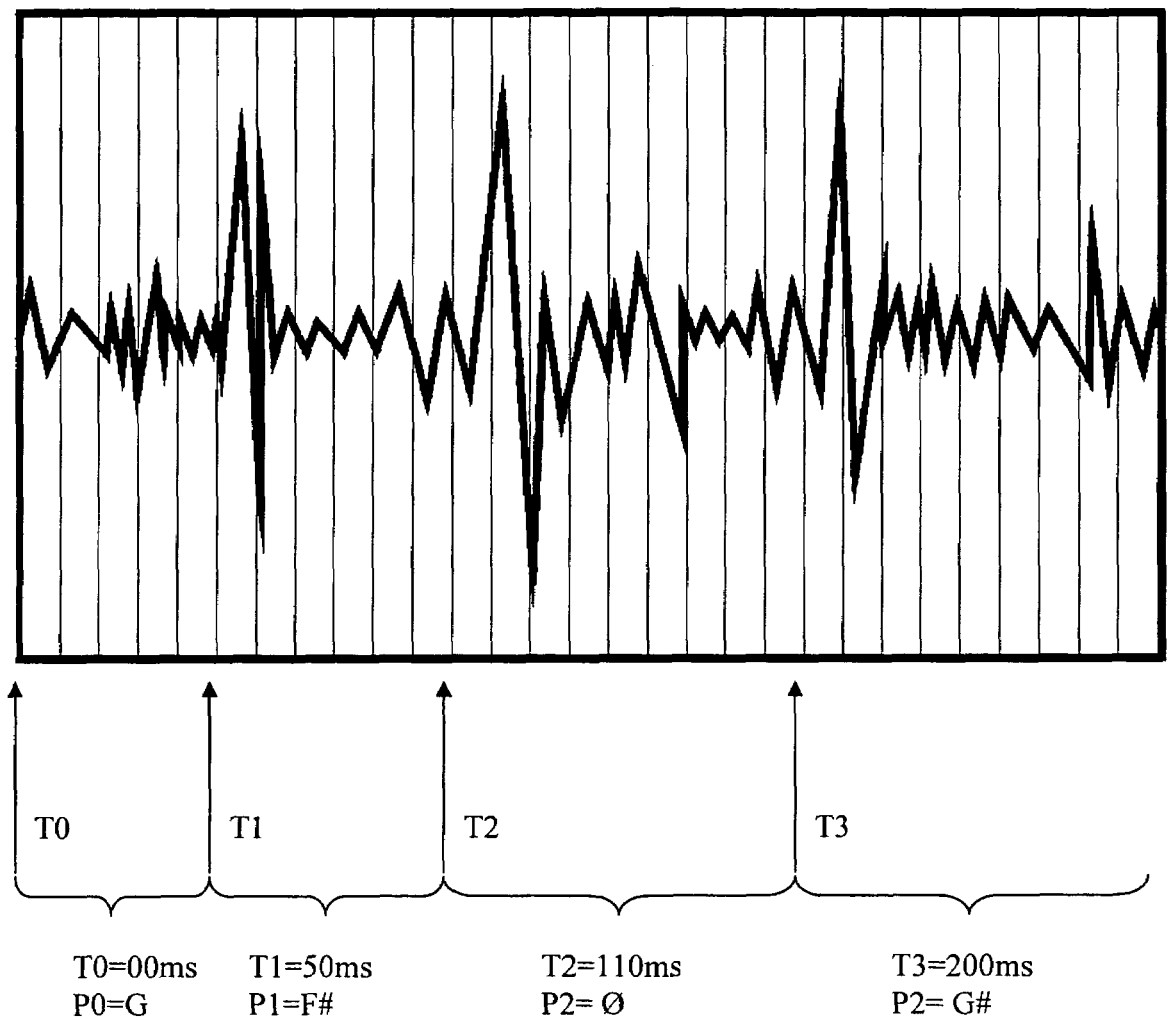
FIG. 51 illustrates an exemplary sound sample amplitude graph with preferred superimposed timing grid, utilized in accordance with certain embodiments of the present invention.

FIG. 51 illustrates a simplified example of an amplitude waveform associated with a sample sound file. In the illustrated example, there are three general points of increased rhythmic activity (e.g., a sharp temporary increase in amplitude) labeled T1, T2 and T3. A sample data file preferably can be processed via software to identify such areas of increased amplitude. Assume for example that the waveform depicted in FIG. 51 is 290 ms in duration. For purposes of example, if an analysis tool has a grid resolution of 10 ms (indicated in the figure with the vertical grid lines), then the analysis tool will scan the file to look for the rhythmic events (e.g., brief moments of relatively high amplitude). In one preferred example, the tool will identify the grid point immediately preceding a rhythmic event and preferably capture that information for inclusion into the data in optional header field 530. Further discussion of the analysis process can be found below, with reference to FIG. 54.

As illustrated in FIG. 51, the example sample has approximately 3 significant rhythmic events that are spaced out in a non-equidistant distribution. Of course, this example distribution is based on the somewhat arbitrary example of a grid resolution of 10 ms, and a sample duration of 290 ms. Given this grid resolution, this example illustrates an example where 4 rhythmic subparts (e.g., the parts beginning at T0, T1, T2, and T3) are not equal in duration. In this particular example, the first rhythmic subpart has a time stamp T0 of 0 ms and a pitch value P0 of G. The second rhythmic subpart has a timestamp T1 of 50 ms and a pitch value P1 of F#. The third rhythmic subpart has a timestamp T2 of 110 ms and an undefined pitch value. The fourth rhythmic subpart T3 has a timestamp of 200 ms and a pitch value of G#.

In this example, we assume for the sake of clarity that the musical mode is Lydian Descending at the point in a song wherein the sample is played.

Accordingly, the first rhythmic subpart identified as T0:P0 has a pitch value that is allowable in the Lydian Descending Mode. Therefore, preferably this section of the sample is not pitch-shifted. Similarly, as the rhythmic event of the start of the sample is preferably initiated by the end user, the time T0 is not adjusted.

Continuing this example, the second subpart identified as T1:P1 has a pitch value of F#, which is allowable in the Lydian Descending mode, and is therefore preferably not pitch-shifted. The rhythmic event T1 is associated with 50 ms, and accordingly this can be time-shifted to more closely match the tempo of the music (e.g., it can be slightly slowed down or speeded up so as to coincide with the rhythmic grid/resolution of the music being created). If the section of the song has a tempo wherein, as an example, an eighth note has a duration of 60 ms, then the start of T1:P1 preferably could be adjusted to occur in time with the beginning of an eighth note, and/or the duration of T1:P1 preferably could be slightly lengthened so as to occupy 60 ms, in keeping with the time signature of the music. Of course, these examples constitute various options that may not necessarily be used in order to practice the present invention.

The third subpart T2:P2 would begin at 110 ms, if the preceding subparts had been played at normal speed. As our example has the previous subpart being lengthened by 10 ms, preferably to be in synch with our tempo, the T2:P2 subpart begins at 120 ms. Accordingly, in our example of a 60 ms eighth note, the beginning of subpart T2:P2 preferably will occur in synch with the tempo, and as it has a duration of 90 ms, it preferably could be time-stretched 50% for a duration of 120 ms (in keeping with our 69 ms eighth note), be time-reduced to 60 ms, or remain at 90 ms (e.g., depending on the particular magic rules/algorithms in place for the style of music being played). As this subpart does not have an associated pitch value, it preferably is not pitch-adjusted.

The last subpart T3:P3 in FIG. 2 has an associated pitch value of G#. Assuming our current mode is Lydian Descending, wherein preferably a G# note encountered during the music generation flow would be replaced with a G, this section of the sample preferably might be pitch-adjusted so as to lower the associated pitch to a G. The starting point and duration could be addressed as described herein in keeping with the style of music and/or the time signature, groove, etc.

Figure 52:
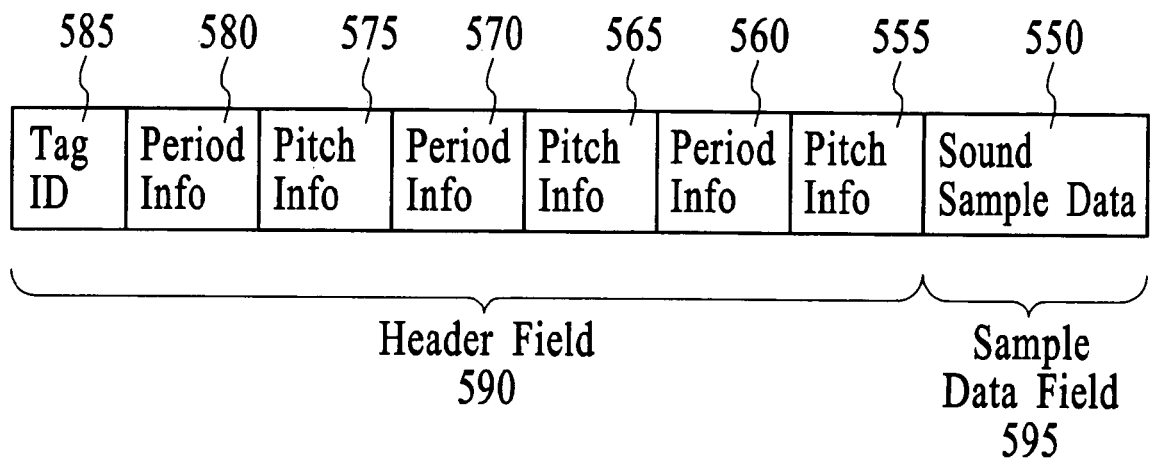
FIG. 52 illustrates additional exemplary preferred embodiments of a sound sample data file incorporating an optional header portion, utilized in accordance with certain embodiments of the present invention.

The information identifying the Pitch and Periodicity associated with a sample can be contiguously arranged, as illustrated in FIG. 50. This information can also be arranged in alternating subfields of header field 590, as illustrated in FIG. 52. In the case of FIG. 52, where three sets of period/pitch information are illustrated, the Tag ID 585 preferably may contain information setting forth the number of header subfields/parameters to follow before the sound sample data 550 in sample data field 595. In the example of FIG. 52, this arrangement preferably indicates to the system during processing that sound sample data 550 has three associated period/pitch subparts, identified as Period Info 580 and Pitch Info 575, Period Info 570 and Pitch Info 565, and Period Info 560 and Pitch Info 555.

Figure 53:
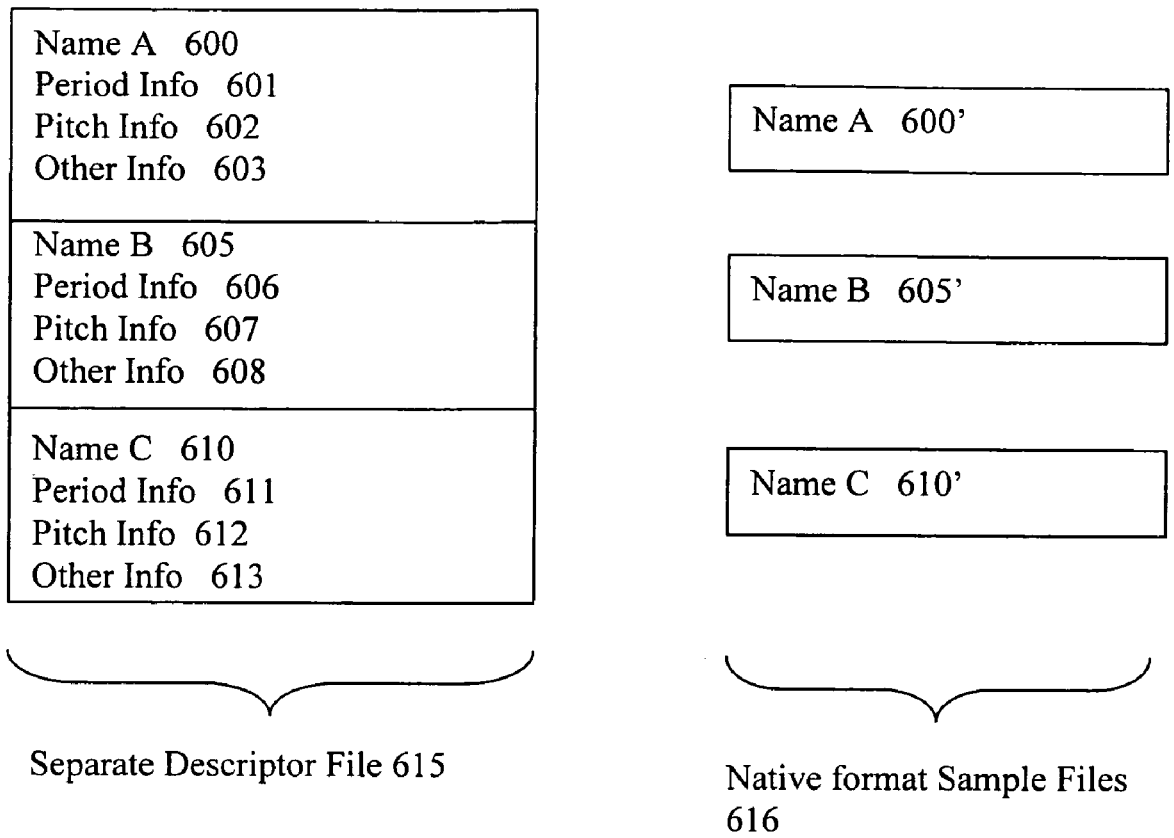
FIG. 53 illustrates exemplary preferred embodiments of a separate descriptor file associated with one or more native-format sound sample files, utilized in accordance with certain embodiments of the present invention.

In certain preferred embodiments of the present invention, note that the Pitch and Periodicity info does not have to be in a header field portion of a sample file, but alternatively could be in separate descriptor file (e.g., a general sample list file for multiple samples or a single second file for each sample with the same name, different suffix, etc.). One example of this is shown in FIG. 53, wherein Separate Descriptor File 615 preferably contains information associated with Native Format Sample Files 616 (e.g., name, pitch, period and other information). One advantage of this approach is that the sample files remain in a native format (e.g., MP3, WAV, etc.), so they do not have additional pitch and/or period information added into a header portion as discussed herein. Such an approach improves cross-platform compatibility while still enabling certain of the benefits of the present invention to be realized.

Figure 54:
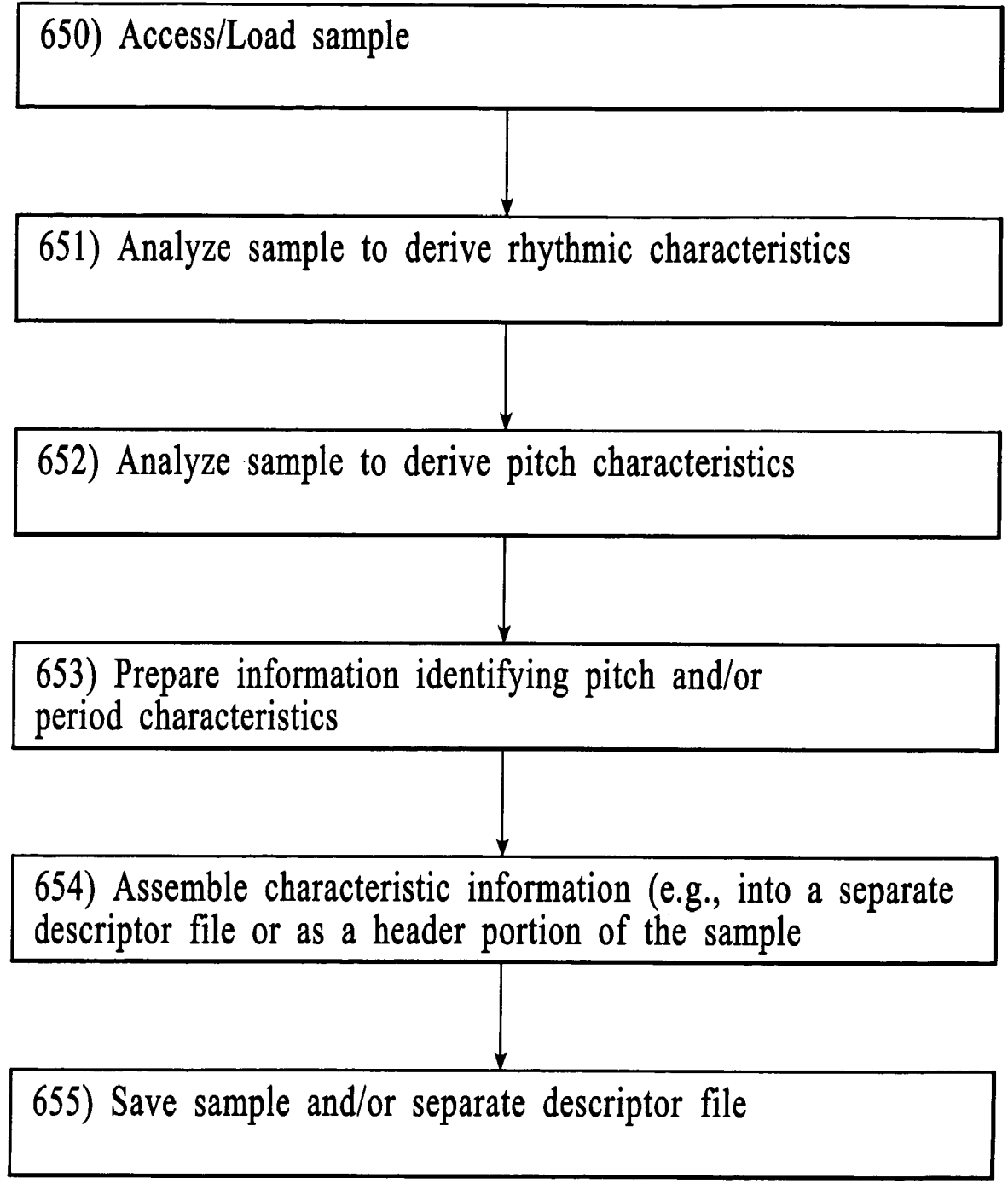
FIG. 54 illustrates an exemplary preferred process flow for a sound sample analysis method, utilized in accordance with certain embodiments of the present invention.

FIG. 54 illustrates an exemplary process flow for a method to create the descriptor information associated with a sample file. Such a process may occur in real time during music generation, assuming that the processing resources of the system are sufficient. Alternatively, the process illustrated in FIG. 54 may preferably occur in advance for systems (e.g., portable) that do not have sufficient processing capabilities for real time sample characteristic processing. In addition, the steps illustrated in FIG. 54 preferably may be performed on a personal computing system where computing resources are relatively plentiful. In this variation, the sample descriptors preferably can be transferred to a portable system that actually plays the music. Consequently, although the analysis features described in FIG. 54 may be suitably performed by a relatively powerful computing system, the benefits of such an analysis preferably can be realized on a portable system such as in the context of the previously referenced and incorporated patent applications.

FIG. 54 begins with the access and/or load of a sample (step 650). Depending on where the sample is located in memory, the computing system may simply access it (e.g., from RAM) or load it (e.g., from Flash or Microdrive or smart media, etc., into RAM). Step 651 involves the analysis of the sample to derive rhythmic characteristics. Step 651 is preferably performed before the pitch analysis of step 652, in that it may be useful to associate the subsequent pitch characteristics in terms of rhythmic timing information. In alternative embodiments, however, this order may be modified; as will be appreciated by those of skill in the art, the steps do not have to be performed in this particular order to realize certain of the benefits of the present invention. Step 653 preferably involves the preparation (e.g., consolidation) of derived pitch and/or rhythmic characteristics into a data format. Step 654 preferably involves the assembly of such a characteristic data format into a file (e.g., into a separate descriptor file or as a header portion of the sample data file, such as previously described).

Figure 55:
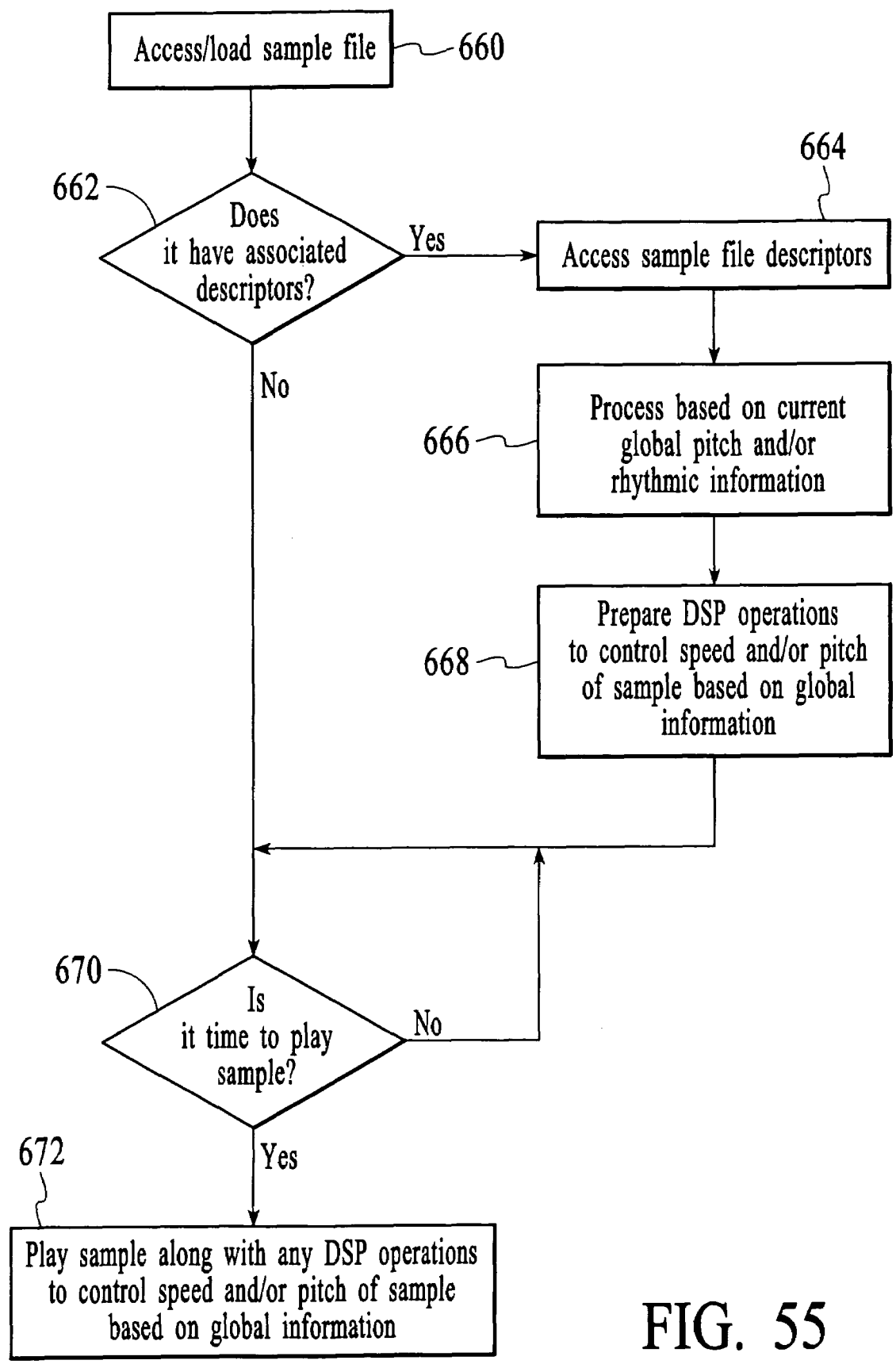
FIG. 55 illustrates an exemplary preferred process flow for a sound sample playback method, utilized in accordance with certain embodiments of the present invention.

FIG. 55 illustrates an exemplary process flow for the playback of a sample in the accordance with preferred embodiments of the present discussion. As an example, this playback process flow can be used by a portable and/or software-based music device that is playing a given sample during the creation/playback of a musical composition or song. As discussed in great detail elsewhere in this disclosure, in the present example, while the music device may be a portable hardware system or a software plug-in on a personal computer, it preferably has music algorithms that track the current musical mode and/or tempo. Examples of how this information is tracked and used during music play is described in detail elsewhere herein; for the present discussion it is enough to point out that this music mode/tempo information is preferably available during sample playback.

Upon accessing and/or loading the sample file (step 660), FIG. 55 illustrates determining whether there are associated descriptors for the sample file (step 662). If not, then the sample can be played as is (steps 670 and 672) during the music creation/playback. If, however, sample file descriptor information is found to be associated with a given sample file (e.g., determination of 'yes' at step 662), then it preferably is accessed (step 664) and processed relative (e.g., compared) to the current global pitch and/or rhythmic information of the music being played (step 666) (e.g., refer to the discussion of FIG. 51 herein). After comparison or processing relative to the current global pitch and/or rhythmic information, a set of DSP-function operations preferably is prepared (step 668) to control the speed and/or pitch of the sample to more closely or desirably conform it to the global pitch and/or rhythmic information. Preferably, this set of operations is subsequently used when the sample is actually played (steps 670 and 672), with the end result preferably being that the pitch and/or rhythm of a sample is generally conformal to the music being played, preferably with a minimum of user action involved therein. As will be appreciated, at step 670 a determination is made of the appropriate time to play the sample, and at step 672 the sample is actually played, which may be with DSP operations to control speed and/or pitch based on global information, such as has been previously described.

Accordingly, as discussed in detail herein, a sample for which a series of pitches and rhythmic events have been detected, such events can be time-adjusted and/or pitch-adjusted so as to more closely match the music being generated. This is done using the digital signal processing resources or functions of the system, e.g., through the execution of DSP instructions to carry out DSP-type operations. As will be appreciated, the present invention may be applied in a simpler way, such as by assigning only a single pitch value and/or rhythmic event to a sample, as opposed to a series.

Previously herein, e.g., particularly in connection with FIGS. 39-42 and related description, a discussion is provided of the efficient synchronization of MIDI events with audio samples and effects, and hardware for carrying out the same, including the use of MIDI NRPN messages to achieve such synchronization. Preferred embodiments of the present invention are used in combination with such synchronization of MIDI events and audio samples and effects.

Preferred embodiments of the present invention provide a portable automatic music generation device, which may be implemented such as disclosed herein. In accordance with the present invention, however, it should be noted that a wireless capability, such as that used in a cell phone, a personal data assistant, etc., may easily be incorporated into the example architectures of the previously described portable automatic music generation device. As one example, a USB communication interface of the previous disclosure preferably could be substituted with a communication interface connecting to the data reception and/or broadcast circuitry of a preferably RF-amplifier-based cellular communication module. Other data interface arrangements can be effectuated while still achieving the benefits of the present invention. Similarly, the portable device may be part of an automobile-based system (e.g., radio or communications system), or even part of a home-based music system (e.g., for purposes of compatibility with bandwidth-poor portable technology). All such implementation examples are within the scope of the present invention.

Figure 56:
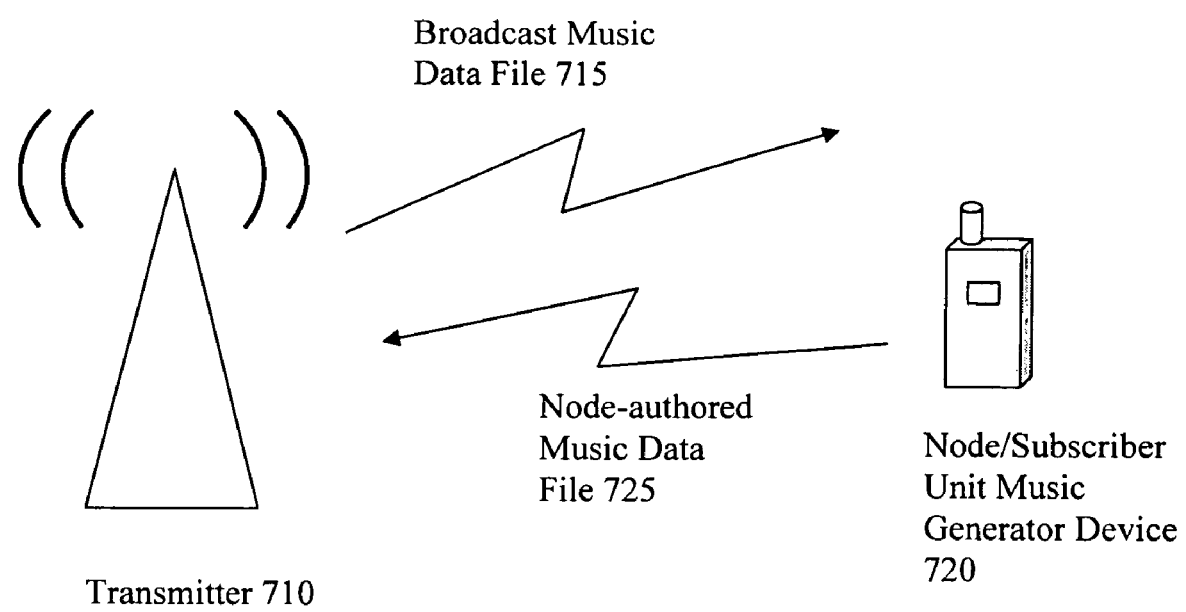
FIG. 56 illustrates exemplary preferred broadcast and transmission of data files in accordance with certain embodiments of the present invention.

FIG. 56 illustrates a broadcast arrangement in accordance with preferred embodiments, wherein Transmitter 710 is broadcasting Broadcast Music Data File 715, preferably as part of a larger broadcast program (which preferably consists of multiple styles/categories of music or other content, etc.). As shown in FIG. 56, Node Music Generator Device 720 preferably receives Broadcast Music Data File 715 and begins to generate music therefrom. It should be noted that Node Music Generator Device 720, in accordance with such embodiments, may receive Music Data File 715 and begin automatically composing music based on the received Music Data File 715, or the music generation may begin after receipt of user input, such as a key, button or switch depression or activation, and alternatively the music generation may being after modification of the user of received Music Data File 715.

FIG. 56 also illustrates an alternative embodiment in which a Node-authored Music Data File 725 is uploaded from Node Music Generator Device 720 to Transmitter 710. Node-authored Music Data File 725, for example, could be a music data file that was automatically composed by Node Music Generator Device 720, which may have been modified by the user of such Node, or may be a music data file that was previously received by such Node, which may have been thereafter modified by the user of such Node, etc. It should be understood that, while the example of FIG. 56 describes the Node-authored file being sent to the Transmitter 710, in accordance with alternative embodiments Music Data File 725 is sent to another similar Node, which preferably also is associated with Transmitter 710, or in yet other alternative embodiments is sent to another Node directly. For example, the Node-authored Music Data File 725 can be sent to a receiver associated with a broadcasting service that is directing the broadcasting of Broadcast Music Data File 715. This "upload" function preferably enables a node subscriber unit to author music and forward it up to the broadcast system, where it may be incorporated into the broadcast. As can be appreciated, this approach preferably enables user participation in the actual music being broadcast, and can allow sharing of music between nodes. This approach also preferably enables easy sharing of music content between nodes directly (e.g., not involving general broadcast from a Transmitter 710).

Figure 57:
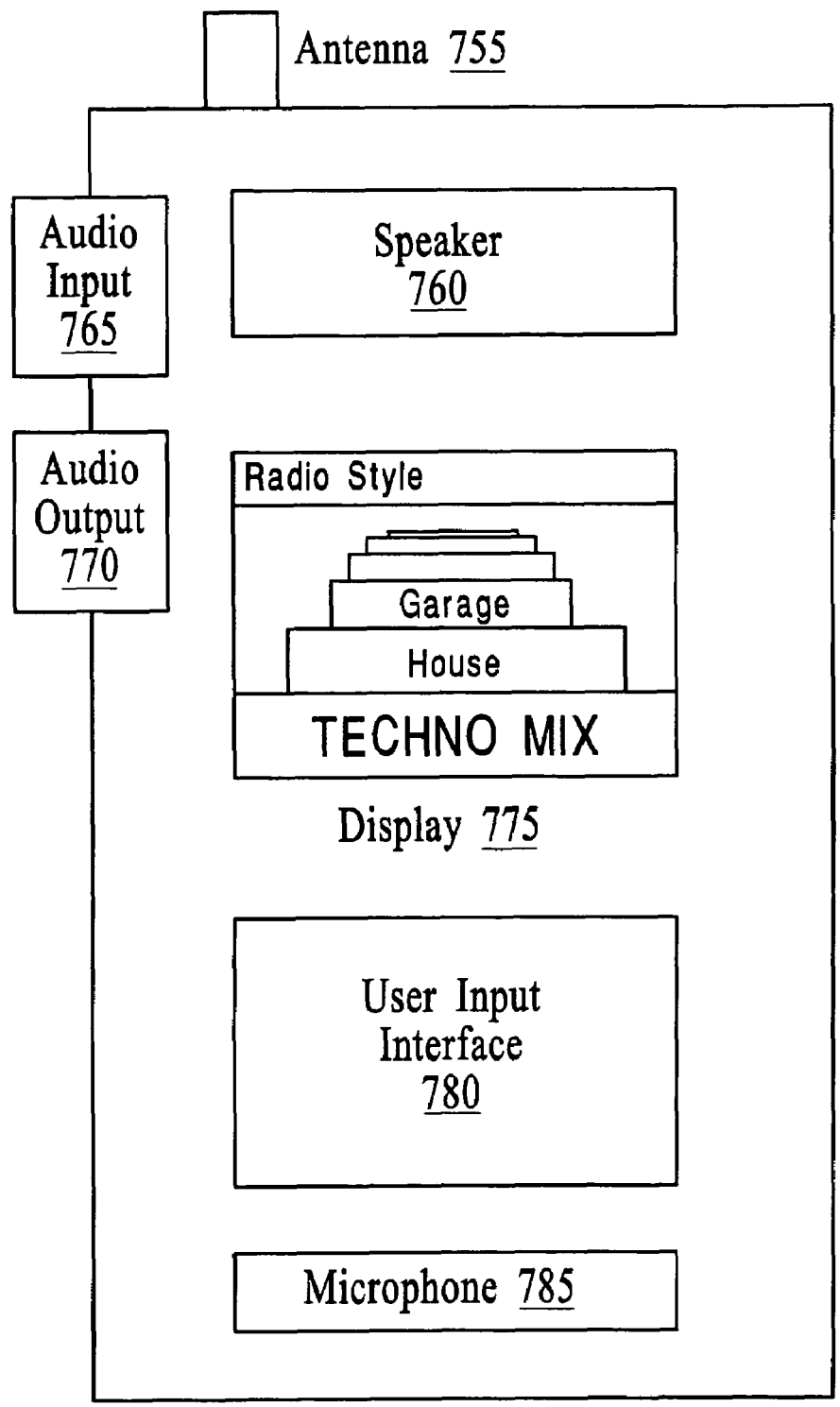
FIG. 57 illustrates an exemplary preferred node/subscriber unit, externally viewed, in accordance with certain embodiments of the present invention.

FIG. 57 illustrates selection of a Radio Style within a Node/Subscriber Unit Radio. As illustrated, the Node Subscriber Unit preferably includes an Antenna 755 for receiving/transmitting information. Preferably, such a Node Subscriber Unit also will incorporate one or more of the following: Speaker 760, Audio Input 765, Audio Output 770, Display 775, User Interface 780, and Microphone 785. As illustrated, Display 775 preferably can be used to provide a user with a radio style selection view. Such a view preferably allows the user to easily select between a plurality of radio stations and/or music styles. Preferably, after selecting a station and/or style, the broadcast/reception activities (e.g., as described herein in connection with FIG. 56) can take place, preferably with the user-selected station/style corresponding to the style of music data file to be received.

Figure 58:
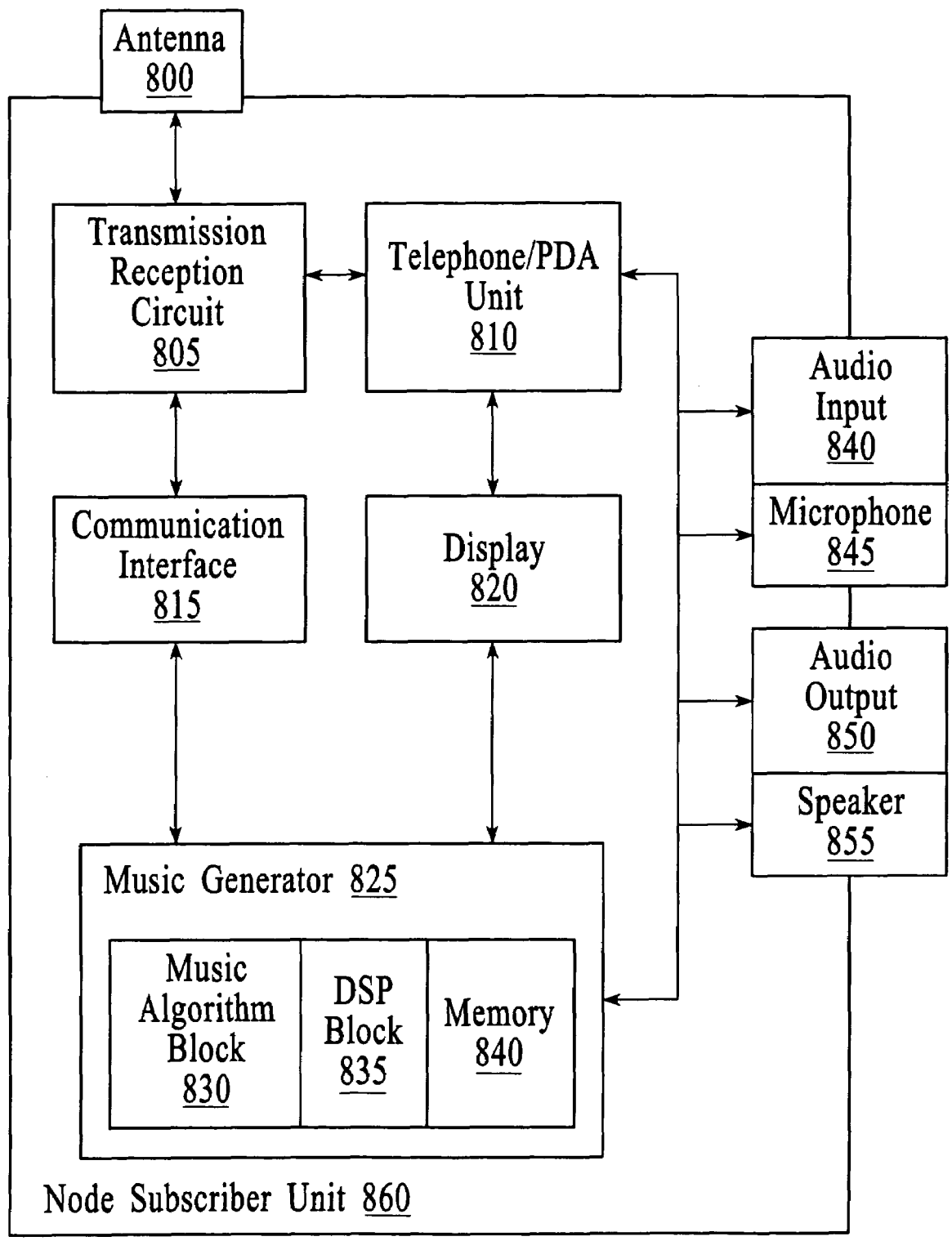
FIG. 58 illustrates exemplary preferred functional blocks utilized in a node/subscriber unit in accordance with certain embodiments of the present invention.

FIG. 58 illustrates an example of certain functional blocks associated with a preferred embodiment of a Node Subscriber Unit of the present invention. Node Subscriber Unit 860 preferably includes Antenna 800, Transmission/Reception Circuit 805, Telephone/PDA Unit 810, Communication Interface 815, and Display 820. Additionally, it preferably includes a Music Generator 825, which itself preferably includes Music Algorithm Block 830, DSP Block 835, and Memory 840. Such an exemplary Node Subscriber Unit also preferably contains one or more of the following: Audio Input 840, Microphone 845, Audio Output 850, and Speaker 855.

Novel aspects of embodiments of the present invention include the usage of a particularly efficient music distribution and generation system. Unlike various FM Radio broadcast systems, or Internet streaming systems in conventional approaches, the present invention utilizes music that preferably can be generated by the Node, and preferably not by the Transmitter. The Node receives a data file that contains, in essence, data or instructions that define a song to be generated, and may be used by the hardware/software of the Node in order to generate a song (the data or instructions, however, may include some sub-components of the song that are akin to prior art broadcasting/streaming systems, such as samples). Examples of such information, data or instructions are discussed below with reference to FIGS. 59 and 60. Generally, in accordance with preferred embodiments, the instructions comprise data that can be sent, for example, in text form or some other similarly format (i.e., that consume relatively very little bandwidth, particularly as compared with conventional streaming audio-type approaches). In the examples discussed below, it is contemplated that the size of the Broadcast Music Data File (measured here in bits of data) may preferably be, for example, approximately 200 kilobits for a 3 minute song.

FIG. 59 illustrates various exemplary parameters that preferably can be incorporated into a broadcast music data file.

'Application Revision' is preferably used to store the firmware/application version used to generate the data structure. This is particularly helpful in cases where the firmware is upgradeable.

'Style/SubStyle' preferably is used to indicate the Style and/or SubStyle of music. This is helpful when initializing various variables and routines, to preferably alert the system that the rules associated with a particular Style and/or SubStyle will govern the song generation process. In certain preferred embodiments, Style and/or SubStyle can refer to a radio station style of music, such as 'Hard Rock', 'Ambient', 'Easy Listening', etc. In certain cases, for example as discussed below, the radio station style may be user-selectable prior to the reception of the music data file.

'Sound Bank/Synth Type' preferably indicates the particular sound(s) that will be used in the generation of the song. As an example, this can be a way to preload the sound settings for a MIDI DSP resource.

'Sample Frequency' preferably is a setting that can be used to indicate how often samples will be played, if samples are incorporated into the song. Alternatively, this preferably can indicate the rate at which the sample is decoded, which provides a technique useful for adjusting the frequency of sample playback.

'Sample List' preferably lists all of the samples that are associated with the data structure. This list preferably allows a user to further select and play relevant samples during song playback.

'Key' preferably is used to indicate the first key used in the song. Preferably, one way to indicate this is with a pitch offset.

'Tempo' preferably is used to indicate the start tempo of the song. Preferably, one way to indicate this is with pulses per quarter note (PPQN) information.

'Instrument' preferably is data that identifies a particular instrument in a group of instruments. For example, this could reference an acoustic nylon string guitar among a group of all guitar sounds. This data is preferably indexed by instrument type.

'State' preferably is data that indicates the state of a particular instrument. Examples of states are: muted, un-muted, normal, Forced play, solo, etc.

'Parameter' preferably is data that indicates values for various instrument parameters, such as volume, pan, timbre, etc.

'PRNG Seed Values' preferably is a series of numerical values that are used to initialize the pseudo-random number generation (PRNG) routines (such PRNG Seed Values are used in certain embodiments, but not in other embodiments; the present invention is not limited to the use of such PRNG Seed Values). These values preferably represent a particularly efficient method for storing the song by taking advantage of the inherently predictable nature of PRNG to enable the recreation of the entire song.

'Song Structure' preferably is data that preferably lists the number of instrument types in the song, as well as the number and sequence of the parts in the song.

'Structure' preferably is data that is indexed by part that preferably can include the number and sequence of the sub-parts within that part.

'Filtered Track' preferably is a parameter that preferably can be used to hold data describing the characteristics of an effect. For example, it preferably can indicate a modulation type of effect with a square wave and a particular initial value. As the effect preferably is typically connected with a particular part, this parameter may preferably be indexed by part.

'Progression' preferably is characteristic information for each sub-part. This might include a time signature, number and sequence of SEQs, list of instrument types that may be masked, etc.

'Chord' preferably contains data corresponding to musical changes during a sub-part. Chord vector (e.g., +2, −1, etc.), key note (e.g., F), and progression mode (e.g., dorian ascending) data preferably are stored along with a time stamp.

'Pattern' and the sub-parameters 'Combination', 'FX Pattern', and 'Blocks', all preferably contain the actual block data and effects information for each of the instruments that are used in the song. This data is preferably indexed by the type of instrument.

Additional parameters can preferably be included, for example to enable at least some of the soundbank data associated with a particular song to be embedded. Following this example, when such a broadcast music data file is accessed, at least some of the sound bank data preferably is loaded into non-volatile memory such that the sound bank data may be used during the generation of music output.

Additionally, many of these parameters preferably can incorporate data with associated timestamps. This optional feature can preferably be used to indicate the timing of each event, etc.

Through the use of such exemplary parameters in a broadcast song data structure, data from which a song can be generated preferably can be efficiently broadcast to a number of node music generator devices. Though the specific parameter types preferably can be varied, the use of such parameters preferably enables all the details necessary to accurately and faithfully regenerate a song from scratch at a node.

Figure 60:
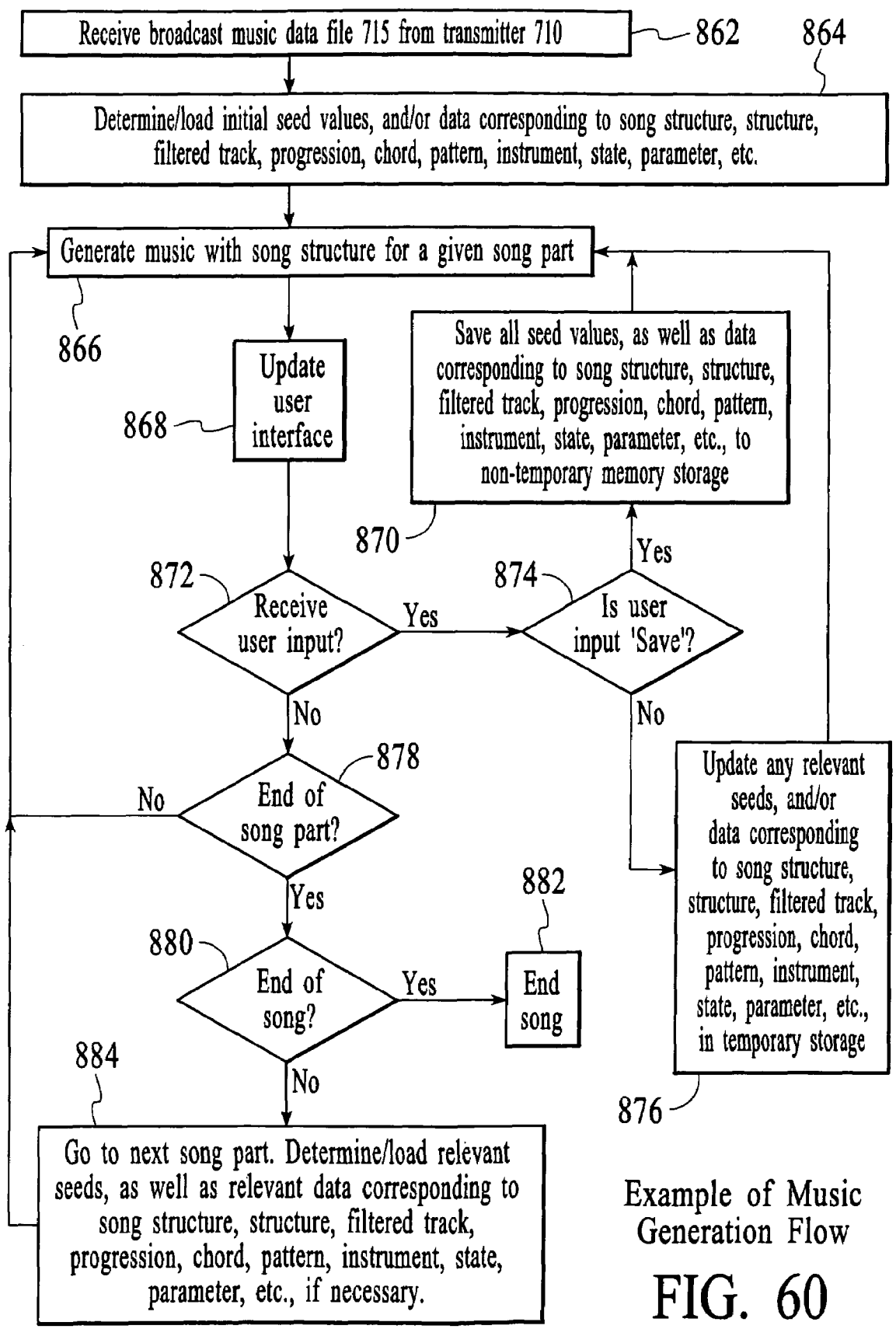
FIG. 60 illustrates an exemplary preferred process flow of a preferred music generation process in accordance with certain embodiments of the present invention.

FIG. 60 depicts a logical flow chart for a preferable general architecture that could be used by each node music generator device in combination with the broadcast song data file to practice the present invention. This flow chart illustrates the big picture for a preferable software/firmware implementation, and provides in more detail an exemplary process flow for the song generation process.

At the start of FIG. 60 (start point 862), parameter data preferably is loaded from the broadcast song data structure after it is received by a subscriber unit (block 864). Once at least some parameter values preferably are determined/loaded, the music for a given song part preferably begins to be generated (block 866), and the user interface (e.g., display, video output, force-feedback, etc.) preferably can be updated accordingly (block 868). Preferably, at any point in this process, if a user input is detected (decision block 872) (other than a 'save' command), such as a change of instrument or effect, the relevant parameter data for the part of the song currently being changed by the user preferably is updated (block 876) and the generation of the music for the given part preferably continues. If a user input 'save' command is detected (decision block 874), all parameter data preferably can be saved to a non-temporary storage location, such as Flash memory, a hard drive, or some other writeable memory storage location that affords some degree of permanence (block 870). This arrangement is desirable because it preferably allows a user to listen to most of a song before electing to save it in its entirety. As long as there is no user input, the generation of music for a given song part preferably continues until the end of song part is detected (decision block 878), at which time the flow preferably proceeds to the next song part (block 884). At this time, if necessary, the relevant parameter data for the next song part preferably are determined/loaded. Eventually, when an end-of-song condition preferably is detected (decision block 880), the song ends (block 882).

FIG. 61 describes exemplary Telecommunication Industry Association (TIA) standards that can be applied to certain embodiments of the present invention. Given the broad range of message and/or other data services options available in the present cellular industry, the music distribution concepts described herein can be implemented using a variety of different means. There are several available architectures that can be used to distribute music data files in accordance with the present disclosure; as examples, time division multiple access (TDMA), Global System for Mobile Communications (GSM), and code division multiple access (CDMA). FIG. 6 references certain standards that contain further details on preferable implementations of data distribution in a cellular context, and therefore are each hereby incorporated by reference in their entirety. Clearly this is not to be considered an exhaustive listing; rather it is intended to simply give some illustrative preferred examples of relevant published standards.

FIG. 62 provides as an example certain excerpts from one such exemplary standard: TIA/EIA IS-637 "Short Message Service for Wideband Spread Spectrum Cellular System." As indicated in FIG. 62, a SMS Broadcast Message has been defined that allows optional Bearer Data. Following this example, Bearer Data can preferably include Subparameter Data of variable length (e.g., as described in connection with SUBPARAM_LEN). This example of an SMS Broadcast Message may preferably used to practice certain aspects of the present invention (e.g., the means to transmit Broadcast Music Data File 715 as illustrated in FIG. 56). Additionally, there are other similarly defined messages defined in the IS-637 standard that may preferably be used in association with Node-authored Music Data File 725 illustrated in FIG. 56. As one example, see the "Data Burst Message" described TIA/EIA IS-95-A. Clearly, other standards alternatively can be adopted while achieving certain of the benefits of the present invention. Similarly, other types of data transactions identified in the aforementioned telecommunications standards may be substituted for the particular exemplary embodiments mentioned herein without departing from the spirit and scope of the present invention.

In yet another alternative embodiment, referring back to FIG. 57, many benefits of the present invention can be advantageously incorporated into a clock or clock radio device. As shown in FIG. 57, a clock radio has a display (e.g., display 775) that can display a graphical interface for a clock radio user. In one example, the display also is used for indicating the time, as well as alarm settings. The user input interface 780 can similarly be used to afford a clock radio user with a means to input time and/or alarm information. In certain examples, speaker 760 plays the clock alarm at the desired time. Many aspects of the preferred embodiments discussed herein can be used in an alarm clock that preferably will allow a user to wake up each morning to a completely new musical piece. In certain embodiments, the style of music can be selected by the user (e.g., via user input interface 780 and display 775).

In certain embodiments, characteristics of the music output can be adjusted during the alarm operation. As an example, the style of music may progressively change from a quiet, relaxing ambiance to a more energetic and loud style of music. Preferably this progression occurs each time the user presses a snooze button (e.g., via user input interface 780) or at predetermined intervals of time (which may be without further user action). In this manner the alarm clock can first wake the user with a relaxing quiet and/or simple piece, and progressively become more lively the longer the user chooses to remain in bed (e.g., by continuing to press the snooze button, or alternatively, by simply remaining in bed without turning off the alarm).

In certain alarm clock embodiments it is preferable to similarly progressively adjust the music from a soothing chord progression to a more dissonant one. As an example, referring to FIG. 19, the alarm clock music could begin with a major chord and become more dissonant, e.g., a minor chord, the longer the alarm continues to sound. In certain alarm clock embodiments it is preferable to start with music with a relative lower mobility of note pitch (e.g., see FIG. 23), and progressively increase the relative mobility of note pitch the longer the user remains in bed. In another example, the rhythmic density preferably will progress from a relatively low rhythmic density (e.g., see FIG. 18) to a relatively high rhythmic density. Preferably, certain of these embodiments will wake a user up with a soothing musical piece and progressively become more energetic, complex, and/or dissonant the longer the user remains in bed.

In yet another alternative embodiment, referring back to FIG. 57, the use of User Interface 780 (e.g., a typical portable phone numeric keypad, with letters overlaying certain numbers) enables the user to input a name (e.g., his/her name or that of a loved one, or some other word) into the automatic music generation system. In an exemplary alternative embodiment, the typed name is used to initial the autocomposition process in a deterministic manner, such that a unique song determined by the key entry is automatically composed based on the key entry of the name. In accordance with certain disclosed embodiments disclosed herein, for example, the characters of the name are used in an algorithm to produce initial seeds, musical data or entry into a pseudo random number generation process (PRNG) or the like, etc., whereby initial data to initiate the autocomposition process are determined based on the entry of the name. As one example, add the ASCII representation of each entered character, perhaps apply some math to the number, and use the resulting number as an entry into a PRNG process, etc. Continuing this example, each letter could have a numeric value as used on a typical numeric keypad (e.g., the letters 'abc' corresponds to the number '2', 'def' to 3, etc.,) and the numbers could be processed mathematically to result in an appropriate entry to a PRNG process. This latter example may be particularly advantageous in situations where certain of the presently disclosed embodiments are incorporated into a portable telephone, or similar portable product (such as a personal digital assistant or a pager) where a keypad interface is supported.

As the process preferably is deterministic, every entry of the name would produce the same unique or "signature" song for the particular person, at least for the same release or version of the music generation system. While the autocomposition process in alternative embodiments could be based in part on the time or timing of entry of the letters of the name, and thus injecting user time-randomness into the name entry process (such human interaction randomness also is discussed in the referenced and incorporated patent documents) and in essence a unique song generation for each name entry, in preferred alternate embodiments the deterministic, non-random method is used, as it is believed that a substantial number of users prefer having a specific song as "their song" based on their name or some other word that has significance to them (a user may enter his/her name/word in a different form, such as backwards, upside down using numbers, no capital letters, use nick names, etc. to provide a plurality of songs that may be associated with that user's name in some form, or use the numbers corresponding to a series of letters as discussed herein in connection with a numeric keypad interface). As will be appreciated by those of skill in the art, this concept also is applicable to style selection of music to be autocomposed (as described in the referenced and incorporated patent documents; the style could be part of the random selection process based on the user entry, or the style could be selected, etc.). For example, for each style or substyle of music supported by the particular music generation system, a unique song for each style or substyle could be created based on entry of the user's name (or other word), either deterministically or based, for example, on timing or other randomness of user entry of the characters or the like, with the user selecting the style, etc.

As will be appreciated, the concept of name entry to initiate the autocomposition process in Node/Subscriber Unit Music Generator Device 720 is not limited to names, could be extended to other alphanumeric, graphic or other data input (a birthdate, words, random typed characters, etc.). With respect to embodiments using a touchscreen, for example, other input, such as drawn lines, figures, random lines, graphic, dots, etc., could be used to initiate the autocomposition process, either deterministically or based on timing of user entry or the like. What is important is that user entry such as keyboard entry of alphanumeric characteristics or other data entry such as drawing lines via the touchscreen (i.e., e.g., data entry that is generally not musical in nature), can be used to initiate the composition of music uniquely associated with the data entry events. Thus, unique music compositions may be created based on non-musical data entry, enabling a non-musically inclined person to create unique music based on non-musical data entry. Based on such non-musical data input, the music generation process picks seeds or other music generation initiation data and begins the autocomposition process. As will be appreciated, particularly with respect to entered alphanumeric data entry, such characters also could be stored (either alone or with music generation initiation data associated with the data entry), could be transmitted to another music generation system (e.g., via Transmitter 710), whereby the transmission of the non-musical data is used to, in effect, transmit a unique song to another user/system, with the transmission constituting only a small number of bytes of data to transmit information determining the song to be created by the music generation system.

Additionally, many aspects of the present invention are useful to enable a new concept in Firmware upgrades. Using aspects of the present invention, firmware updates can be made available to users, complete with embedded advertising, which provides the Firmware manufactures/distributors with a revenue source other than the user. This concept preferably involves the distribution of firmware (or other software-based programs such as sound bank data) upgrades that contain embedded advertising images (and/or sounds). Such images/sounds preferably can temporarily appear during the operation of the music product, and can fund the development of customized firmware for users to preferably freely download.

As will be understood by a person of ordinary skill in the art of portable electronic music design, the examples discussed here are representative of the full spirit and scope of the present invention. Additional variations, some of which are described here, incorporate many aspects of the present invention.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A system for generating a musical composition based on received music data, comprising:
    a transmitter/receiver, wherein the transmitter/receiver transmits and receives data from/to one or more second systems remote from the system, wherein the data received by the system includes at least the received music data, wherein the received music data comprises seed information to enable a music piece to be faithfully recreated;
    a music generation device, wherein the music generation device executes at least a music generation algorithm;
    a memory, wherein at least the received music data is stored in the memory;

wherein, musical data is generated based on the seed information from the received music data, wherein the music generation device generates the musical composition based on the received music data using the music generation algorithm.

2. The system of claim 1, further comprising a user input, wherein activation of the user input by a user causes data in the received music data to be modified, wherein modified music data is created, wherein the music generation device generates a modified musical composition based on the modified music data.

3. The system of claim 2, wherein the modified music data is transmitted by the transmitter/receiver for reception by one or more remote systems, wherein the one or more remote systems may generate the modified musical composition based on the modified music data.

4. The system of claim 1, wherein the music generation device generates an audio output for an entertainment device.

5. The system of claim 1, wherein the received music data comprises timing loop information used by the music generation device to generate the music output.

6. The system of claim 1, wherein the music generation device comprises a video game system, and wherein the audio output comprises an audio output of the video game system.

7. The system of claim 6, further comprising:
a modular flash memory card for saving video game data, wherein the video game data comprises the seed information.

8. The system of claim 7, wherein the musical composition comprises an audio component to a video game, wherein the musical composition varies in part based on action development of the video game.

9. A method for generating audio comprising the steps of:
generating first music data that corresponds to a music piece, wherein the first music data is generated at a first entertainment device;
transmitting the first music data from the first entertainment device to a second entertainment device via a network;
receiving the first music data at the second entertainment device;
extracting first musical definition data from the first music data, wherein the first musical definition data provides information regarding first musical parameters;
processing the first musical definition data at the second entertainment device, wherein a first music portion is composed in accordance with the first musical parameters;
playing the first music portion at the second entertainment device;
generating second music data that corresponds to the music piece, wherein the second music data is generated at the second entertainment device; and
transmitting the second music data from the second entertainment device to the first entertainment device via the network.

10. The method of claim 9, further comprising the steps of:
receiving the second music data at the first entertainment device;
extracting second musical definition data from the second music data, wherein the second musical definition data provides information regarding second musical parameters;
processing the second music definition data at the first entertainment device, wherein a second music portion is composed in accordance with the second musical parameters; and
playing the second music portion at the first entertainment device.

11. The method of claim 9, wherein the first entertainment device comprises a video game system, and wherein the first music data is generated during execution of a video game.

12. The method of claim 10, wherein the first and second entertainment devices each comprise a video game system, and wherein the first music data is generated during video game execution on the first entertainment device, and the second music data is generated during video game execution on the second entertainment device.

13. The method of claim 12, wherein the second music data comprises timing loop information used during the video game execution on the first entertainment device to generate the second music portion.

14. The method of claim 12, wherein the second musical definition data comprises music component information associated with one or more video game characters.

15. The method of claim 14, wherein the music component information is processed by a composition functional block based in part upon a proximity of the one or more video game characters.

16. A system comprising:
a first music data generation functional block that generates first music data corresponding to a music piece to be composed at a remote station, wherein the first music data is comprised of first music definition parameters;
a music data transmission functional block that transmits the first music data to the remote station via a network;
a music data reception functional block that receives second music data from the remote station via the network, wherein the second music data is comprised of second music definition parameters;
a music composition algorithm that generates a first music output based in part on the first and second music definition parameters.

17. The system of claim 16, wherein the first and second music definition parameters comprise loop timing information used by the music composition algorithm to generate the first music output.

18. The system of claim 16, wherein the remote station comprises a video game system and wherein the first music output is generated during execution of a video game.

19. The system of claim 16, wherein the music composition algorithm is located in a video game system.

20. The system of claim 19, further comprising:
a modular flash memory card for saving video game data, wherein the video game data comprises the first music definition parameters.

* * * * *